(12) United States Patent
Hauck et al.

(10) Patent No.: US 8,562,696 B2
(45) Date of Patent: Oct. 22, 2013

(54) CONNECTING DEVICE

(75) Inventors: Axelle Hauck, Neubiberg (DE); Philipp Petz, München (DE); Hubertus Goeshann, Auernheim (DE); Jan Groshert, Dettingen (DE); Armin Diez, Lenningen (DE); Wolfgang Fritz, Metzingen (DE); Michael Kohnle, Hülben (DE)

(73) Assignees: ElringKlinger AG, Dettingen (DE); Bayerische Motoren Werke Aktiengesellschaft, Munich (DE)

( * ) Notice: Subject to any disclaimer, the term of this patent is extended or adjusted under 35 U.S.C. 154(b) by 282 days.

(21) Appl. No.: 12/925,115

(22) Filed: Oct. 14, 2010

(65) Prior Publication Data

US 2011/0097618 A1 Apr. 28, 2011

(30) Foreign Application Priority Data

Oct. 16, 2009 (DE) .......................... 10 2009 050 315

(51) Int. Cl.
  *H01M 2/26* (2006.01)
  *B23P 11/00* (2006.01)

(52) U.S. Cl.
  USPC ........................... 29/623.1; 429/158; 439/504

(58) Field of Classification Search
  USPC ........................... 429/158; 439/504; 29/623.1
  See application file for complete search history.

(56) References Cited

U.S. PATENT DOCUMENTS

| | | | |
|---|---|---|---|
| 4,576,880 A * | 3/1986 | Verdier et al. | 429/99 |
| 4,920,019 A * | 4/1990 | Stoklosa et al. | 429/122 |
| 7,479,346 B1 * | 1/2009 | Chow et al. | 429/158 |
| 7,998,611 B2 * | 8/2011 | Yoshihara et al. | 429/148 |
| 2005/0031945 A1 * | 2/2005 | Morita et al. | 429/158 |
| 2005/0079408 A1 * | 4/2005 | Hirano | 429/82 |
| 2005/0110458 A1 | 5/2005 | Seman, Jr. et al. | 320/114 |
| 2008/0152993 A1 | 6/2008 | Seiler et al. | 429/92 |
| 2009/0111009 A1 * | 4/2009 | Goesmann et al. | 429/120 |
| 2012/0276431 A1 * | 11/2012 | Groshert et al. | 429/99 |

FOREIGN PATENT DOCUMENTS

DE  10 2006 061 270 A1  6/2008

* cited by examiner

*Primary Examiner* — Gregg Cantelmo

(57) ABSTRACT

In order to produce a connecting device for the electrically conductive connection of a plurality of cell terminals of electro-chemical cells of an electro-chemical device which enables the cell connector to be mounted on the electro-chemical cells in a simple and rapid manner wherein the device comprises two or more cell connectors for respectively connecting two cell terminals of different electro-chemical cells to one another in electrically conductive manner, it is proposed that, in an assembly state of the connecting device, at least two cell connectors be integrally connected together after separating out the cell connectors from a starting material.

6 Claims, 37 Drawing Sheets

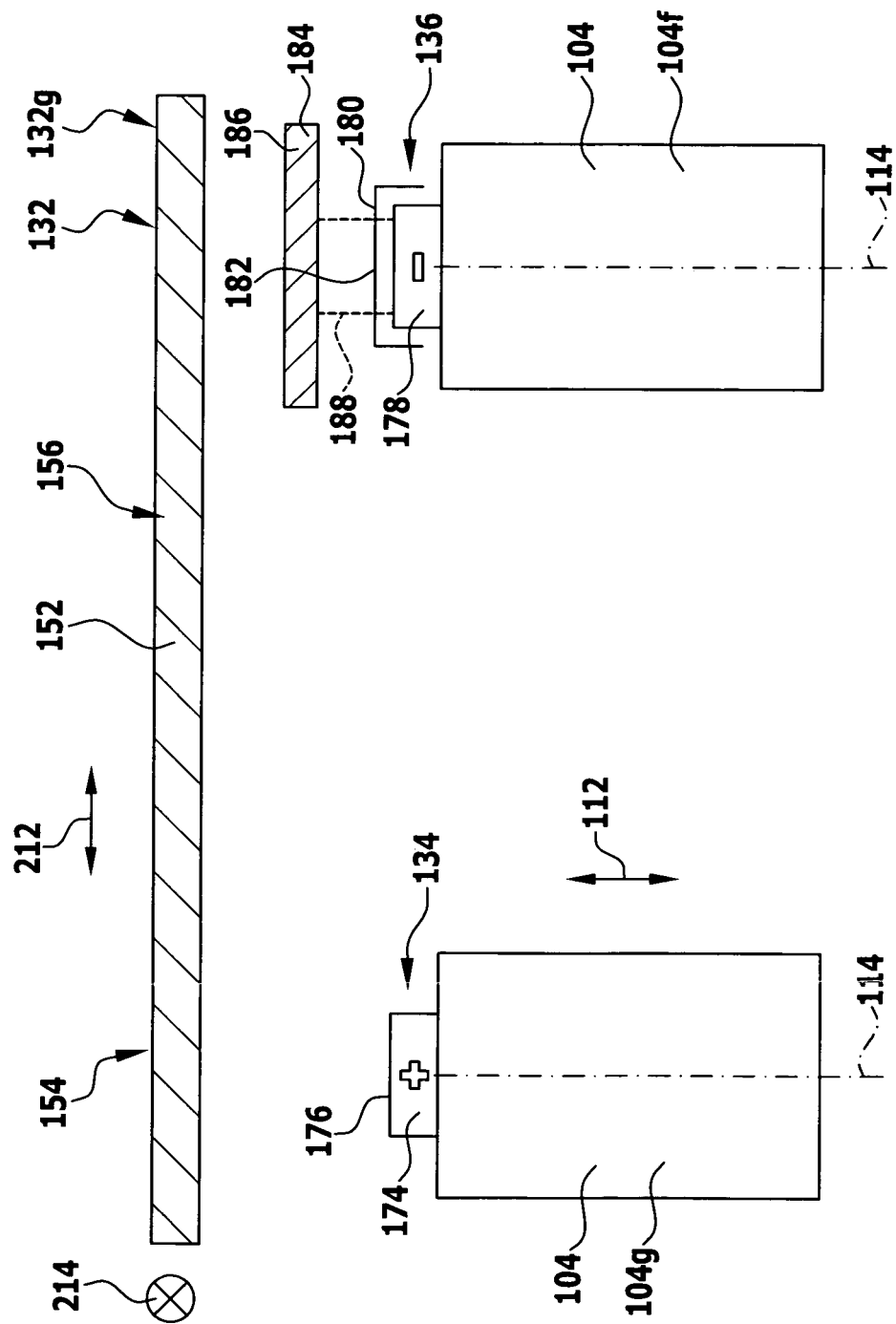

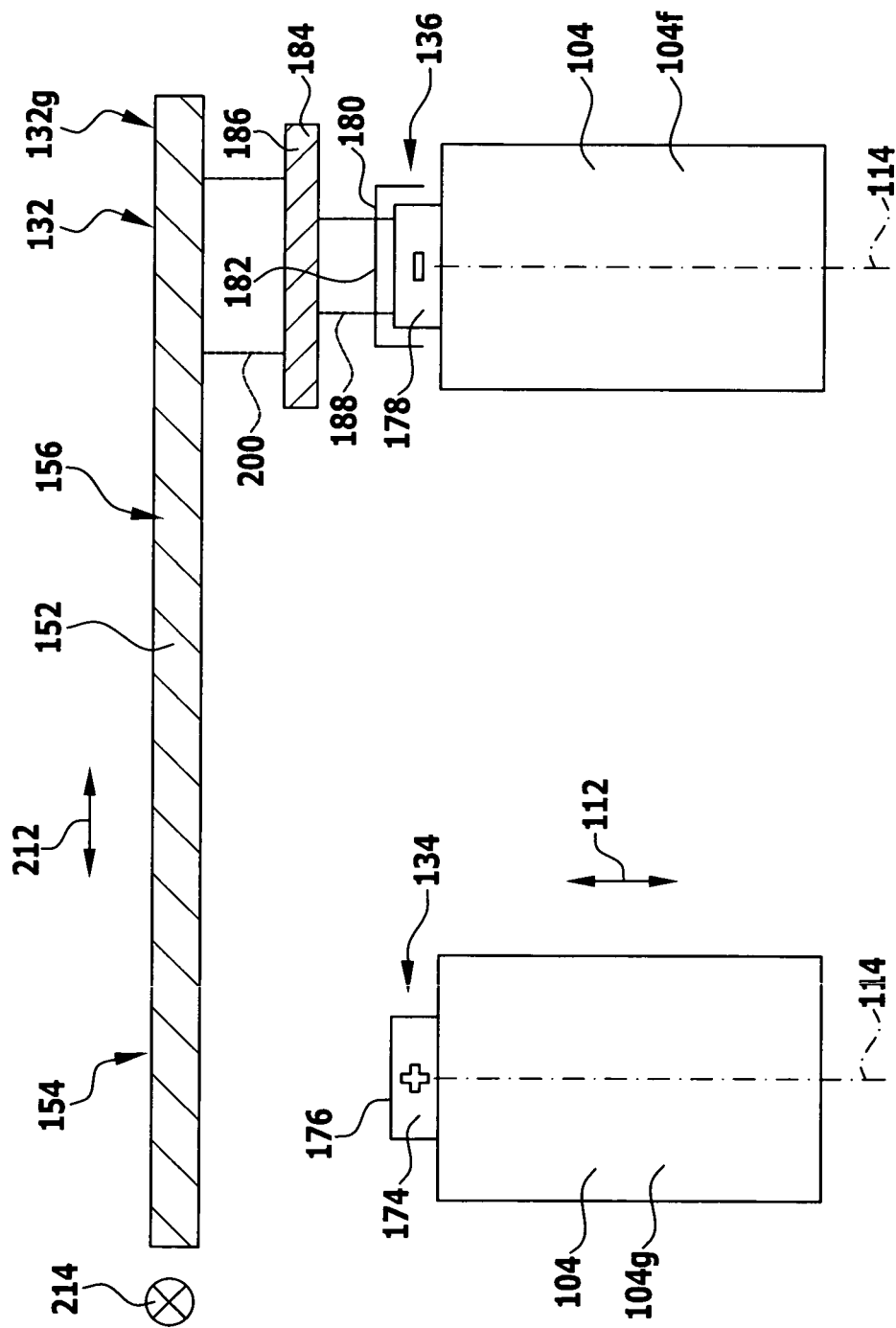

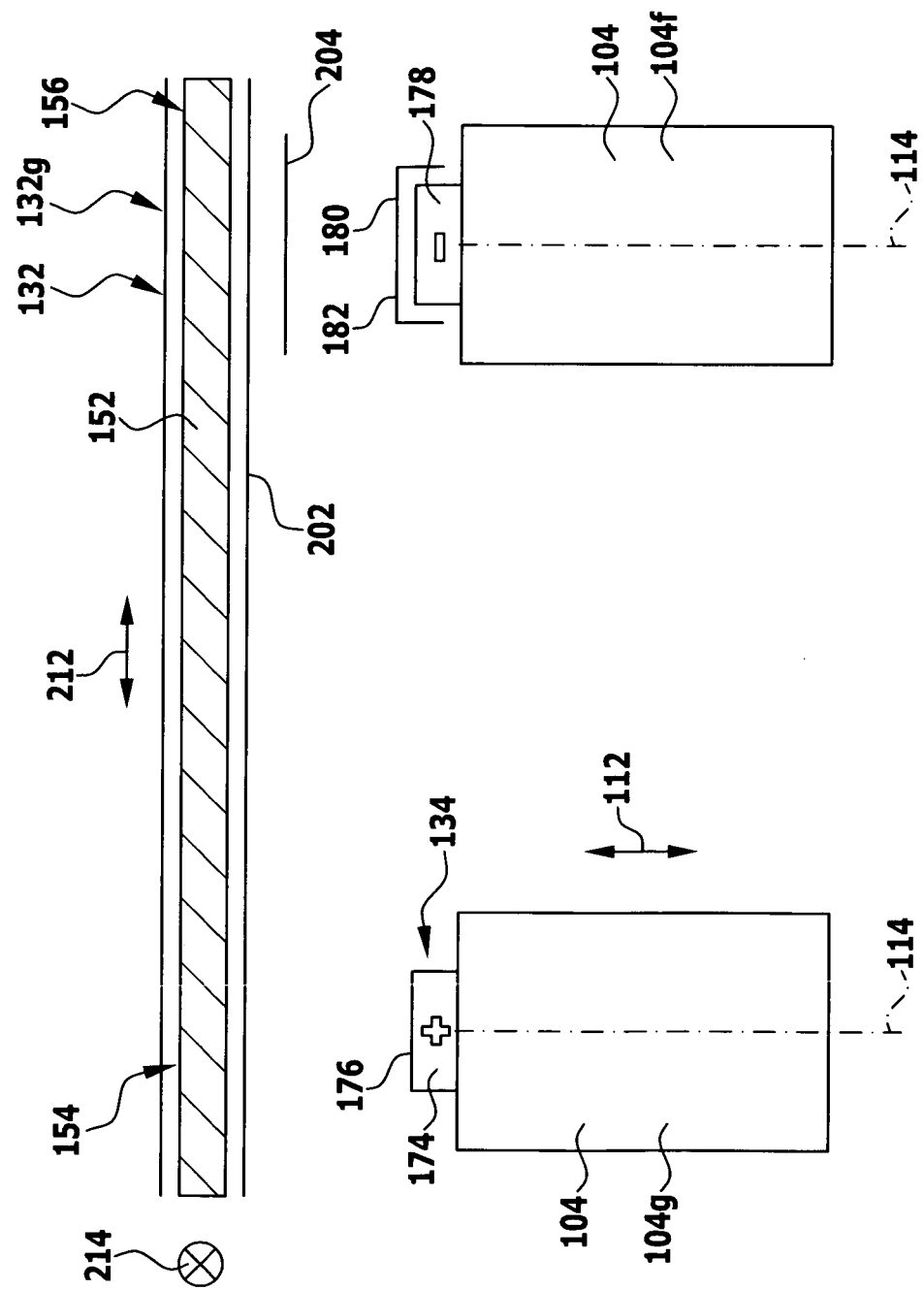

Figure 1:
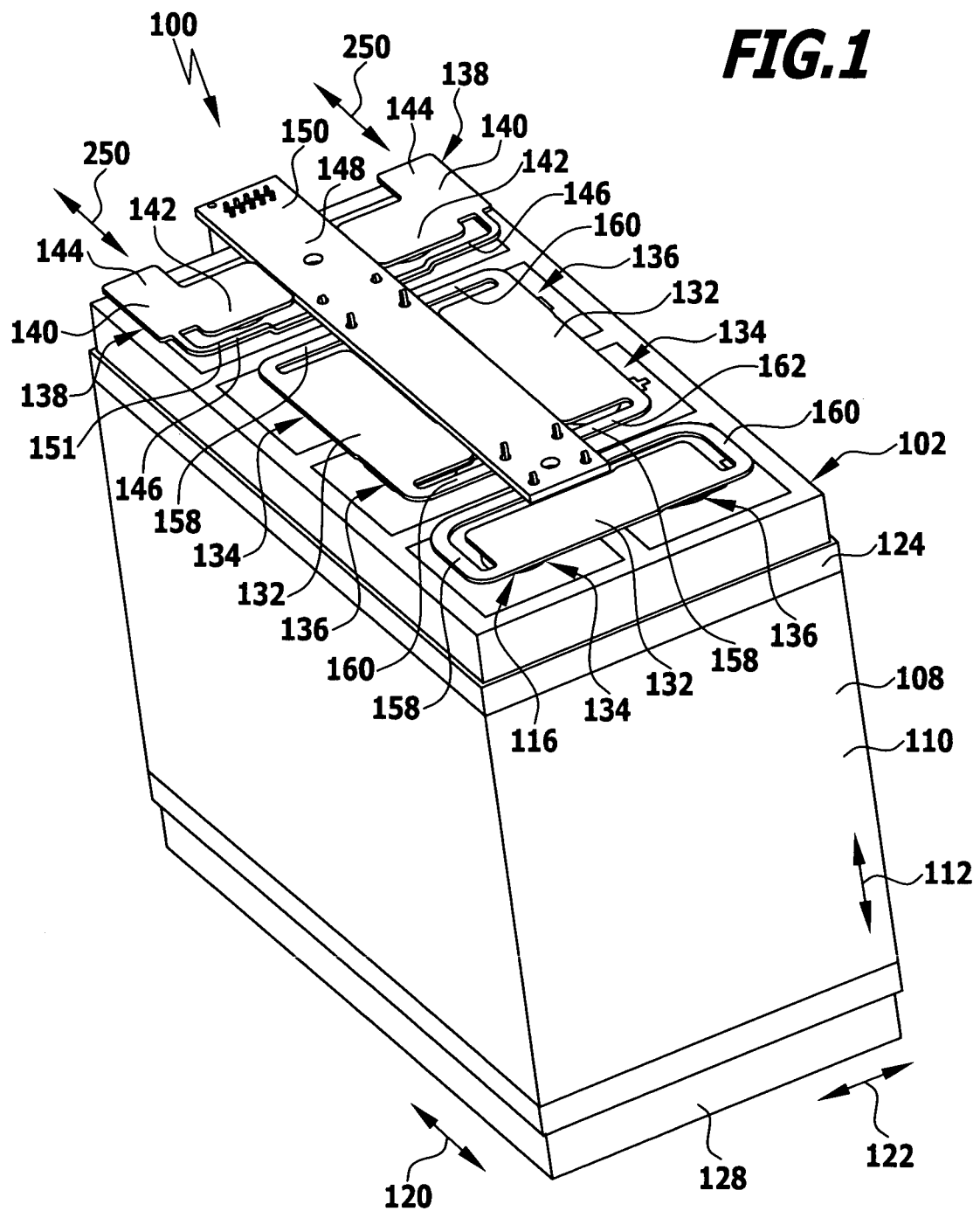

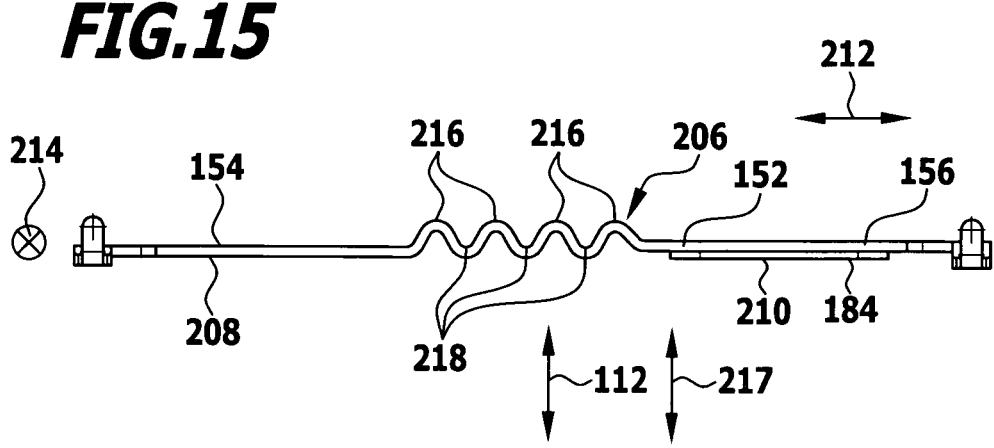
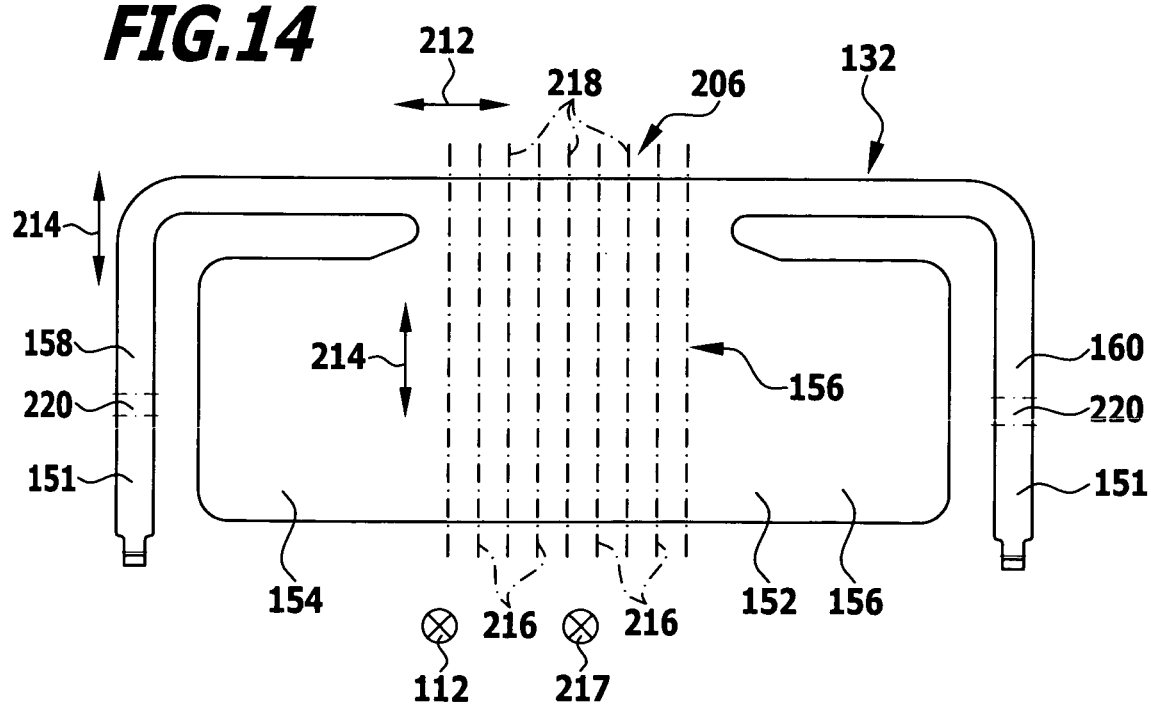

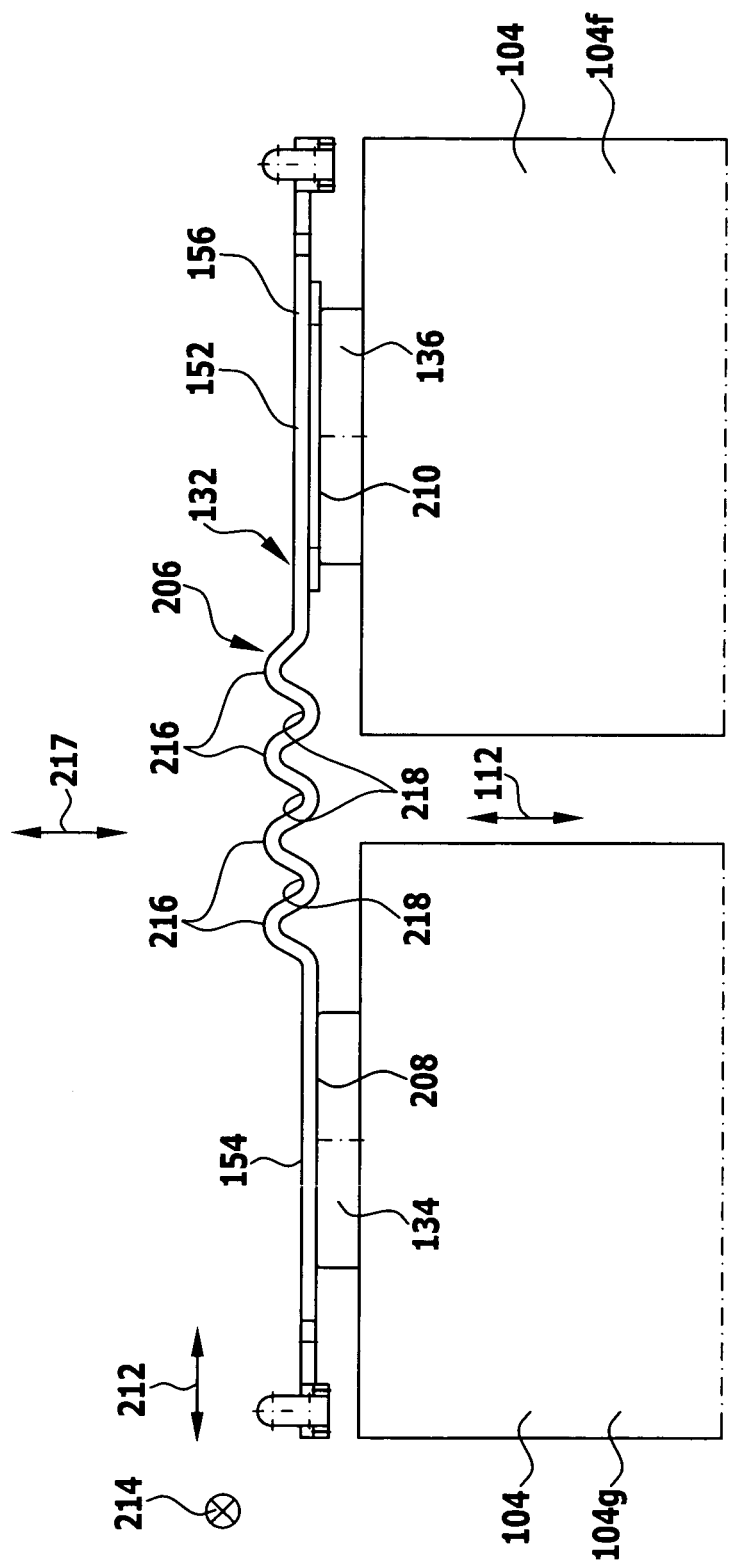

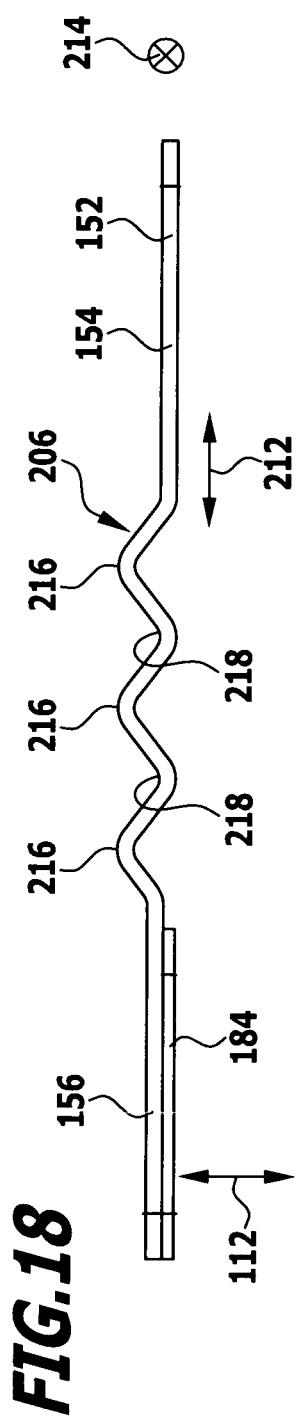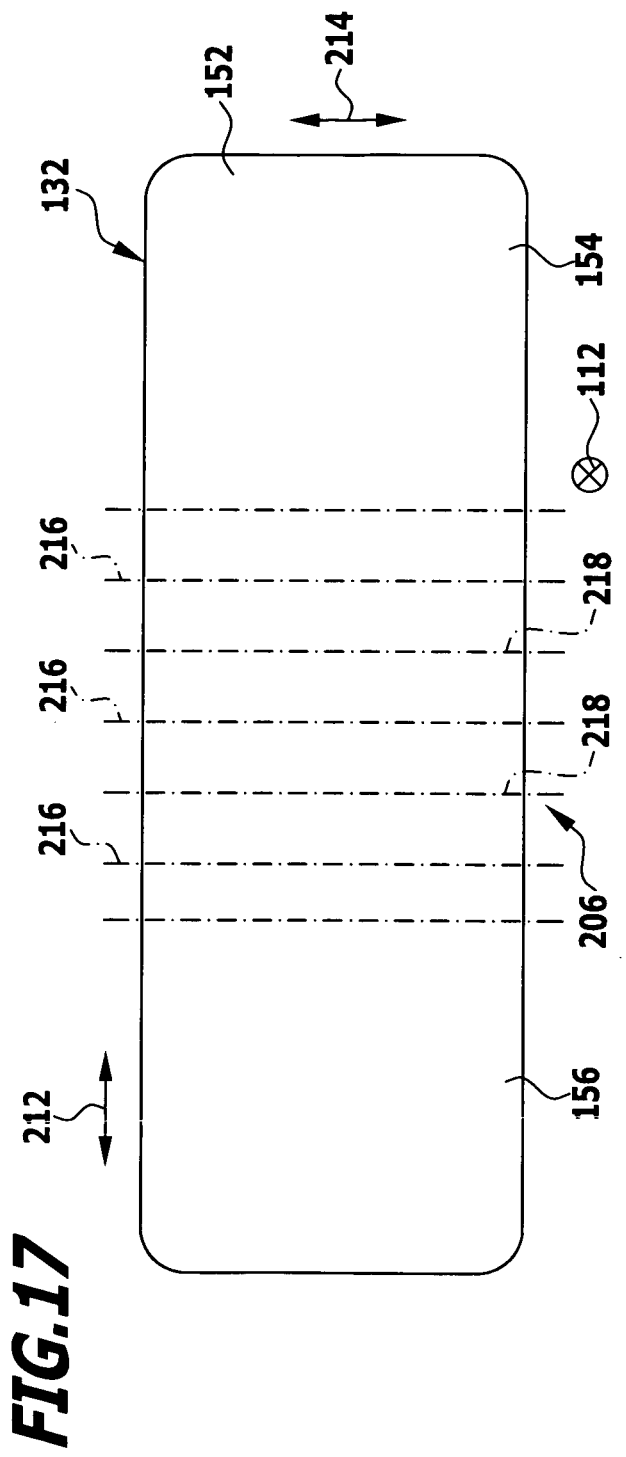

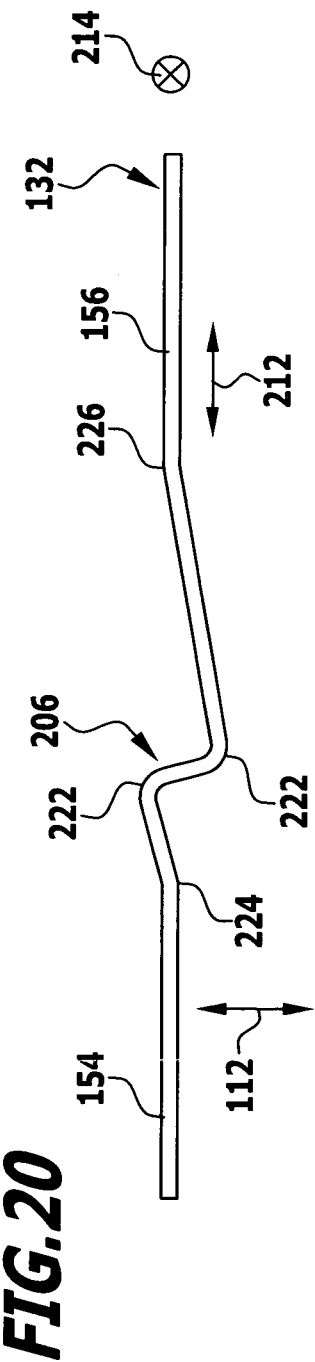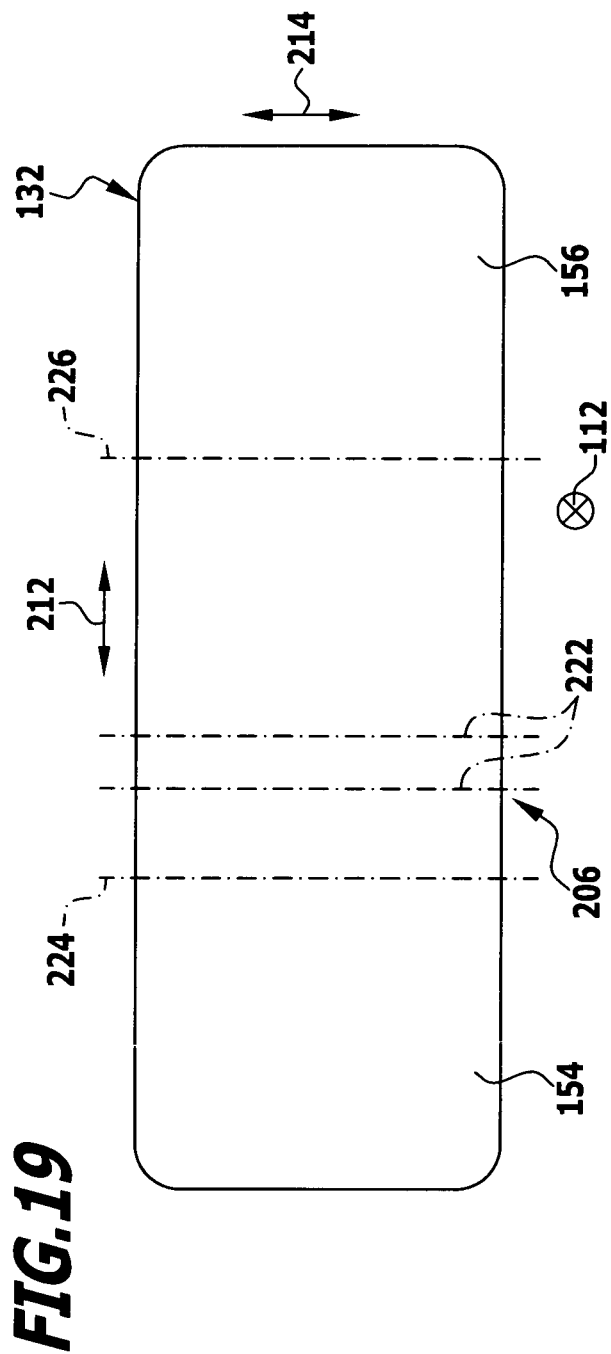

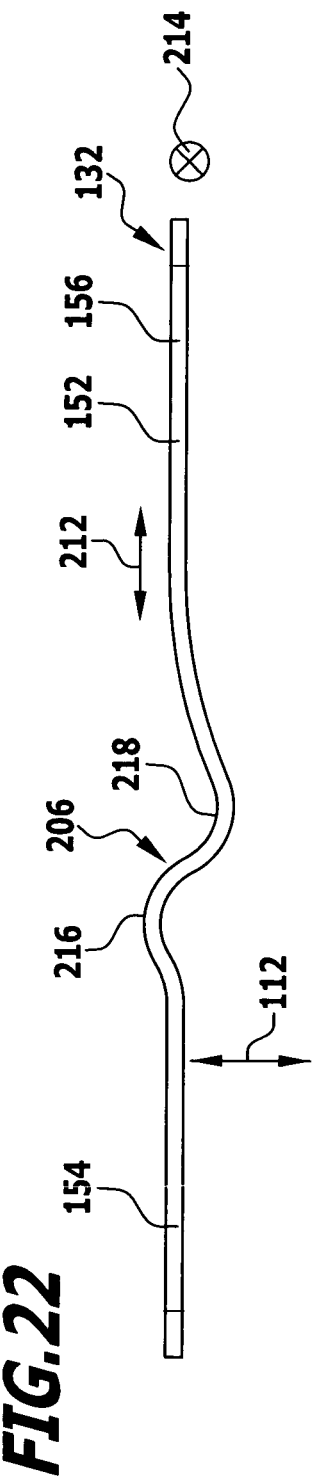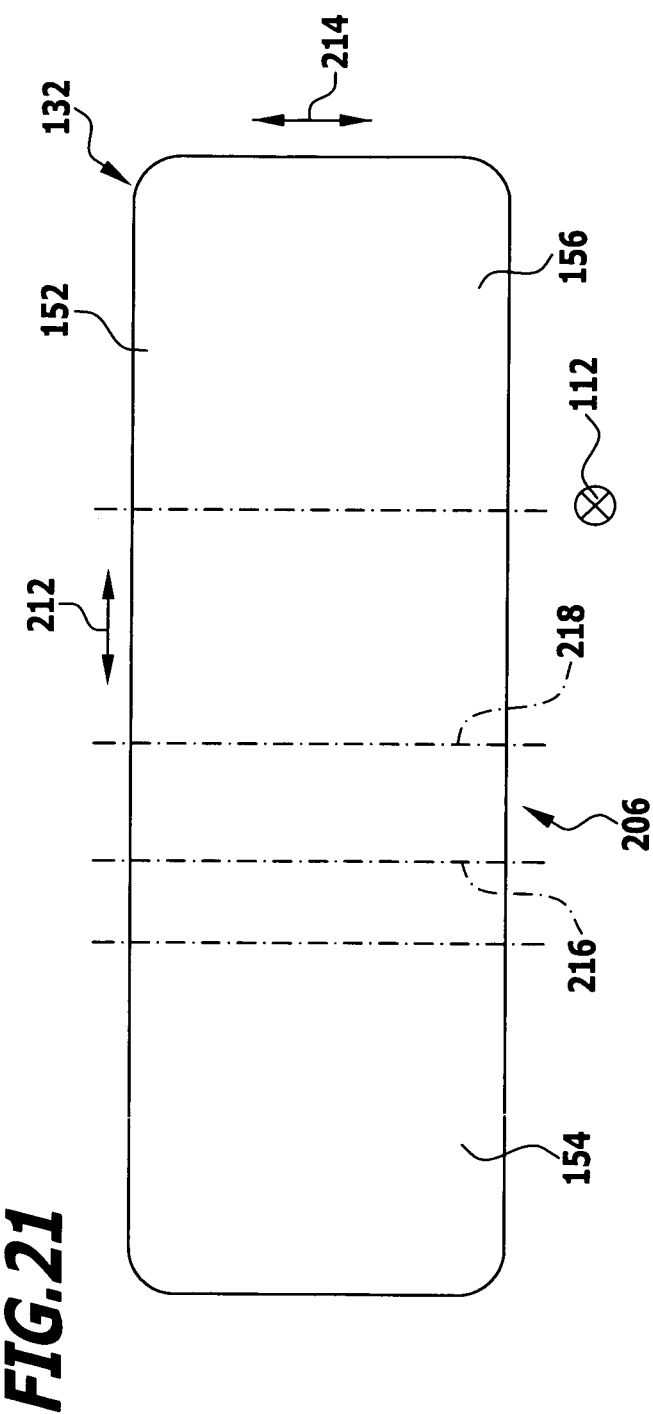

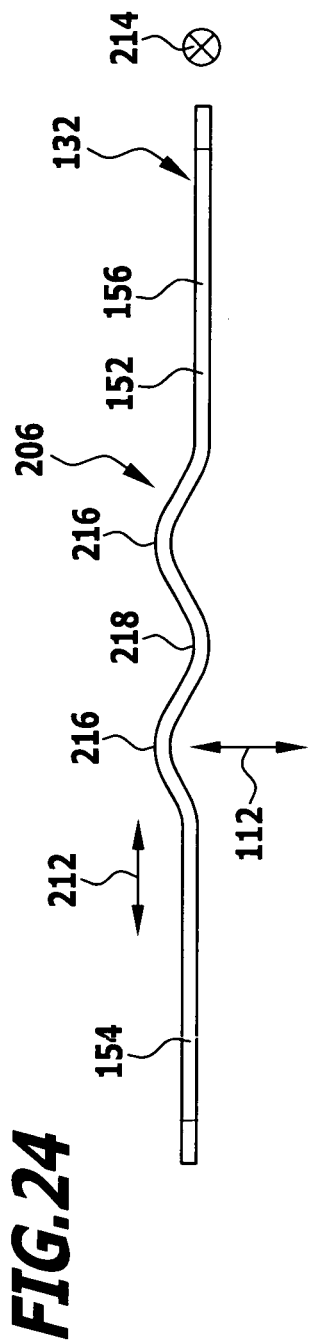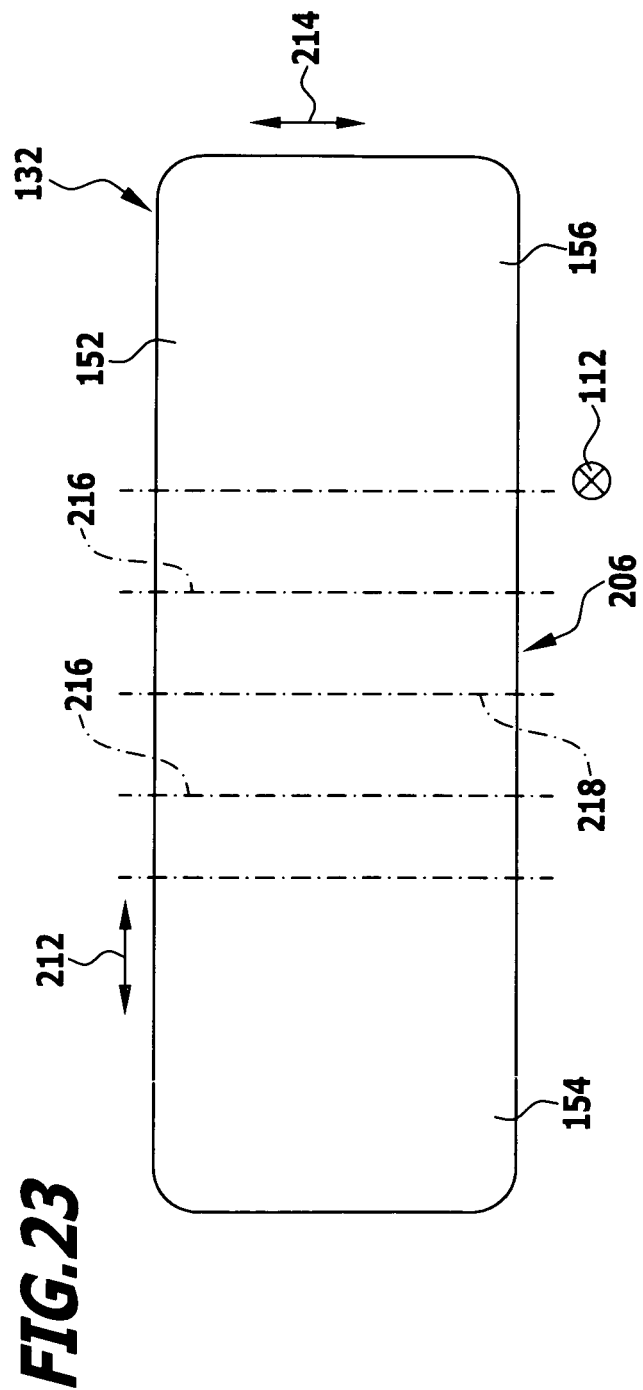
FIG. 24
FIG. 23

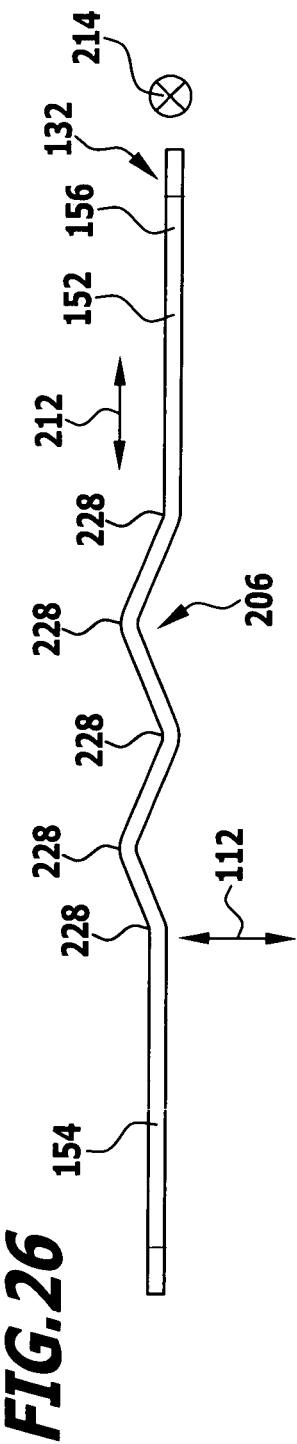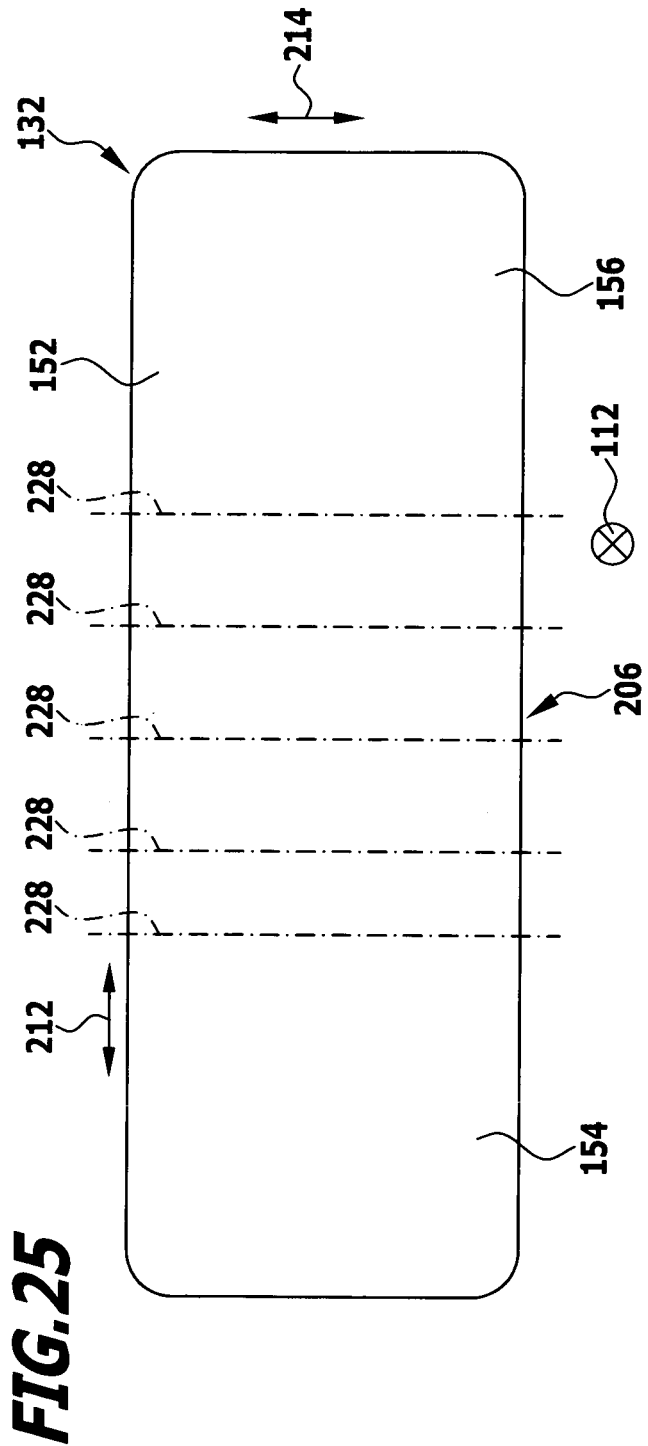

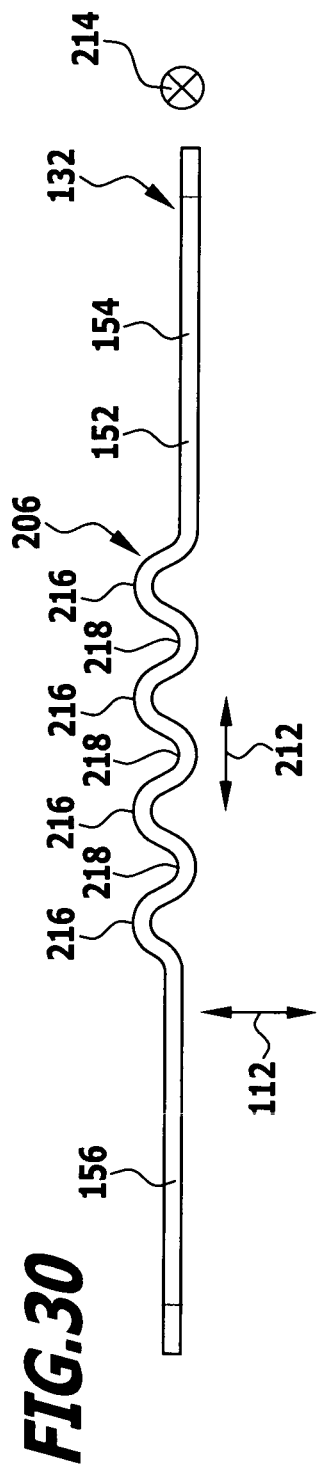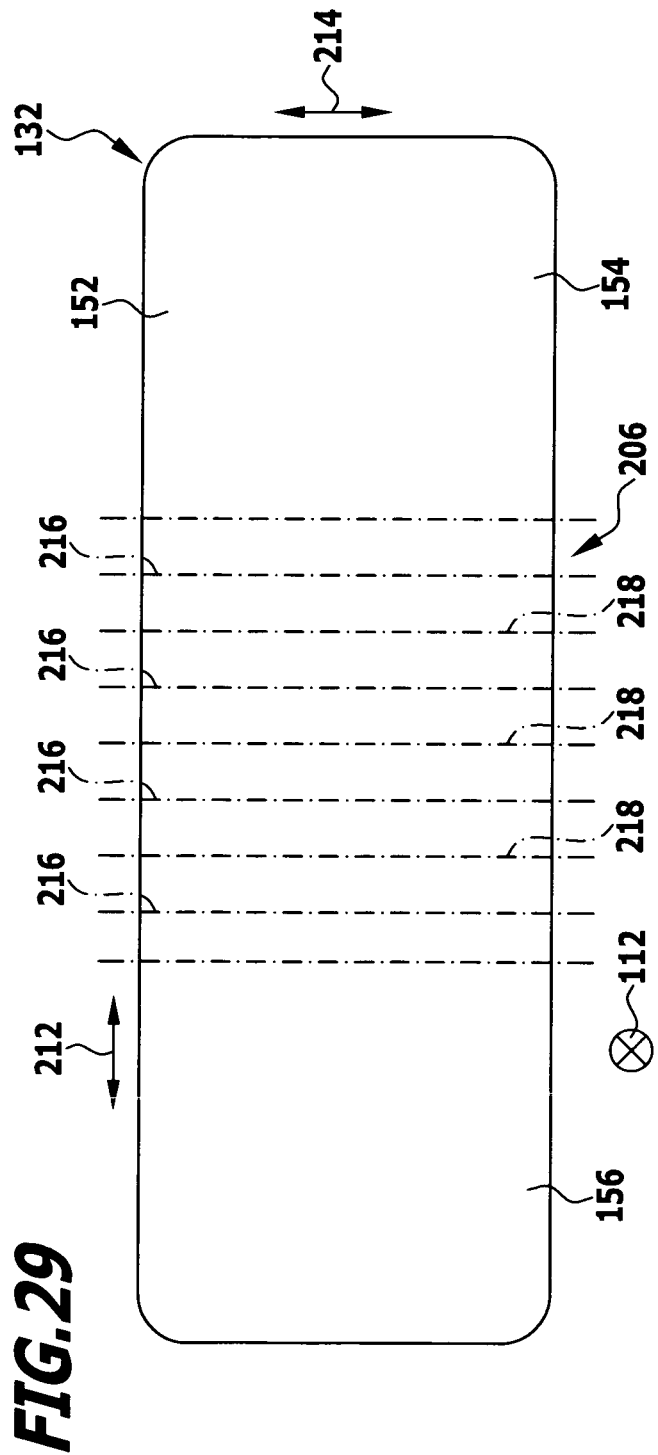

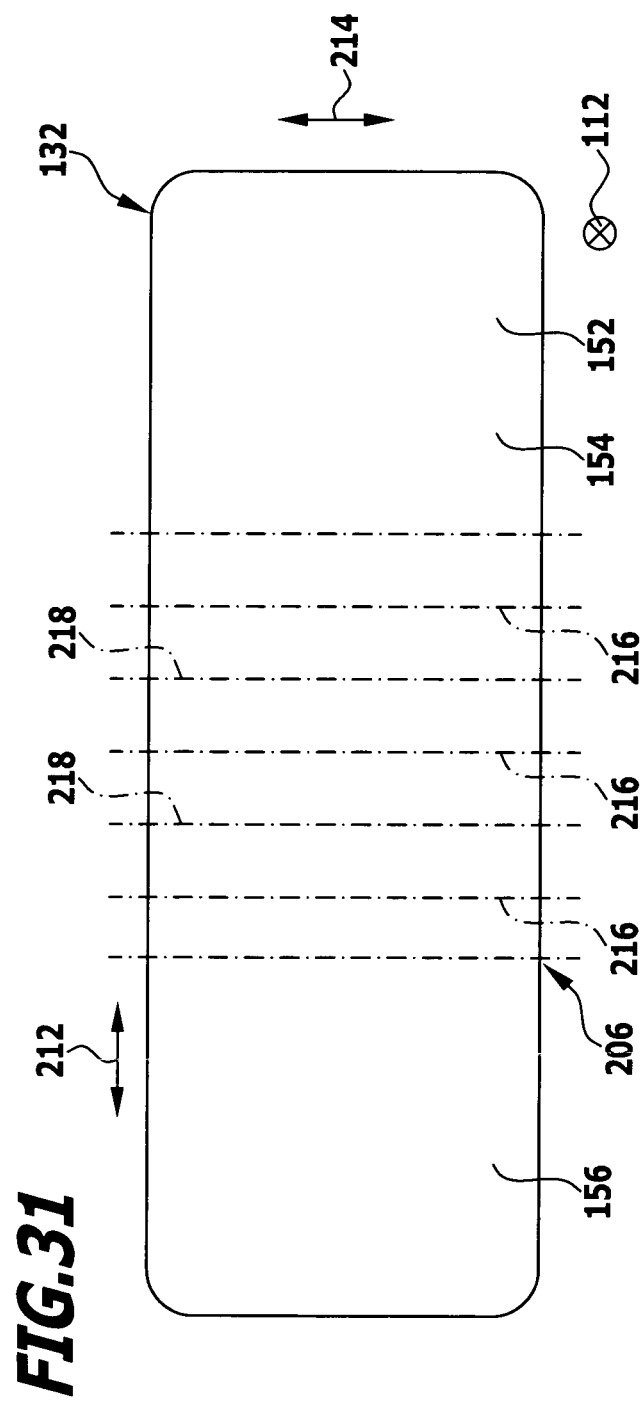
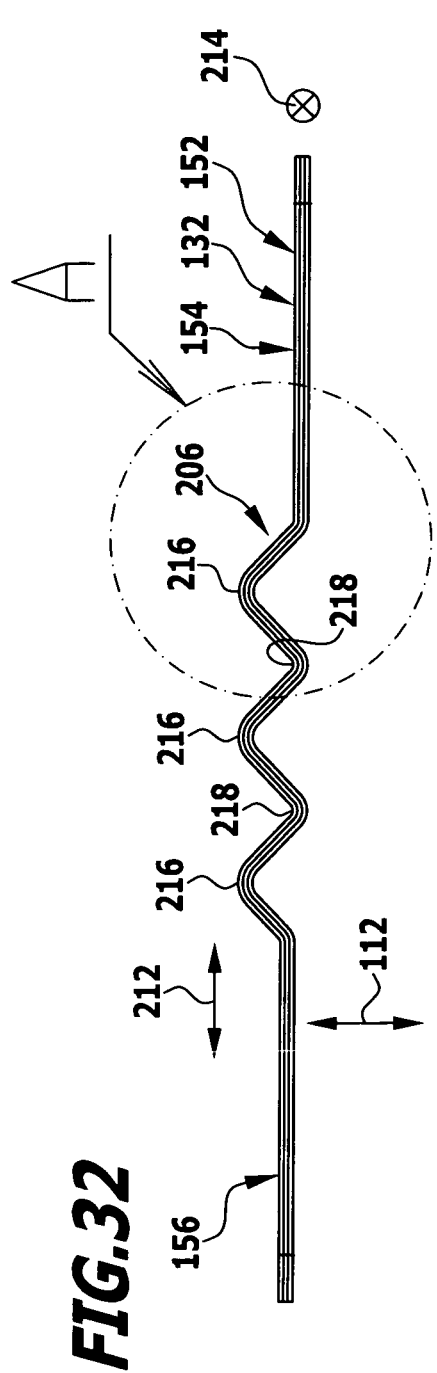
FIG.32
FIG.31

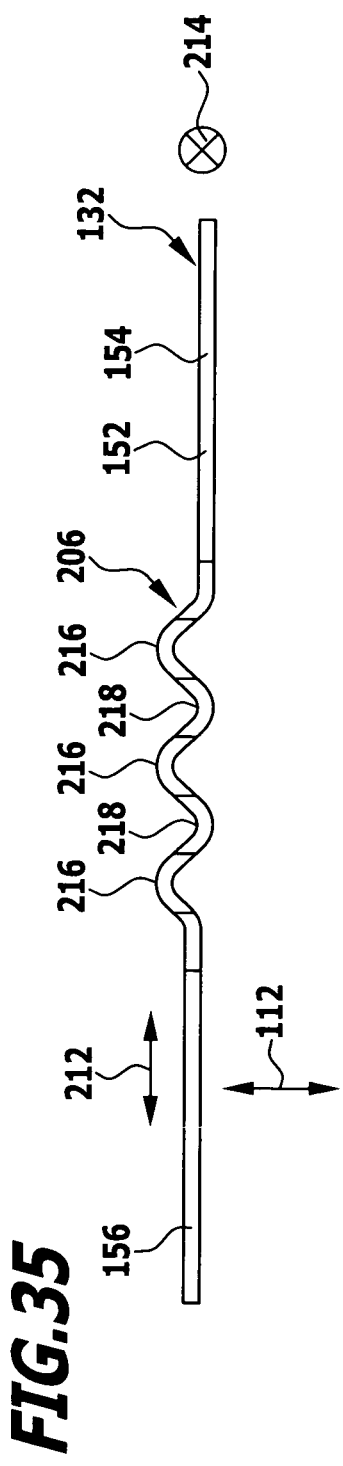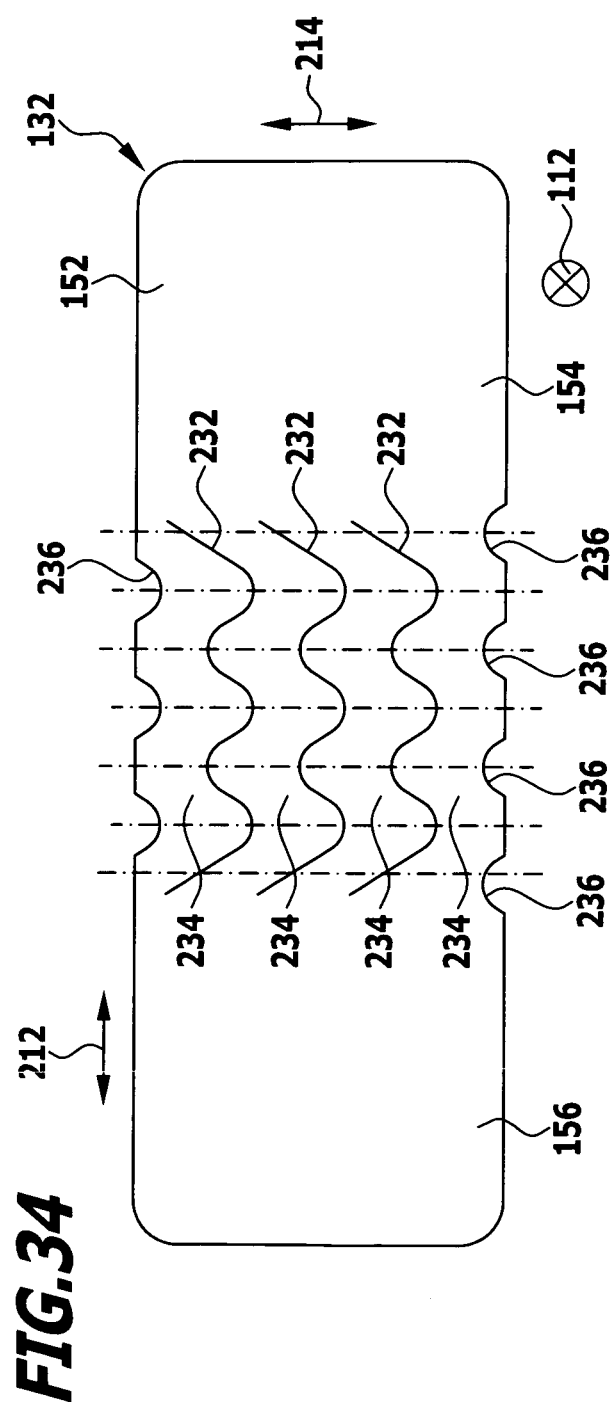
FIG.35
FIG.34

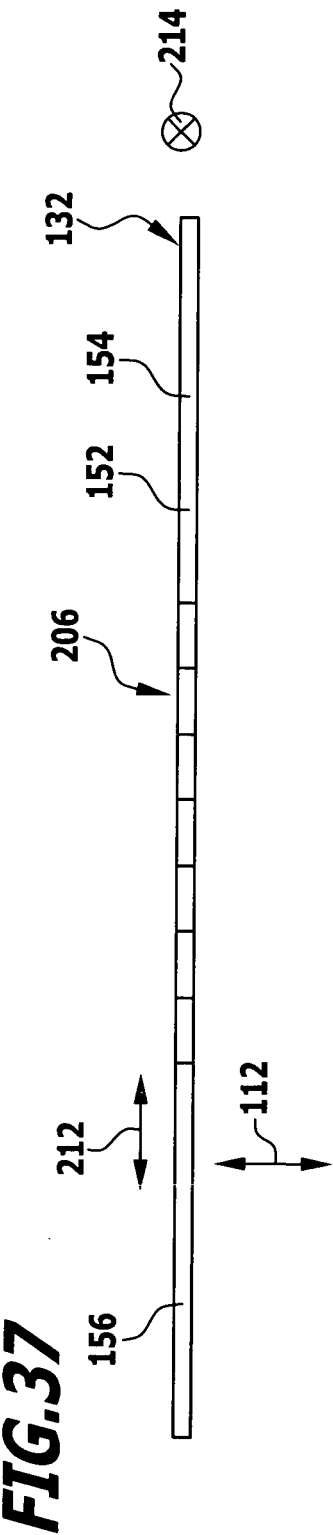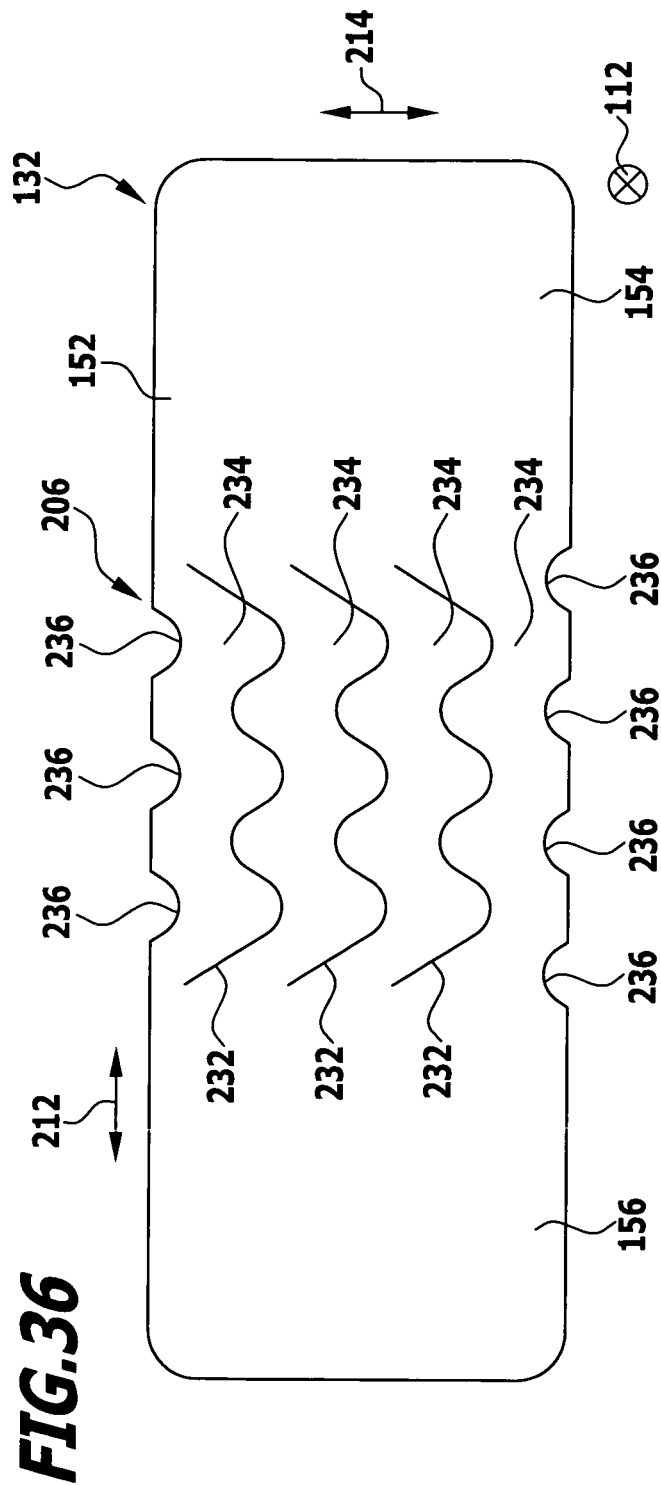

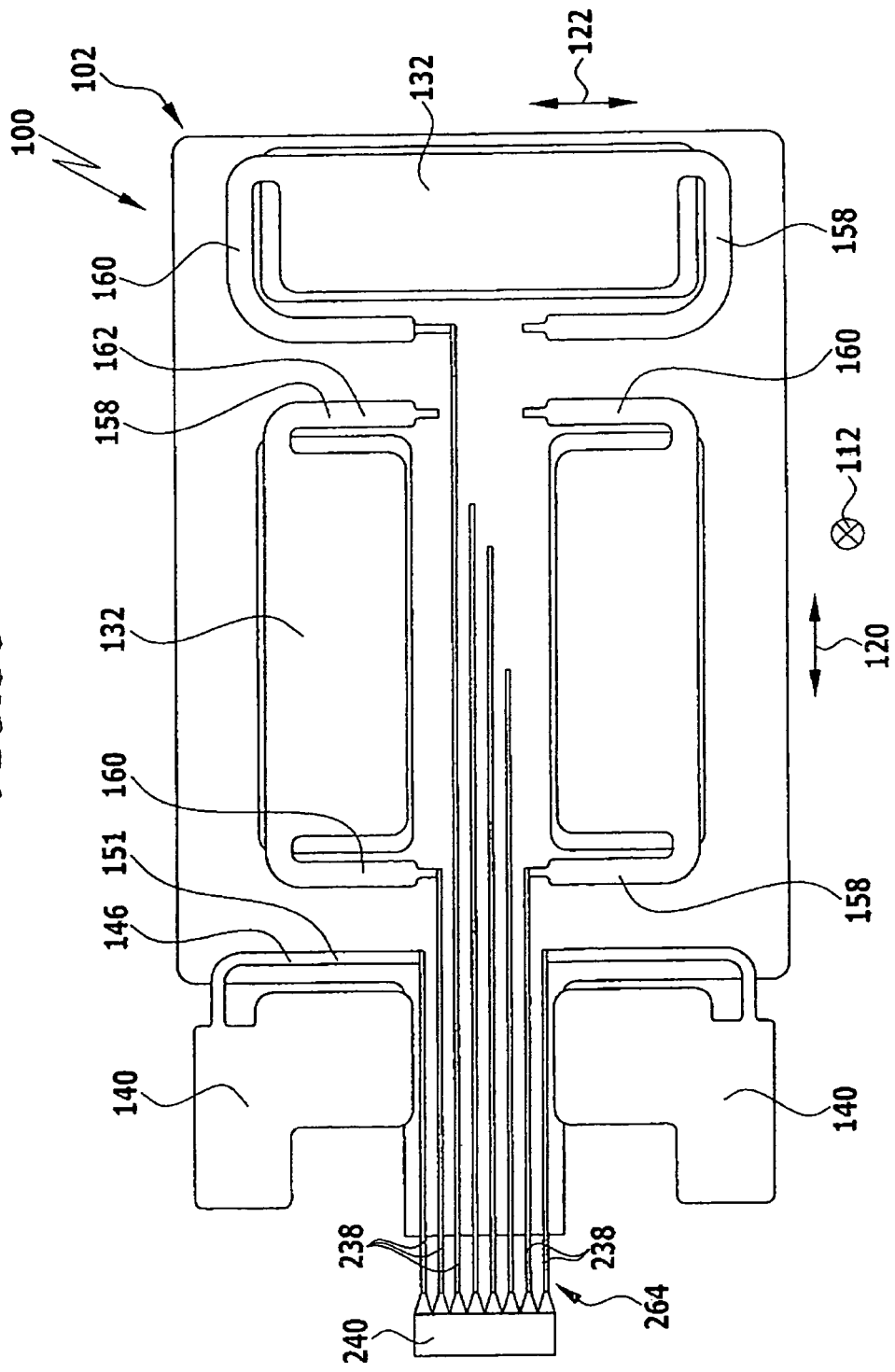

CONNECTING DEVICE

The present invention relates to a connecting device for the electrically conductive connection of a plurality of cell terminals of electro-chemical cells of an electro-chemical device which comprises two or more cell connectors for respectively connecting two cell terminals of different electro-chemical cells to one another in electrically conductive manner.

In particular, such electro-chemical devices can be in the form of electrical batteries such as lithium ion batteries for example.

In the case of a lithium ion battery, the voltage difference between the two cell terminals (poles) of an individual battery cell amounts to approximately 3.6 V. In order to obtain the higher voltage level of e.g. approximately 360 V that is needed for many applications such as in the field of automobile propulsion for example, then many such battery cells (approximately 100 for example) have to be connected electrically in series.

The battery cells or, more generally, the electro-chemical cells can be combined into modules each of which contains a plurality of such electro-chemical cells, whereby the direction of installation of neighbouring cells alternates so that positive and negative cell terminals are located next to each other in alternating manner.

These mutually neighbouring cell terminals of opposite polarity are connected directly together by means of a respective cell connector so as to produce the series connection of the cells. The object of the present invention is to provide a connecting device for an electro-chemical device of the type mentioned hereinabove which enables the cell connectors to be mounted on the electro-chemical cells in a simple and rapid manner.

In accordance with the invention, this object is achieved in the case of a connecting device incorporating the features indicated in the first part of Claim 1 in that, in an assembly state of the connecting device, at least two cell connectors are integrally connected together after separating out the cell connectors from a starting material.

The cell connectors integrally connected together thus form a connector assembly which can be handled as a single entity and conveyed as one entity to the electro-chemical cells that are to be connected to one another. Connecting webs which interconnect the cell connectors of the connector assembly can be removed after the cell connectors have been fixed to the respective cell terminals that are to be connected together.

As an alternative thereto, it is also possible to convey the connector assembly as a single entity to a mounting for the cell connectors and to fix each of the cell connectors separately to this mounting. After the cell connectors have been fixed to the mounting, the connecting webs of the connector assembly which connect the cell connectors together can be removed. Subsequently, the cell connectors held on the mounting can be conveyed as a single entity to the electro-chemical cells that are to be connected to one another and then fixed to the respective cell terminals that are to be connected together.

In the final assembly state of the connecting device and the electro-chemical device, the cell connectors of the connector assembly are normally no longer connected to one another since an electrically conductive connection between different cell connectors is not wanted in the operating state of the electro-chemical device.

If at least one cell connector is integrally connected to a conductive track, then this has the advantage that the cell connectors can be attached in a simple way to a voltage measuring device, a control unit of the electro-chemical device for example, without the need to produce an electrically conductive connection between the cell connectors and a conductive track associated therewith for this purpose.

Furthermore, the present invention thus relates to a connecting device for the electrically conductive connection of a plurality of cell terminals of electro-chemical cells of an electro-chemical device which comprises at least one cell connector for connecting two cell terminals of different electro-chemical cells to one another in electrically conductive manner, wherein at least one cell connector is integrally connected to a conductive track.

In a preferred embodiment of the invention, provision is made for the connecting device to comprise at least one mounting for the cell connectors and for at least two cell connectors to be fixed separately to the same mounting.

Such a mounting can, for example, be in the form of a printed circuit board or a sub-frame of the electro-chemical device.

Hereby, provision may be made for at least one of the cell connectors to be fixed to such a mounting by means of at least one e.g. angular retaining web.

It is expedient, if the retaining web is resiliently and/or plastically deformable in such a way that the position of the cell connector relative to the mounting is adaptable to differing positions of the cell terminals that are to be connected together by the cell connector. The occurrence of excessive mechanical stresses in the installed state of the connecting device is prevented in this way.

In a preferred embodiment of the invention, provision is made for at least one cell connector to be fixed to a mounting or to a plurality of mountings by means of at least two retaining webs.

In order to enable a measurement to be made of the electrical potential of the cell connector and/or a charge equalization between different electro-chemical cells via a cell connector, at least one retaining web can be in the form of an electrical conductor element which is connectable to a control unit of the electro-chemical device.

Furthermore, provision may be made for at least one cell connector to comprise a first contact section for connecting to a first cell terminal, a second contact section for connecting to a second cell terminal and a resiliently and/or plastically deformable compensation region which interconnects the first contact section and the second contact section and enables the contact sections to move relative to each other.

With the aid of such a resiliently and/or plastically deformable compensation region, it is possible to compensate at least partly and preferably substantially completely for a) a difference between a longitudinal expansion of the cell connector on the one hand and a change in the spacing between the longitudinal axes of the cell terminals that are to be connected together by the cell connector on the other and/or b) a difference between a longitudinal expansion of the two electro-chemical cells that are connected to one another by the cell connector.

The connecting device in accordance with the invention is particularly suitable for use in an electro-chemical device which comprises a plurality of electro-chemical cells and a connecting device in accordance with the invention for the electrically conductive connection of a plurality of cell terminals of the electro-chemical cells of the electro-chemical device.

Furthermore, the present invention relates to a method of connecting a plurality of cell terminals of the electro-chemical cells of an electro-chemical device in an electrically conductive manner.

The further object of the present invention is to provide such a method by means of which the cell terminals are connected to one another in a simple and rapid manner when assembling the electro-chemical device.

In accordance with the invention, this object is achieved by a method for the electrically conductive connection of a plurality of cell terminals of electro-chemical cells of an electro-chemical device, which comprises the following method steps:

- separating out from a starting material two or more cell connectors for respectively connecting two cell terminals of different electro-chemical cells to one another in electrically conductive manner, wherein at least two cell connectors are connected together by at least one connecting web;
- separately fixing the cell connectors to a mounting and/or to the respective cell terminals that are to be connected together;
- removing the at least one connecting web between the cell connectors after the cell connector has been fixed to the mounting or to the cell terminals.

If, however, the cell connectors have been fixed to a mounting but not to the respective cell terminals that are to be connected together before removing the at least one connecting web between the cell connectors, then the method in accordance with the invention comprises the following further step:

- connecting the respective cell connectors to two cell terminals of different electro-chemical cells of the electro-chemical device.

In order to enable an electrical contact between a cell connector and a control unit of the electro-chemical device to be established in a simple way, in particular for the purposes of the voltage measurement and/or the charge equalization between different cells, it is expedient if at least one cell connector is connected in electrically conductive manner to a control unit of the electro-chemical device by a conductive track that is integrally connected to the cell connector.

Consequently, the present invention also relates to a method for the electrically conductive connection of a plurality of cell terminals of the electro-chemical cells of an electro-chemical device, which comprises the following method steps:

- separating out from a starting material at least one cell connector for the electrically conductive connection of two cell terminals of different electro-chemical cells to one another and a conductive track for the electrically conductive connection of the cell connector to a control unit of the electro-chemical device, wherein the cell connector is integrally connected to the conductive track;
- connecting the cell connector to two cell terminals of different electro-chemical cells of the electro-chemical device.

Here furthermore, at least one cell connector is preferably connected in electrically conductive manner to a control unit of the electro-chemical device.

In a preferred embodiment of the method in accordance with the invention, provision is made for at least one cell connector to be connected in electrically conductive manner to a control unit of the electro-chemical device by means of a retaining web.

Furthermore, provision may be made for the cell connector to be fixed to a mounting by means of the retaining web.

Furthermore, in a preferred embodiment of the method in accordance with the invention, provision is made for at least one cell connector to be worked, preferably before the connection thereof to the cell terminals, in such a way that there is produced a resiliently and/or plastically deformable compensation region which enables a first contact section of the cell connector for connecting to a first cell terminal and a second contact section of the cell connector for connecting to a second cell terminal to move relative to each other.

By means of the deformable compensation region, it is thereby possible to compensate at least partly and preferably substantially completely for a) a difference between a longitudinal expansion of the cell connector on the one hand and a change in the spacing between the longitudinal axes of the cell terminals that are connected together by the cell connector on the other and/or b) a difference between a longitudinal expansion of the two electro-chemical cells that are connected to one another by the cell connector.

The cell connector of the electro-chemical device in accordance with the invention can use the synergies of different materials and reduce or overcome the disadvantages that are characteristic of the known types of connecting arrangements used for such cell connectors.

The cell connector has a very small electrical specific resistance and the contact resistances which occur at the points of transition between the cell terminals and the cell connectors are very low.

Furthermore, the cell connector has a small mass, is easy to handle and is producible at low cost.

The cell connector can be produced using established manufacturing methods and be securely connected to the cell terminals utilising reliable methods.

The type of connection of the cell connector to the cell terminals ensures good anticorrosive properties for each of the components involved.

Special embodiments of the cell connector and the electro-chemical device in accordance with the invention offer the advantages that a length compensating arrangement for compensating relative movements of the cell terminals relative to each other and/or for the compensation of manufacturing tolerances or differences in the positions of the cell terminals along the axial direction of the cells caused by different linear thermal expansions of the electro-chemical cells are integrated into the cell connectors.

If a length-compensating field is integrated into the cell connector, then the cells connected by the cell connector are not stressed and the longevity thereof is enhanced.

Furthermore, at least one voltage tapping point for monitoring single cells can be integrated into the cell connectors. Hereby, a voltage measuring instrument can be coupled to each of the cell connectors in a simple way.

A plurality of cell connectors can be manufactured together in a composite connector assembly, in the form of stamped, bendable parts for example, and then handled in common until they are fixed to the respectively associated cell terminals. This accelerates the process of assembling the electro-chemical device considerably, since the cell connectors no longer have to be conveyed individually to the cell terminals that are to be connected. The handling costs are thereby significantly lowered.

An improvement in the process is obtained due to the modular construction of the cell connectors.

The present invention makes it possible to produce reliably operating, economical connecting elements for interconnecting individual electro-chemical cells having a high power density and short charging and discharging cycles.

A low-loss direct connection between two electro-chemical cells that is as short as possible is produced by the cell connectors.

The conductivity of the cell connector fulfils the high demands imposed thereon, especially when purely a welding or soldering process is used for joining the cell terminals to the cell connector.

If the electro-chemical device in accordance with the invention is configured as a battery, then it is particularly suitable for use as a high-duty energy source for the drive motor in motor vehicles for example.

Further features and advantages of the invention form the subject matter of the following description and the graphical illustration of exemplary embodiments.

Figure 2:
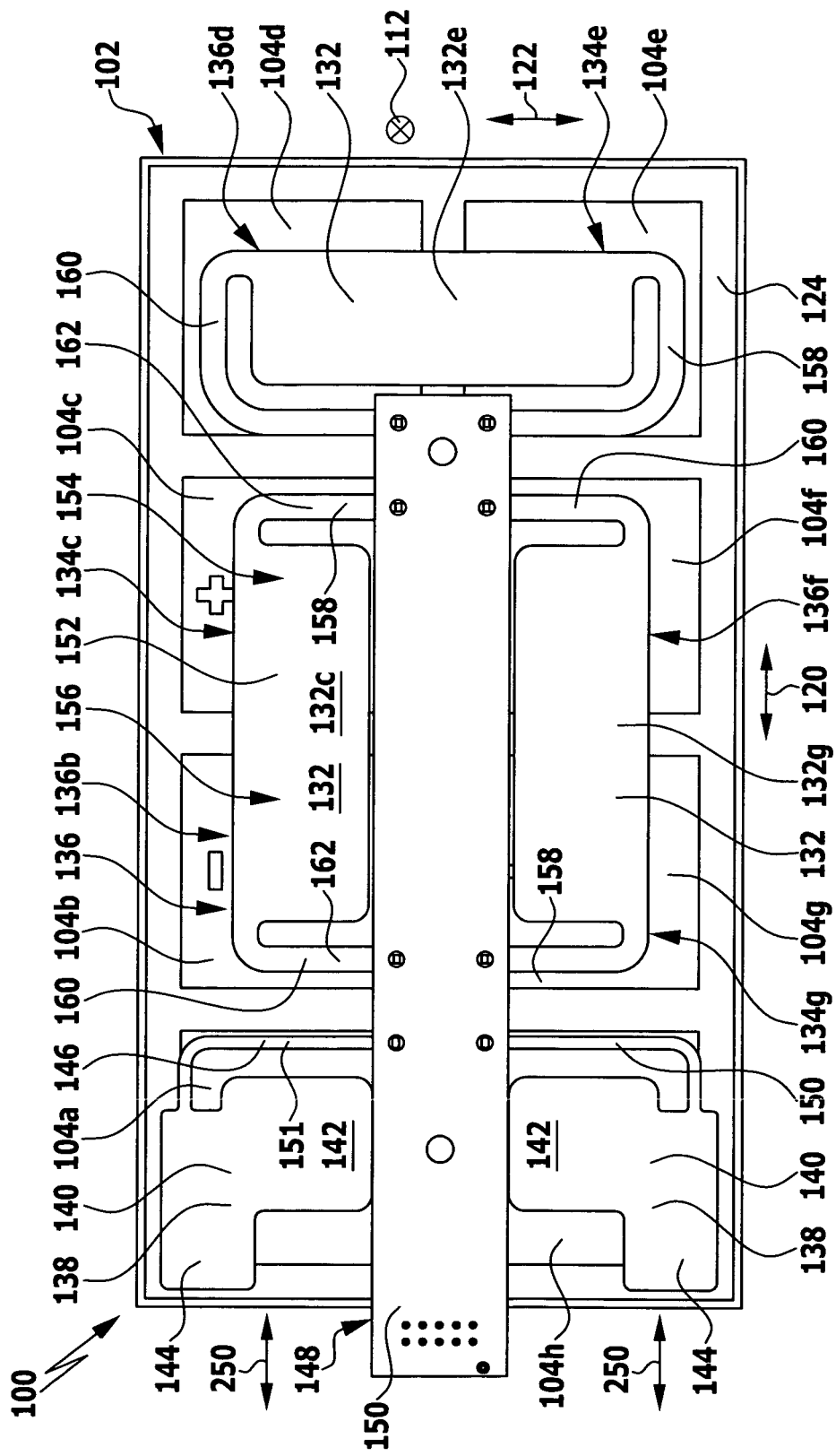
Figure 3:
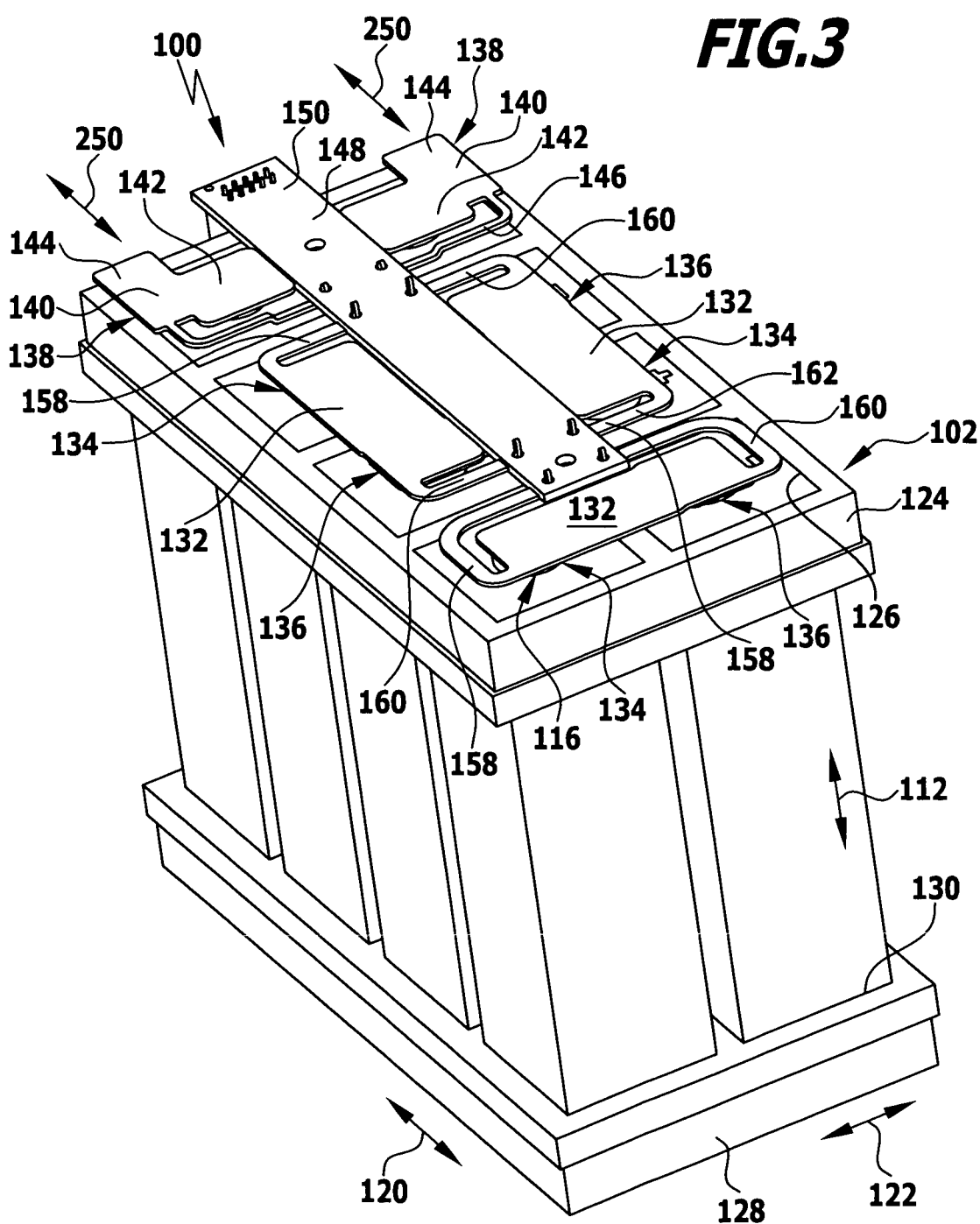
Figure 4:
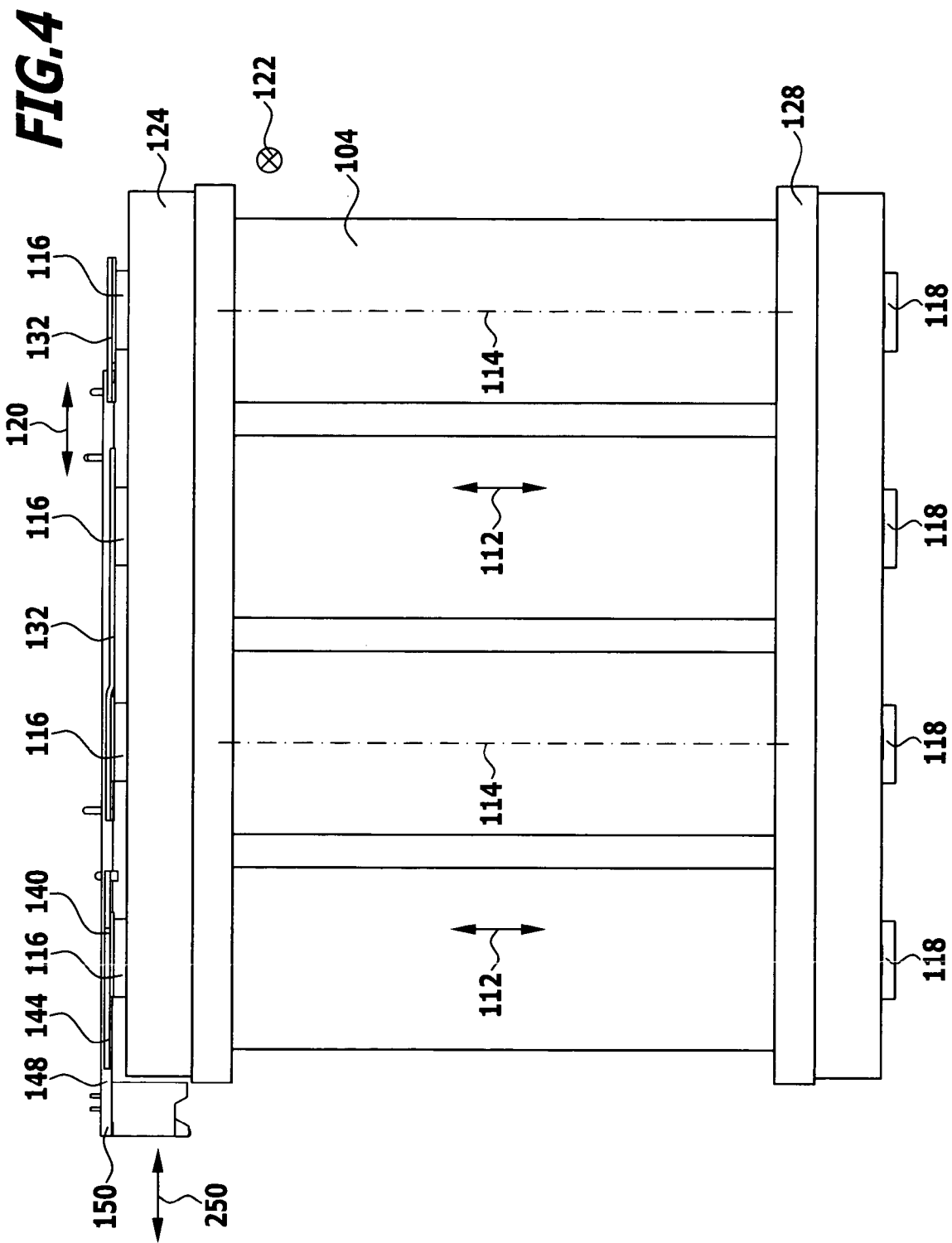
Figure 5:
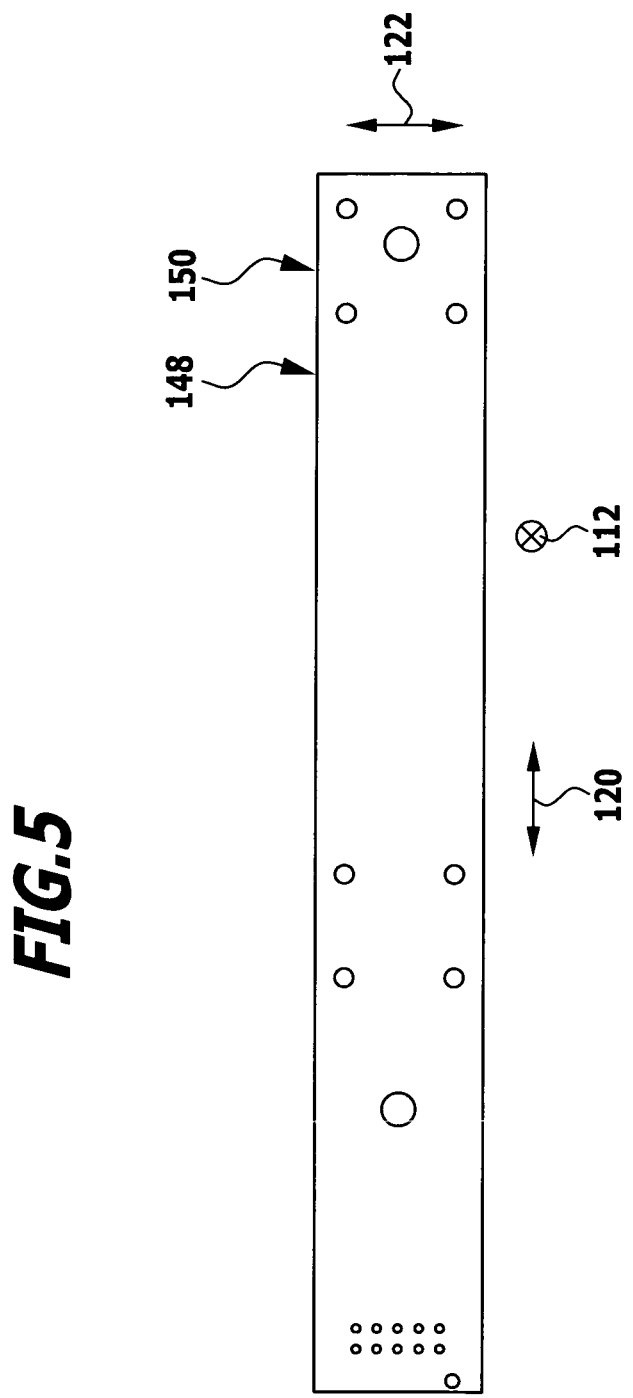
Figure 6:
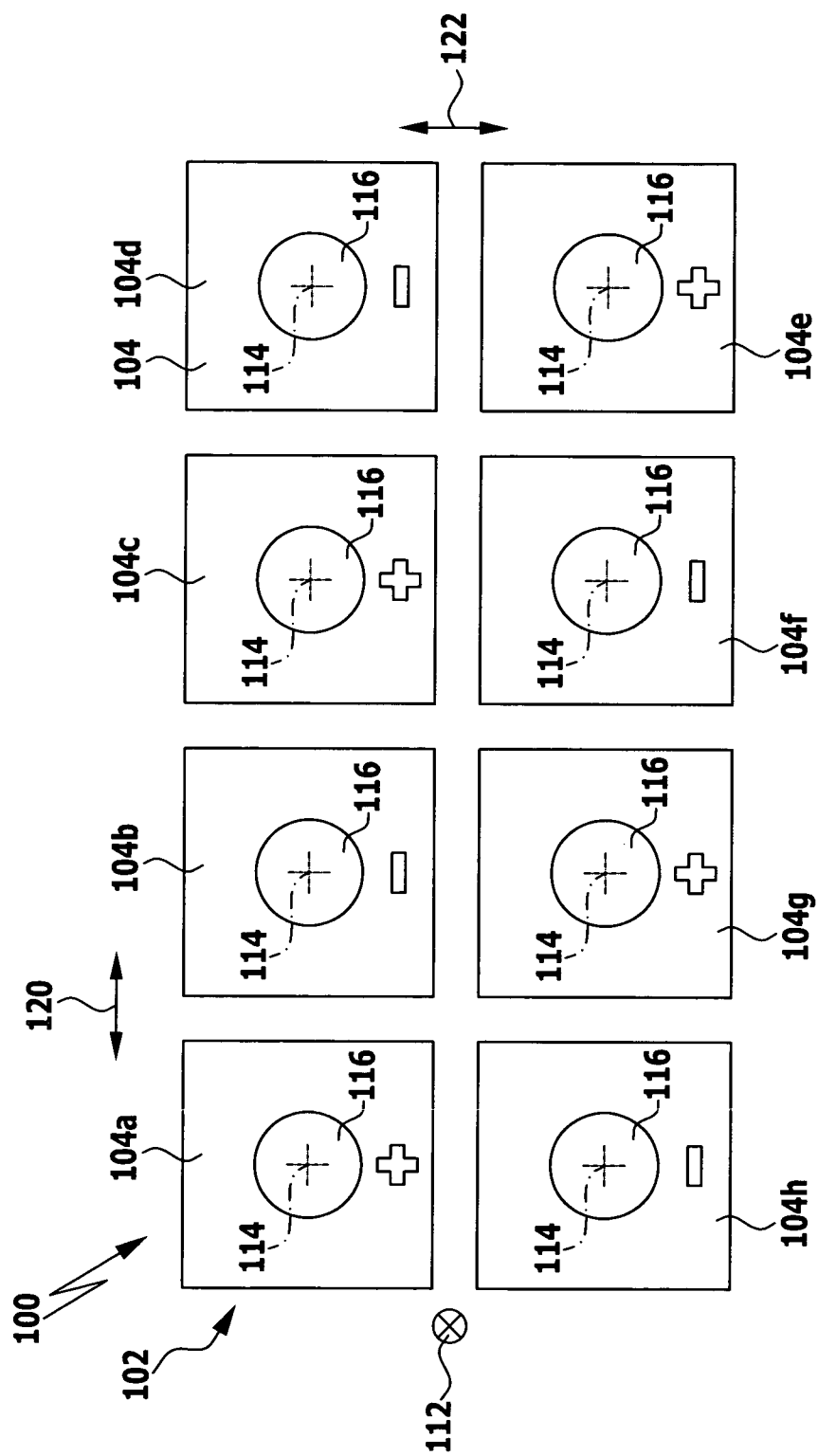
Figure 7:
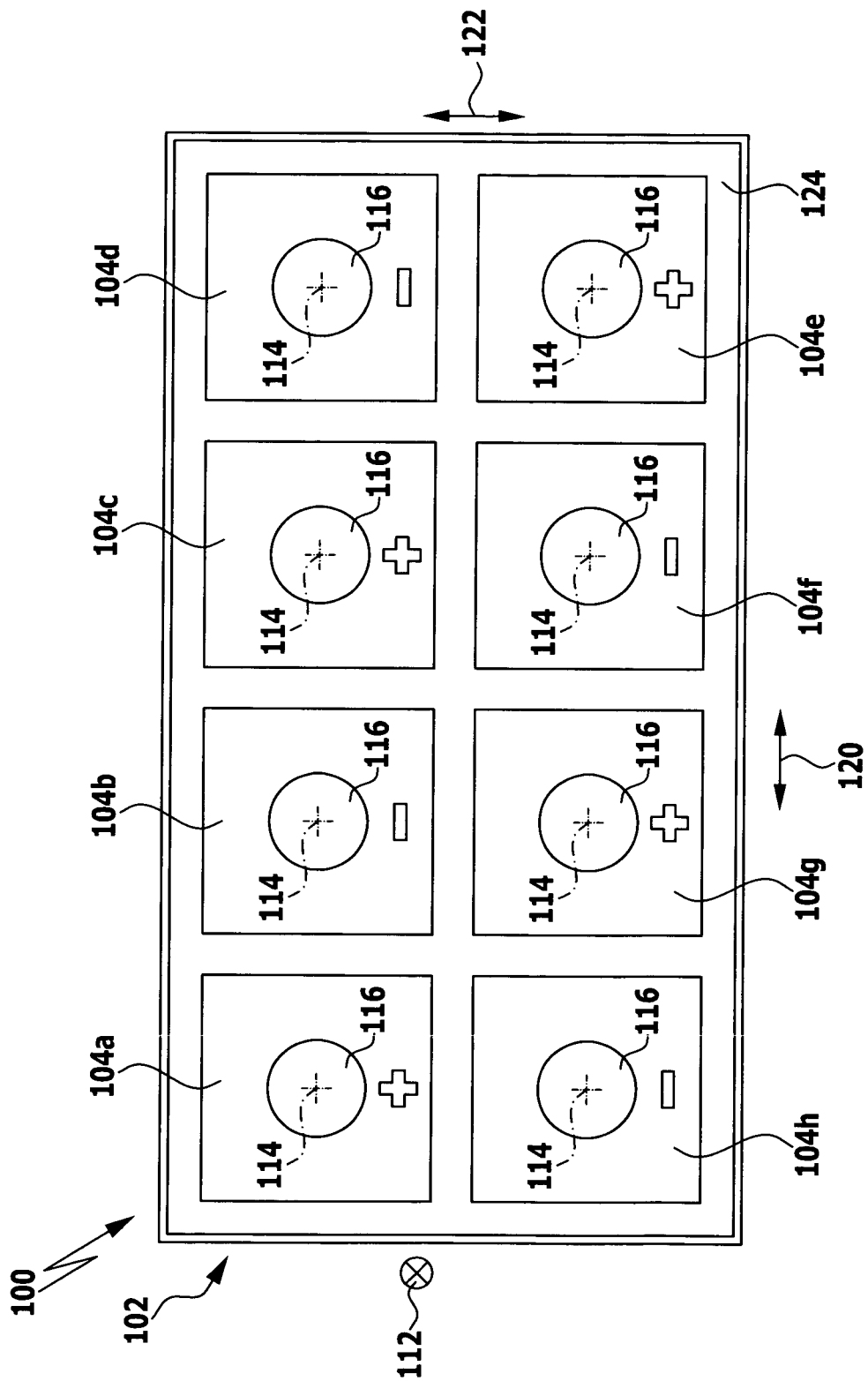
Figure 8:
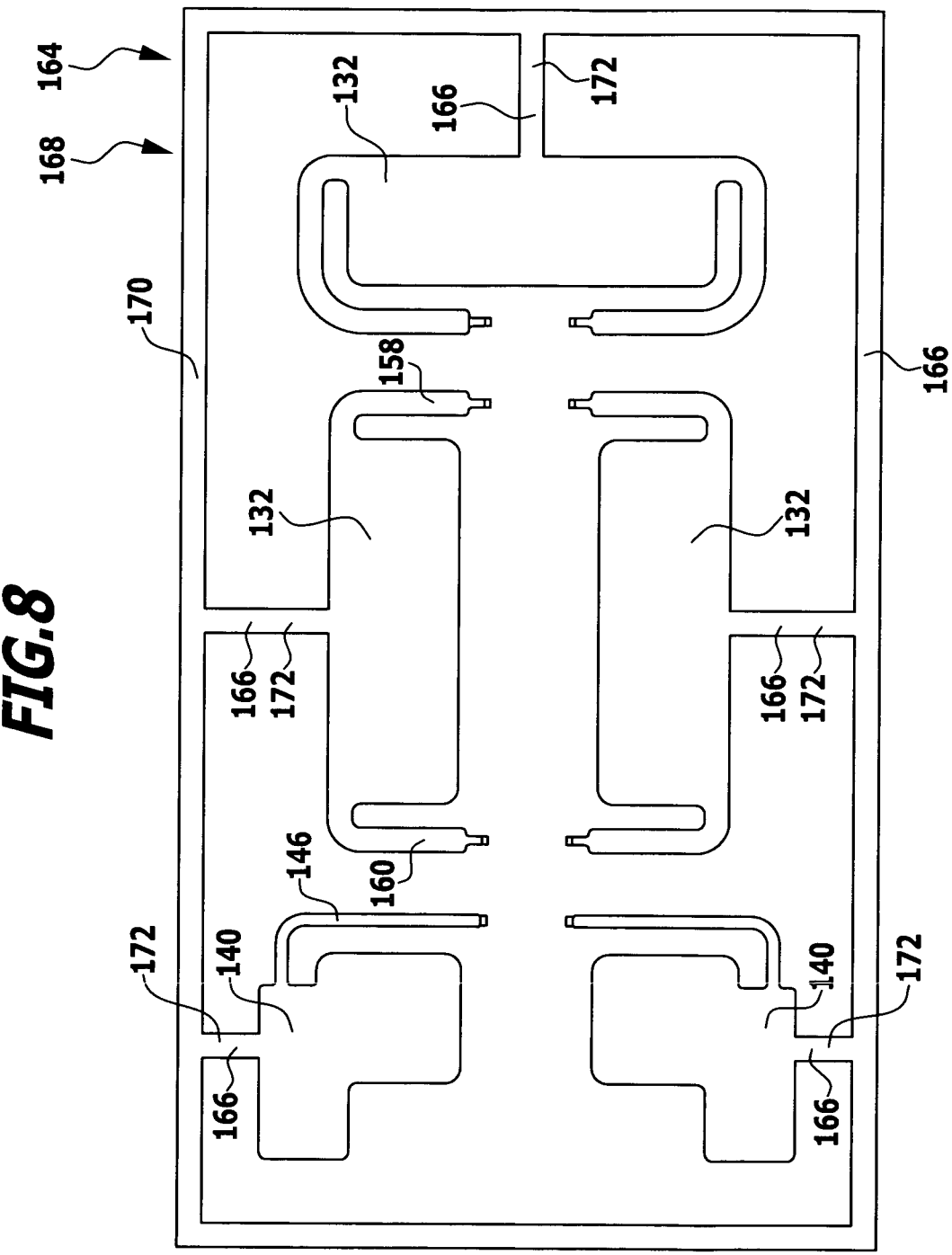
Figure 9:
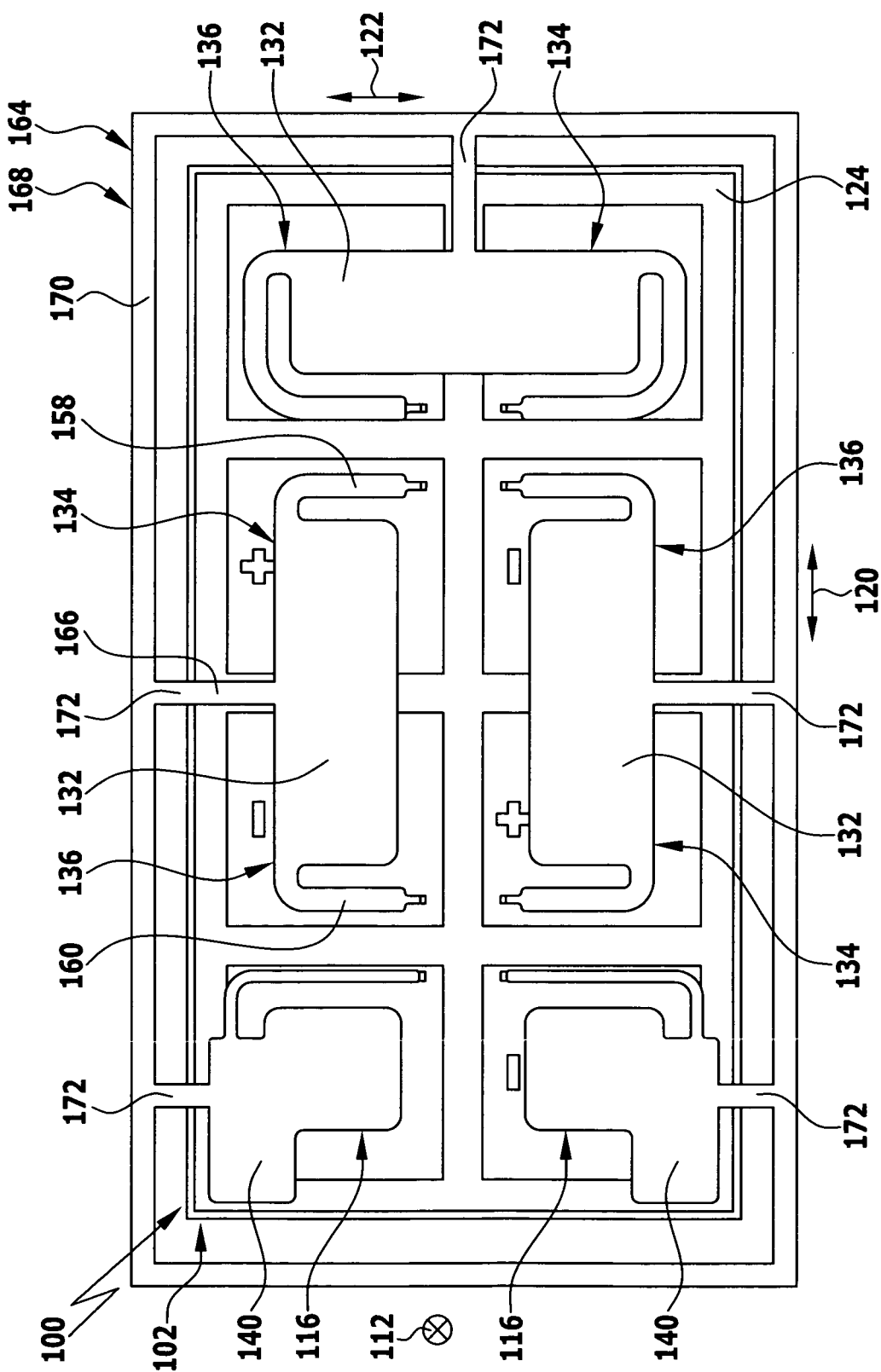
Figure 10:
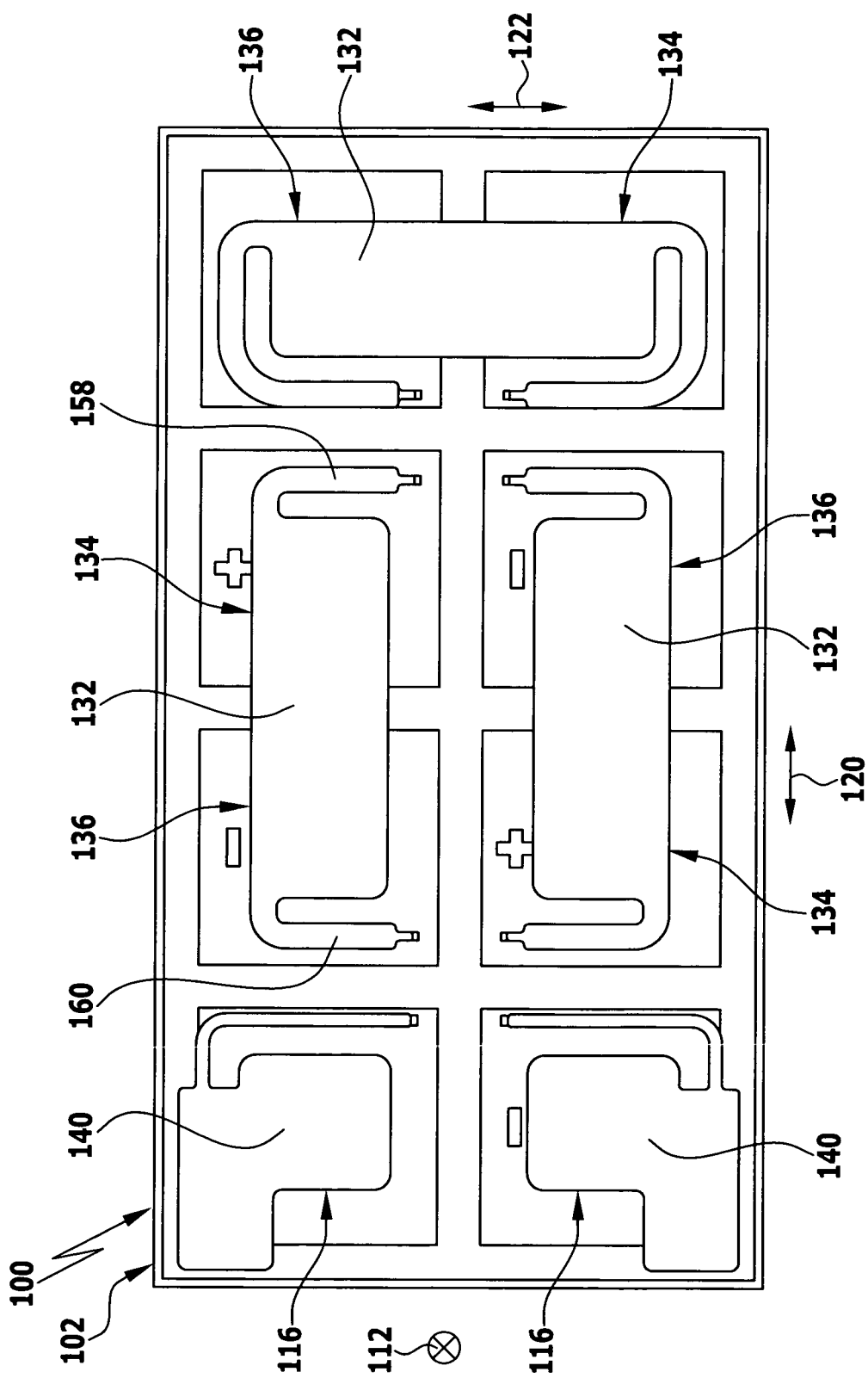
Figure 28:
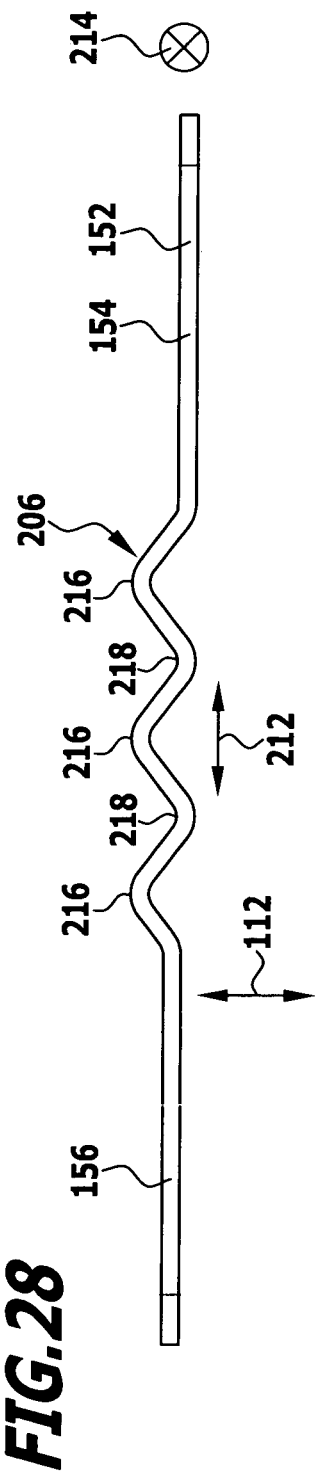
Figure 27:
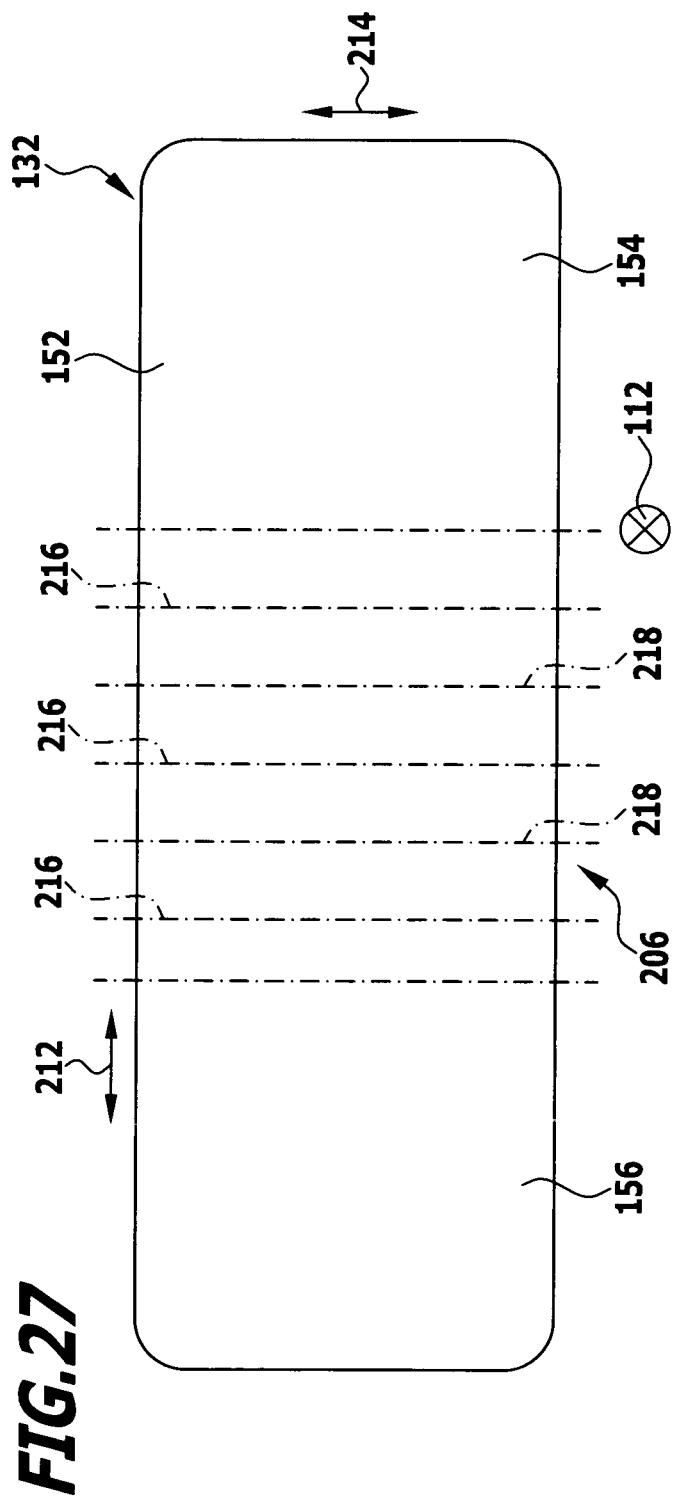
Figure 33:
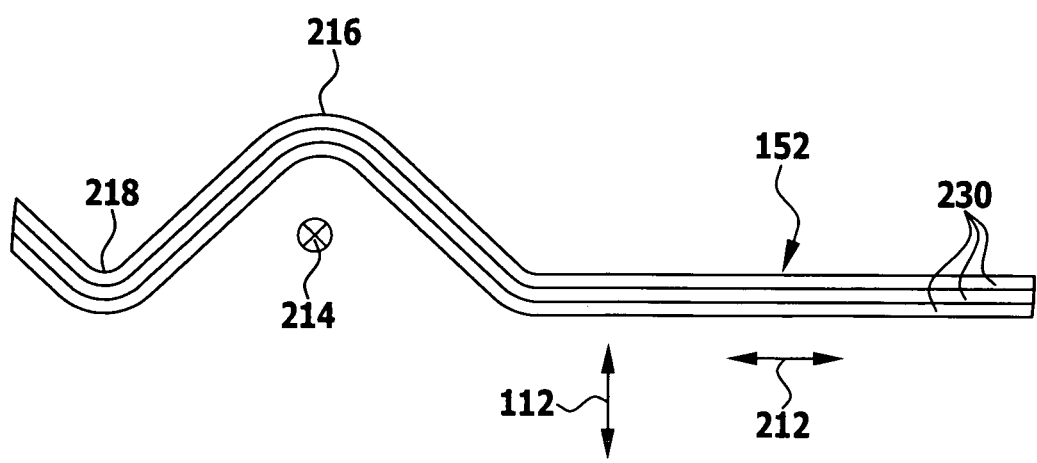
Figure 39:
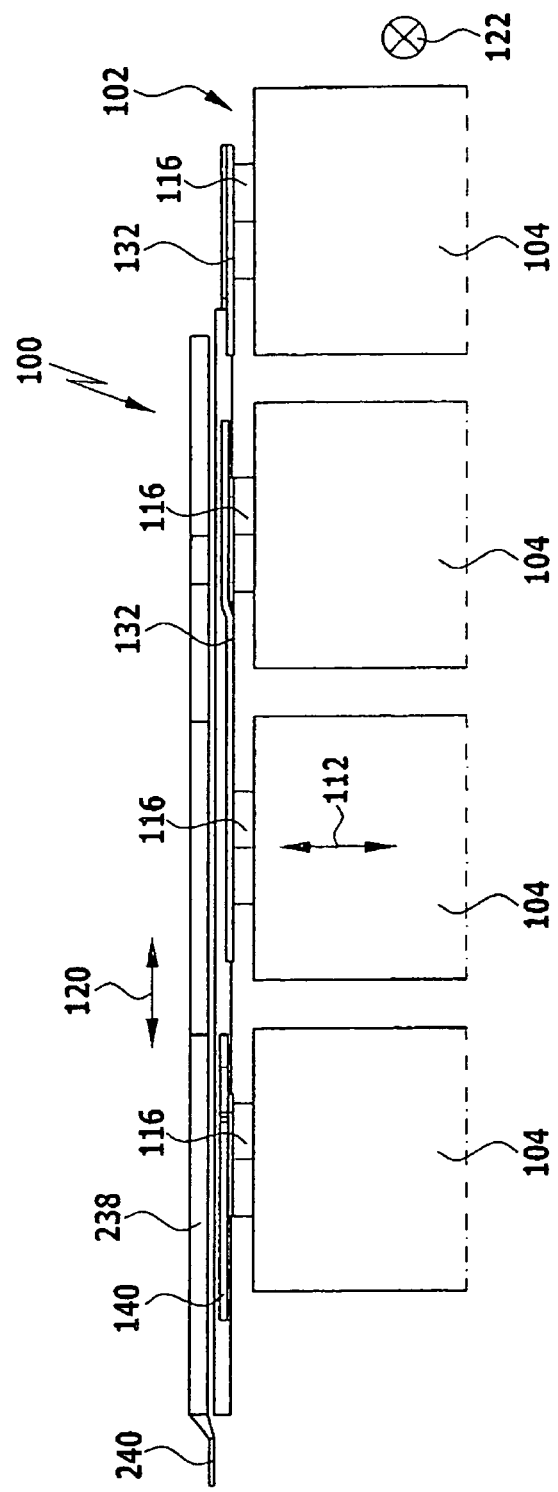
Figure 40:
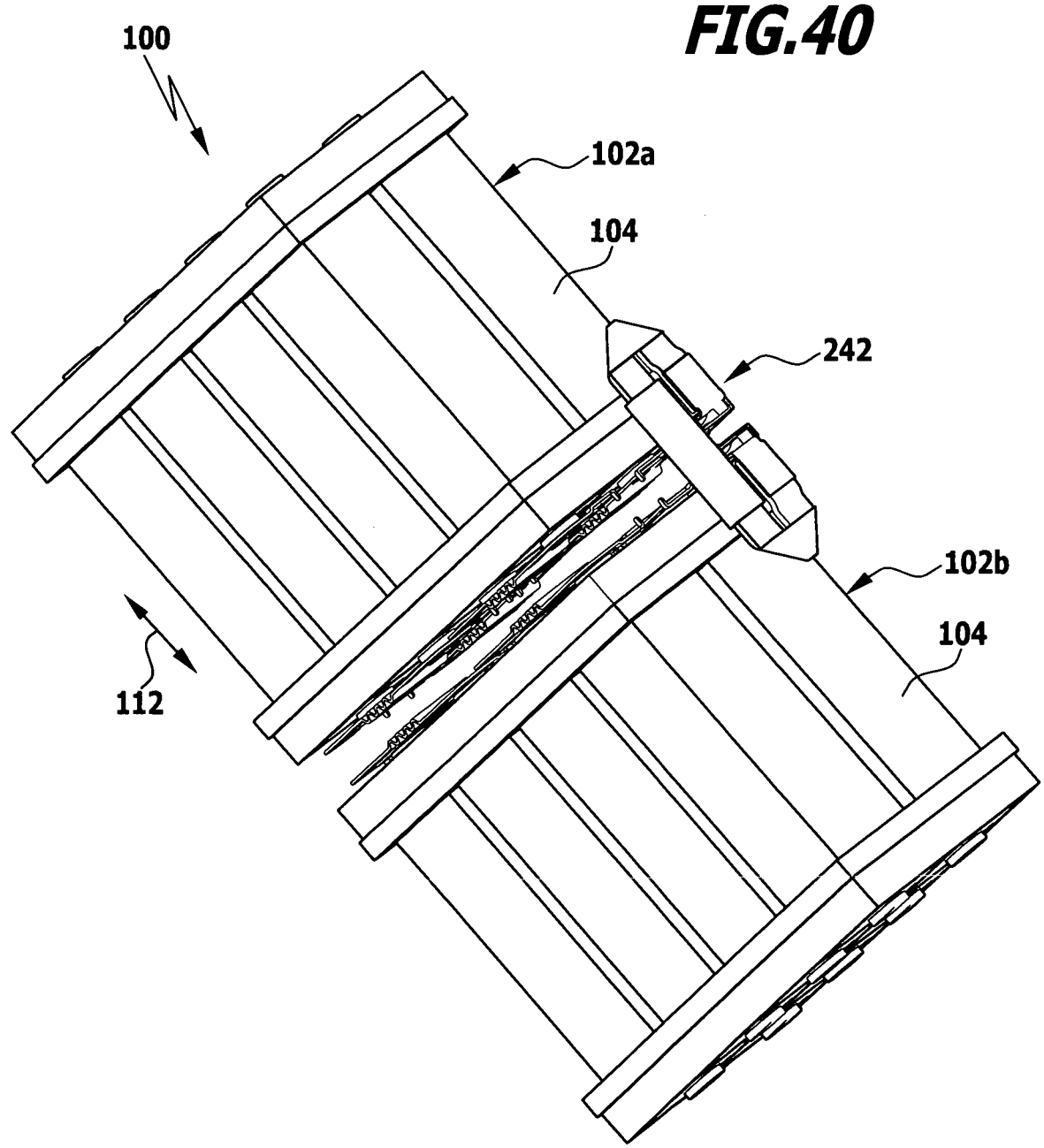
Figure 41:
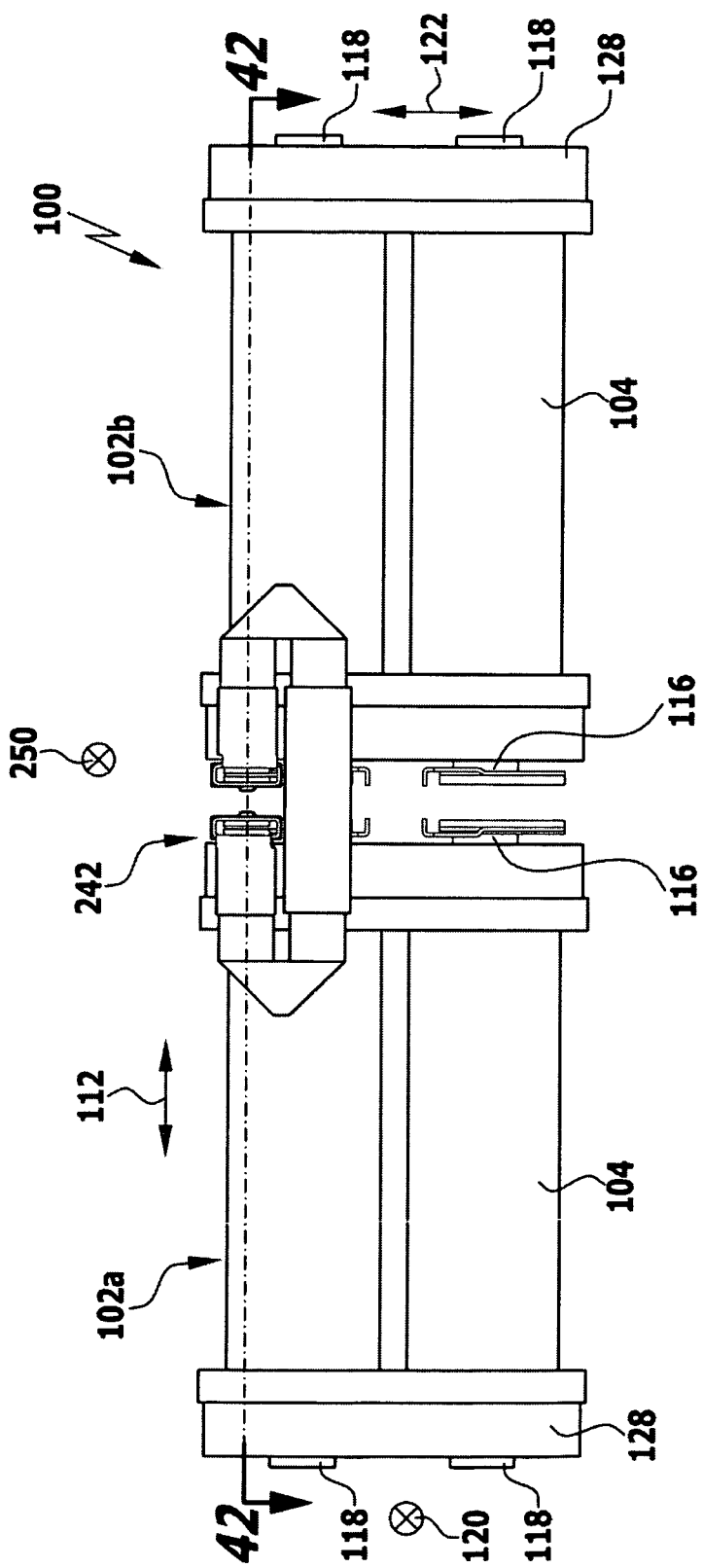
Figure 42:
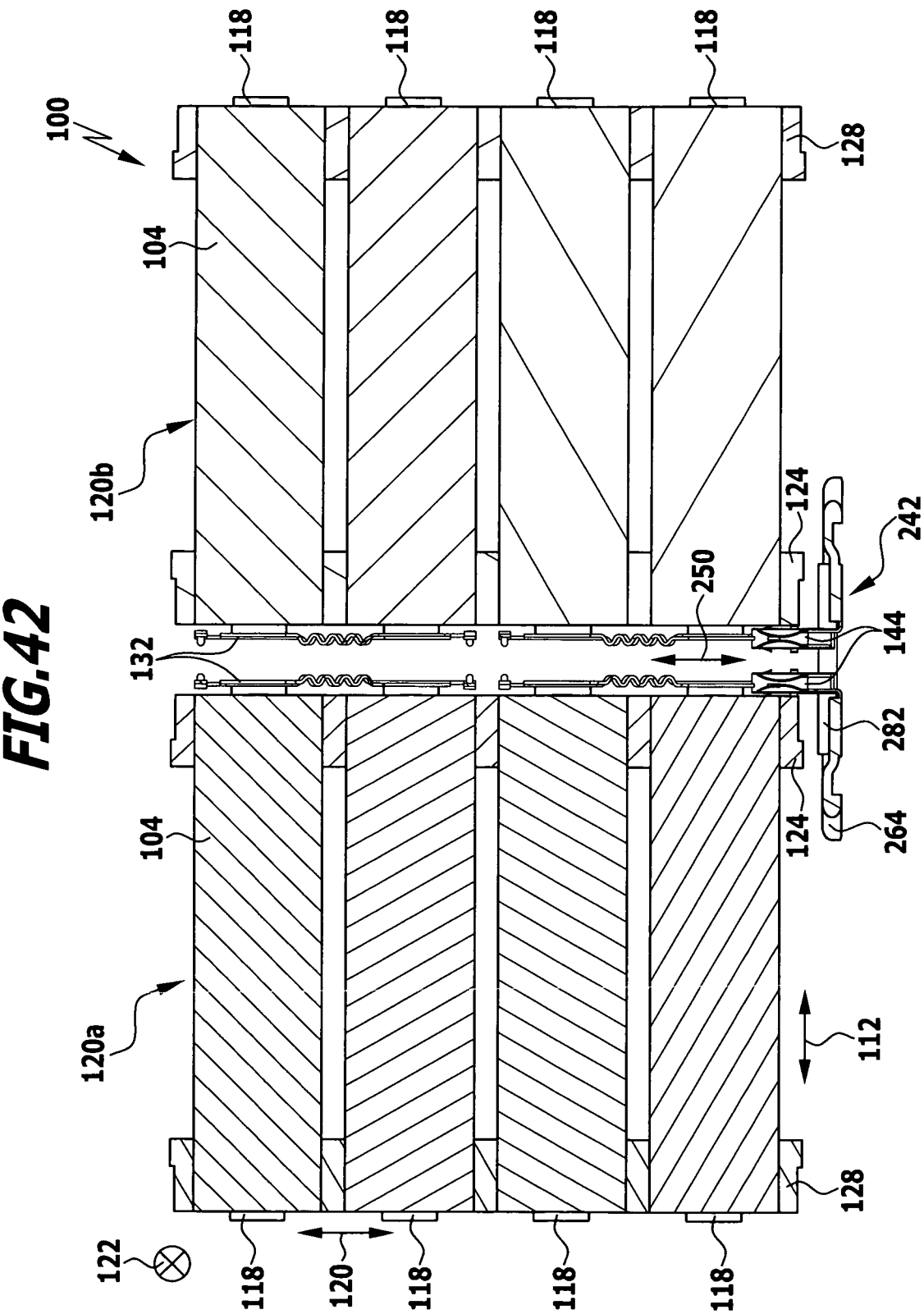
Figure 43:
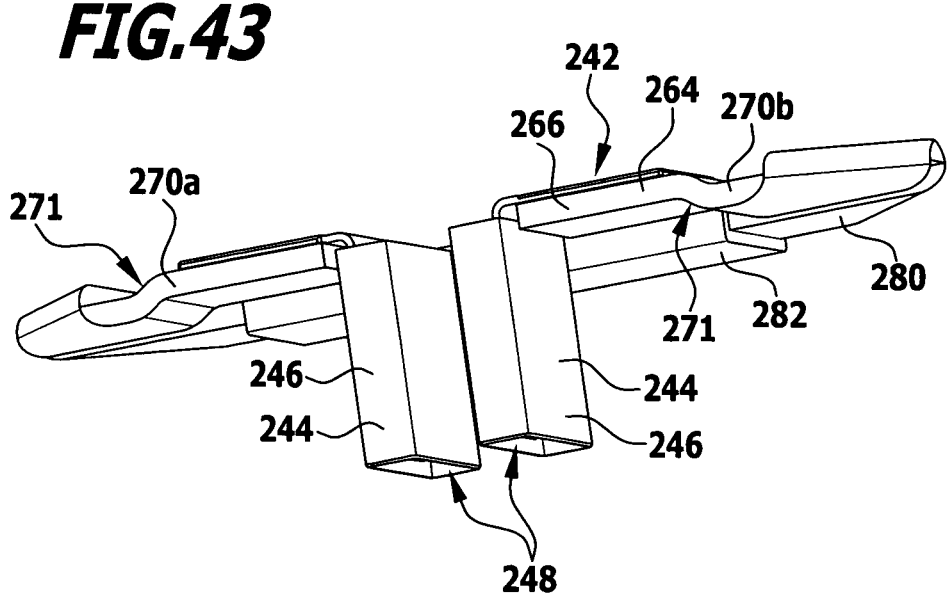
Figure 44:
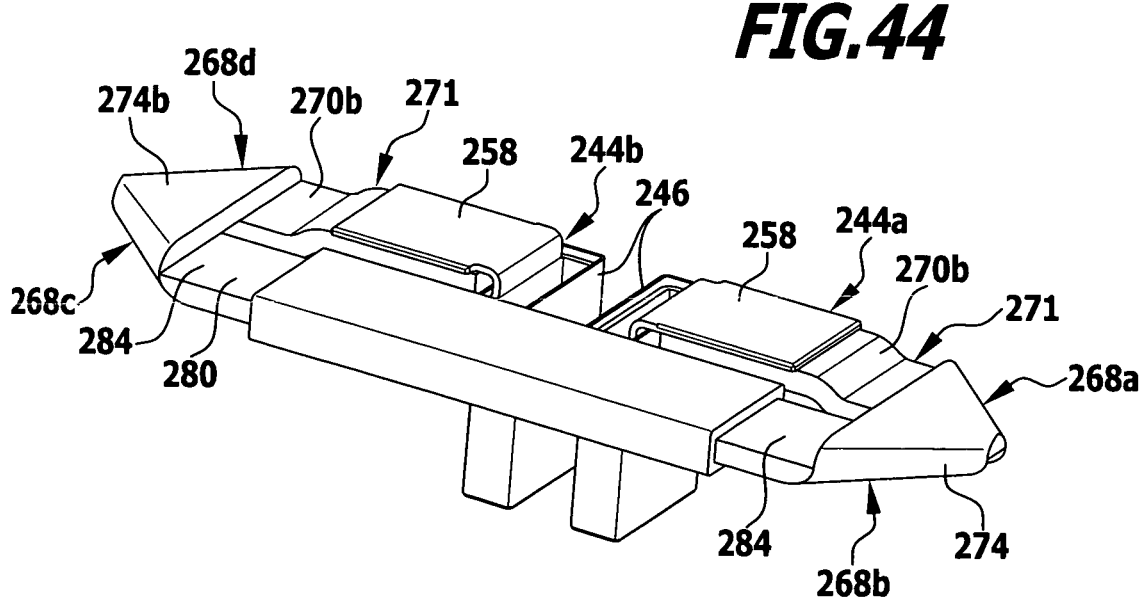
Figure 45:
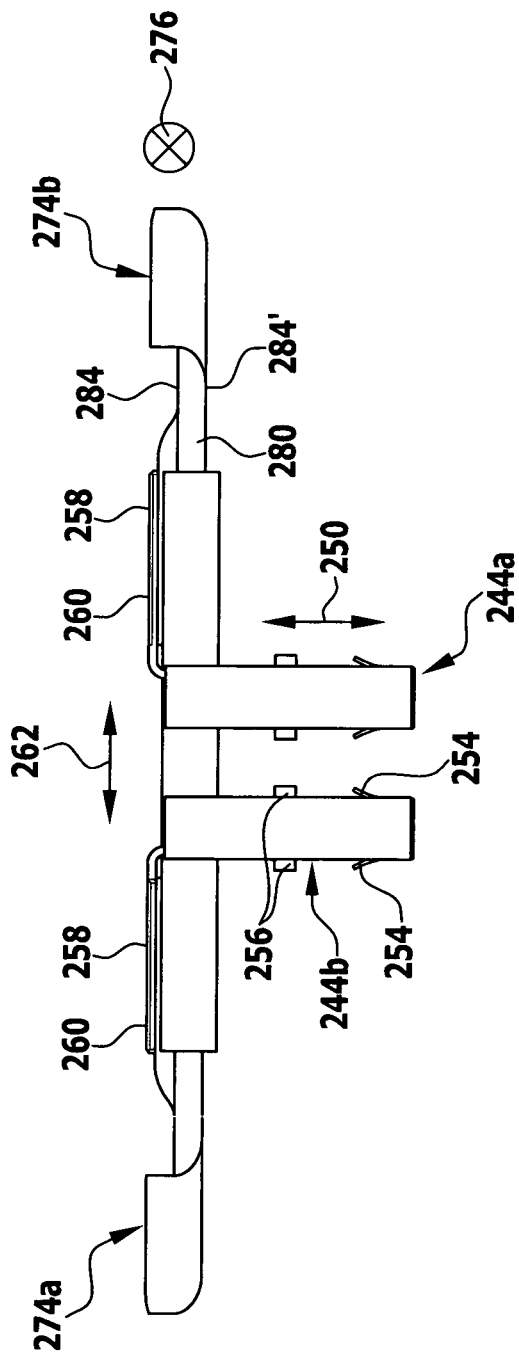
Figure 46:
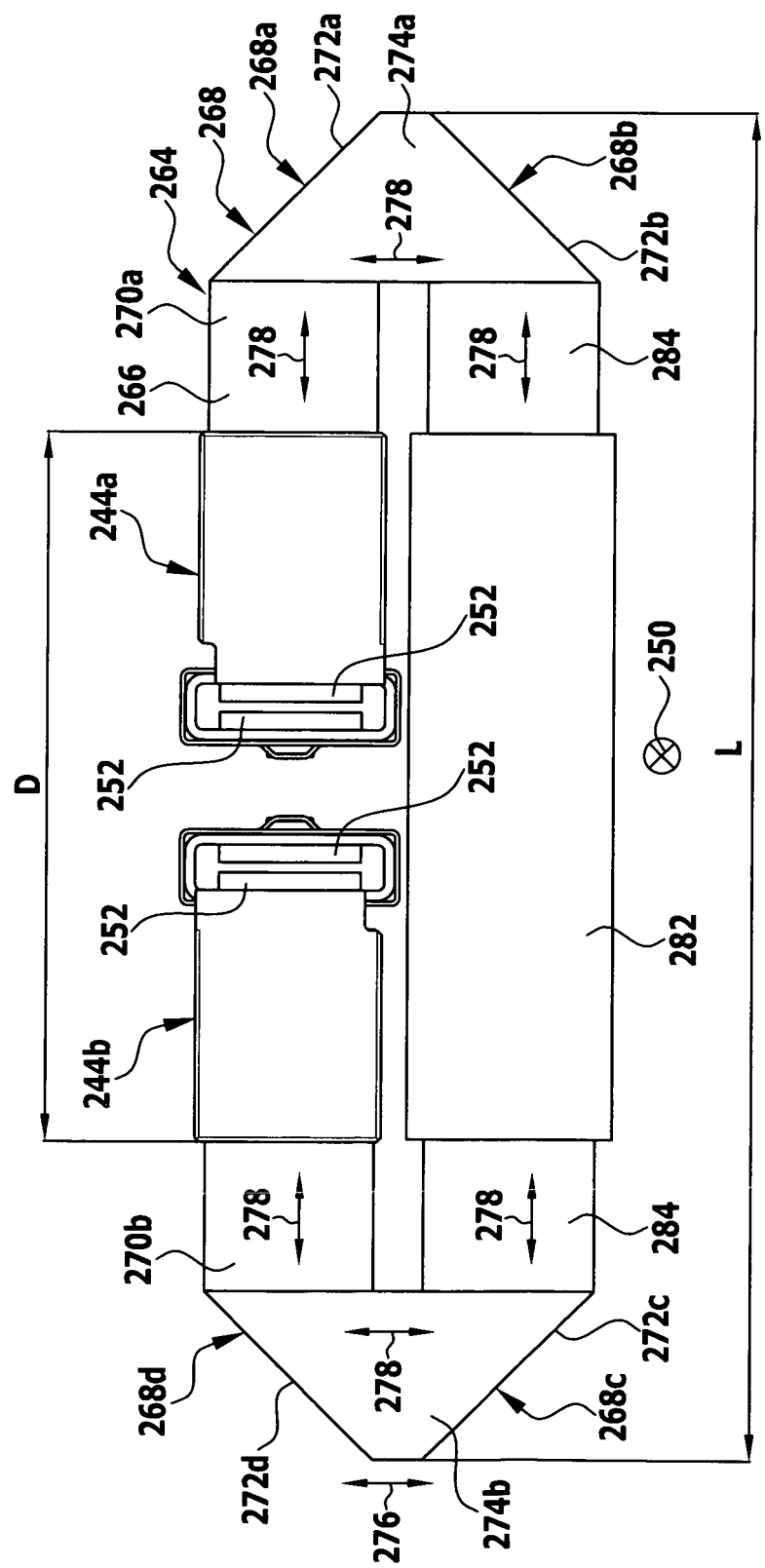
Figure 47:
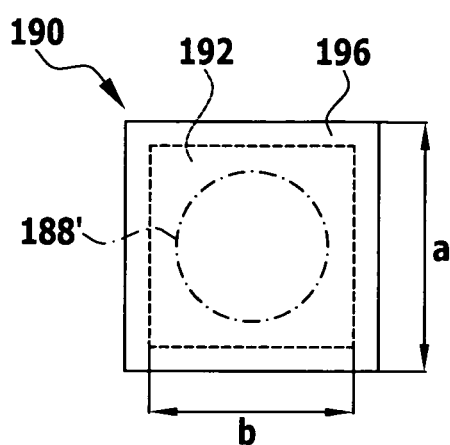
Figure 48:
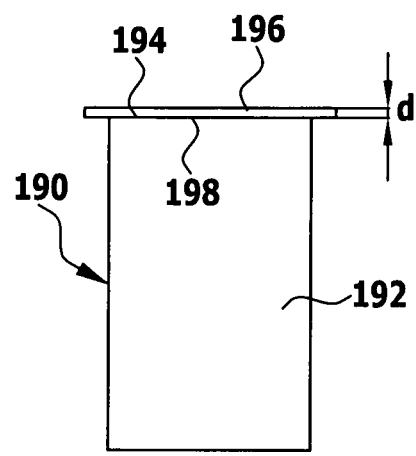
Figure 49:
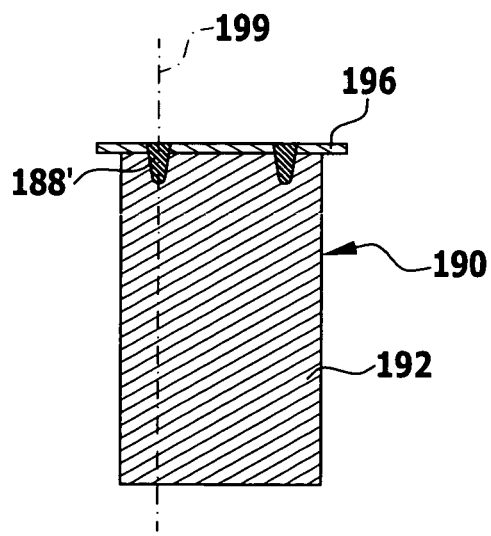
Figure 50:
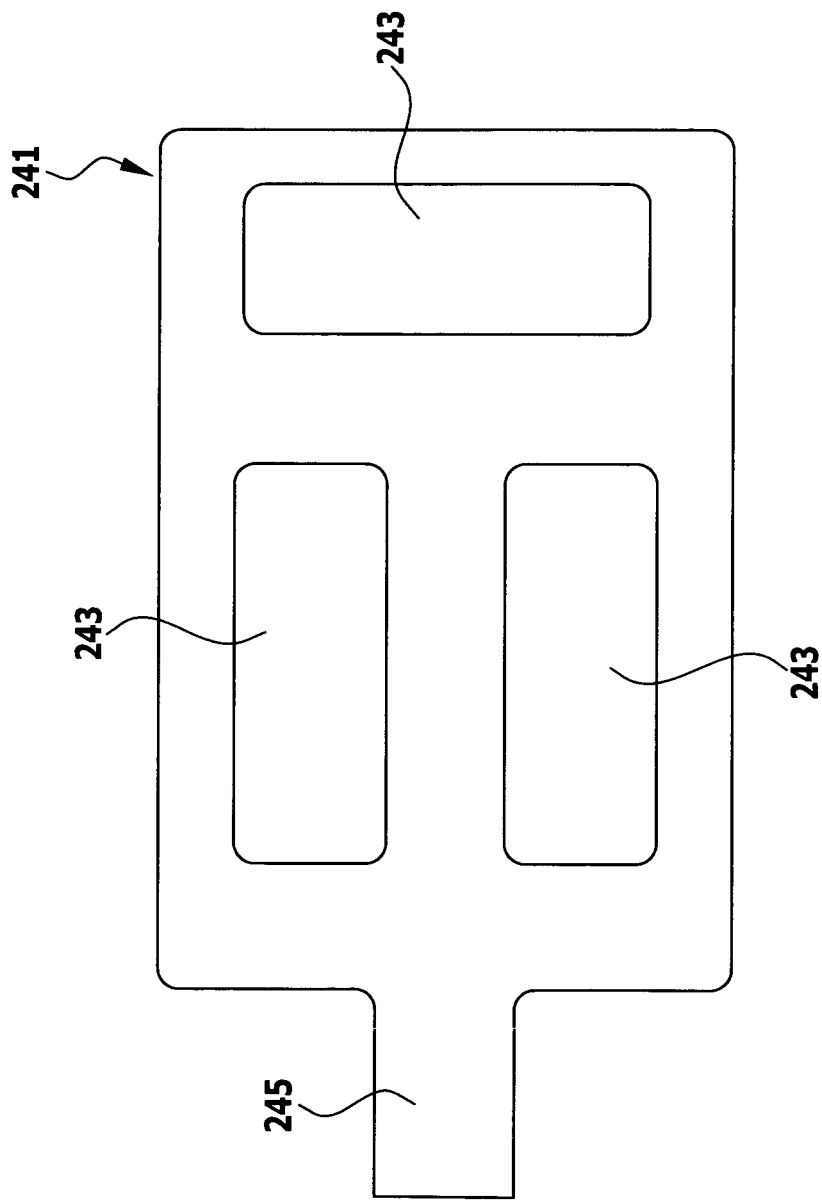

In the drawings:

FIG. 1 shows a schematic perspective illustration of a module of an electro-chemical device which comprises a plurality of e.g. eight electro-chemical cells, a container device for accommodating the cells, a plurality of cell connectors for the electrically conductive connection of the respective cell terminals of two electro-chemical cells, a printed circuit hoard for tapping off the voltage from the cell connectors and electrical terminals for the electrically conductive connection of the module to other modules, to a charging device or to a load;

FIG. 2 a plan view of the front face of the module depicted in FIG. 1;

FIG. 3 a schematic perspective illustration of the module corresponding to FIG. 1 but without the container device;

FIG. 4 a schematic side view of the module without the container device depicted in FIG. 3;

FIG. 5 a schematic plan view of the printed circuit board of the module depicted in FIGS. 1 to 4;

FIG. 6 a schematic plan view of the front cell terminals of the electro-chemical cells of the module;

FIG. 7 a plan view of the front cell terminals of the electro-chemical cells corresponding to FIG. 6 and a mounting frame in which the electro-chemical cells are held;

FIG. 8 a schematic plan view of a group of cell connectors which are separated out together from a starting material and connected together by connecting webs;

FIG. 9 a schematic plan view of the front cell terminals of the module with the cell connectors of the group of cell connectors depicted in FIG. 8 fixed to the cell terminals, wherein the connecting webs between the cell connectors are still present;

FIG. 10 a schematic plan view of the front cell terminals of the module and the cell connectors fixed thereto after the connecting webs between the cell connectors of the group of cell connectors have been removed;

FIG. 11 a schematic sectional view through two electro-chemical cells and a cell connector having a base body which is welded directly to a first cell terminal and is welded indirectly to a second cell terminal via a contact area, wherein the contact area is connected to the base body by an ultrasonic welding process;

FIG. 12 a schematic sectional view through two electro-chemical cells and a cell connector which is welded directly to a first cell terminal and is welded indirectly to a second cell terminal via a contact area, wherein the contact area is connected to the base body along a welding seam by a laser welding process;

FIG. 13 a schematic sectional view through two electro-chemical cells and a cell connector which is connected to a first cell terminal by welding and to a second cell terminal by soldering;

FIG. 14 a schematic plan view of a cell connector which has a deformable compensation region having a wavelike structure, wherein the wavelike structure has an amplitude arranged in parallel with the axial direction of the electro-chemical cells and a plurality of e.g. four wave crests running transversely relative to the axial direction of the electro-chemical cells and a plurality of e.g. three wave troughs running transversely relative to the axial direction of the electro-chemical cells and wherein furthermore, the cell connector comprises retaining webs for connecting the cell connector to the printed circuit board of the module;

FIG. 15 a schematic side view of the cell connector depicted in FIG. 14;

FIG. 16 a schematic side view of the cell connector depicted in FIG. 14 and of the two electro-chemical cells which are connected to one another by means of the cell connector;

FIG. 17 a schematic plan view of an alternative embodiment of a cell connector which has a deformable compensation region that comprises a wavelike structure, wherein the wavelike structure has an amplitude in the axial direction of the electro-chemical cells and a plurality of e.g. three wave crests running transversely relative to the axial direction of the electro-chemical cells and a plurality of e.g. two wave troughs running transversely relative to the axial direction of the electro-chemical cells and wherein furthermore, the cell connector does not have retaining webs;

FIG. 18 a schematic side view of the cell connector depicted in FIG. 17;

FIG. 19 a schematic plan view of an alternative embodiment of a cell connector comprising a deformable compensation region having a half-bead structure which merges into contact areas of the cell connector at kink lines;

FIG. 20 a schematic side view of the cell connector depicted in FIG. 19;

FIG. 21 a schematic plan view of an alternative embodiment of a cell connector comprising a deformable compensation region which has a wavelike structure, wherein the wavelike structure has an amplitude in the axial direction of the electro-chemical cells and a wave crest extending transversely relative to the axial direction of the electro-chemical cells and a wave trough extending transversely relative to the axial direction of the electro-chemical cells;

FIG. 22 a schematic side view of the cell connector depicted in FIG. 21;

FIG. 23 a schematic plan view of an alternative embodiment of a cell connector comprising a deformable compensation region which has a wavelike structure, wherein the wavelike structure has an amplitude in the axial direction of the electro-chemical cells and a plurality of e.g. two wave crests extending transversely relative to the axial direction of the electro-chemical cells and a wave trough extending transversely relative to the axial direction of the electro-chemical cells;

FIG. 24 a schematic side view of the cell connector depicted in FIG. 23;

FIG. 25 a schematic plan view of an alternative embodiment of a cell connector comprising a deformable compensation region which has a zigzag structure, wherein the zigzag structure has a plurality of e.g. five kink lines running transversely relative to the axial direction of the electro-chemical cells;

FIG. 26 a schematic side view of the cell connector depicted in FIG. 25;

FIG. 27 a schematic plan view of an alternative embodiment of a cell connector comprising a deformable compensation region which has a wavelike structure, wherein the wavelike structure has an amplitude in the axial direction of the electro-chemical cells and a plurality of e.g. three wave crests extending transversely relative to the axial direction of the electro-chemical cells and a plurality of e.g. two wave troughs extending transversely relative to the axial direction of the electro-chemical cells;

FIG. 28 a schematic side view of the cell connector depicted in FIG. 27;

FIG. 29 a schematic plan view of an alternative embodiment of a cell connector comprising a deformable compensation region which has a wavelike structure, wherein the wavelike structure has an amplitude in the axial direction of the electro-chemical cells and a plurality of e.g. four wave crests extending transversely relative to the axial direction of the electro-chemical cells and a plurality of e.g. three wave troughs extending transversely relative to the axial direction of the electro-chemical cells;

FIG. 30 a schematic side view of the cell connector depicted in FIG. 29;

FIG. 31 a schematic plan view of an alternative embodiment of a cell connector comprising a deformable compensation region which has a wavelike structure, wherein the wavelike structure has an amplitude in the axial direction of the electro-chemical cells and a plurality of e.g. three wave crests extending transversely relative to the axial direction of the electro-chemical cells and a plurality of e.g. two wave troughs extending transversely relative to the axial direction of the electro-chemical cells, wherein a base body of the cell connector is in the form of a laminate consisting of a plurality of e.g. three layers or material sheets which are arranged one above the other;

FIG. 32 a schematic side view of the cell connector depicted in FIG. 31;

FIG. 33 an enlarged illustration of the region A depicted in FIG. 32;

FIG. 34 a schematic plan view of an alternative embodiment of a cell connector comprising a deformable compensation region which has a wavelike structure, wherein the wavelike structure has an amplitude in the axial direction of the electro-chemical cells and a plurality of e.g. three wave crests extending transversely relative to the axial direction of the electro-chemical cells and a plurality of e.g. two wave troughs extending transversely relative to the axial direction of the electro-chemical cells and wherein the compensation region is sub-divided by a plurality of e.g. three wave-shaped slits into a plurality of e.g. four wave-shaped webs which are arranged next to each other in a direction running transversely relative to the axial direction of the electro-chemical cells, wherein the wave shape of the slits and the wave shape of the webs have an amplitude transverse to the axial direction of the electro-chemical cells;

FIG. 35 a schematic side view of the cell connector depicted in FIG. 34;

FIG. 36 a schematic plan view of an alternative embodiment of a cell connector comprising a deformable compensation region which is substantially flat, but is sub-divided by a plurality of e.g. three wave-shaped slits into a plurality of e.g. four wave-shaped webs, wherein the wave shape of the slits and the wave shape of the webs have an amplitude transverse to the axial direction of the electro-chemical cells;

FIG. 37 a schematic side view of the cell connector depicted in FIG. 36;

FIG. 38 a schematic plan view of a plurality of cell connectors which are each formed in one piece with a respective conductive track for tapping off the voltage from the cell connectors;

FIG. 39 a schematic side view of the cell connector assembly depicted in FIG. 38, wherein the cell connectors are arranged on the cell terminals of the electro-chemical cells of the module;

FIG. 40 a schematic perspective illustration of two modules of the electro-chemical device, wherein an electrical terminal of a first module is connected by a module connector to an electrical terminal of a second module;

FIG. 41 a schematic side view of the two modules with the module connector depicted in FIG. 40, in the form of a view of a narrow side of the modules;

FIG. 42 a schematic longitudinal section through the two modules and the module connector depicted in FIG. 41, along the line 42-42 in FIG. 41;

FIG. 43 a schematic perspective illustration of the module connector depicted in FIGS. 40 to 42, as seen from the side thereof facing the electrical terminals of the modules;

FIG. 44 a schematic perspective illustration of the module connector depicted in FIGS. 40 to 42, as seen from the side thereof remote from the electrical terminals of the modules;

FIG. 45 a schematic side view of the module connector depicted in FIGS. 43 and 44;

FIG. 46 a schematic plan view of the module connector depicted in FIGS. 43 to 45, with a view towards the side of the module connector remote from the electrical terminals of the modules;

FIG. 47 a schematic plan view of a test-sample body for the determination of the corrosion resistance of a welding seam between a cell terminal and a cell connector;

FIG. 48 a schematic side view of the test-sample body depicted in FIG. 47;

FIG. 49 a schematic longitudinal section through the test-sample body depicted in FIGS. 47 and 48;

FIG. 50 a schematic plan view of a sub-frame for holding cell connectors; and

Figure 51:
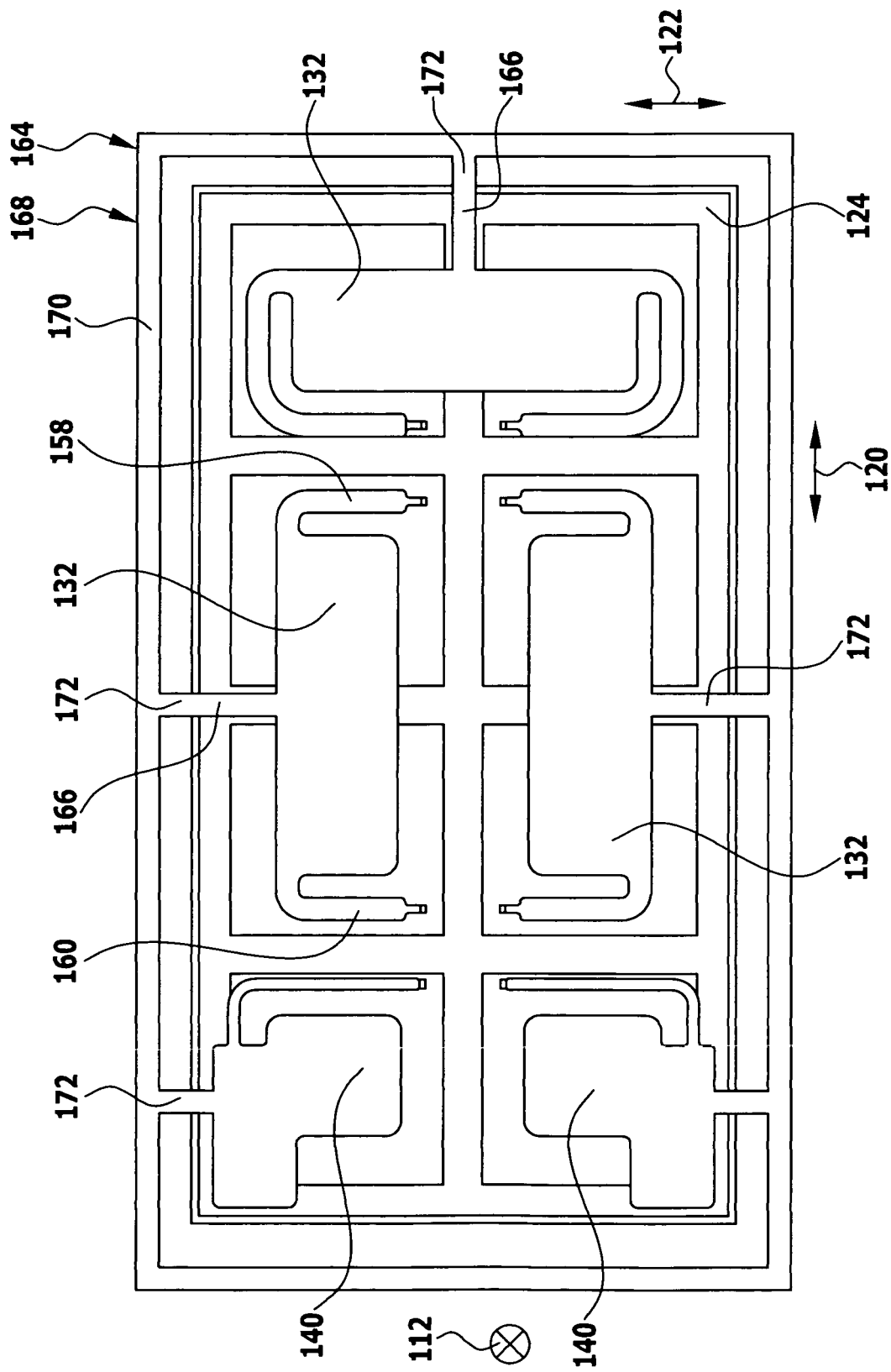

FIG. 51 a schematic plan view of a mounting frame of the module with a connector assembly held thereon.

Similar or functionally equivalent elements are designated by the same reference symbols in each of the Figures.

An electro-chemical device bearing the general reference 100 comprises a plurality of electro-chemical modules 102, of which one is illustrated as a whole in exemplary manner in FIGS. 1 to 4. Each of the modules 102 comprises a plurality of e.g. eight electro-chemical cells 104 which are each accommodated in a seating 106 of a container device 108 of the module 102.

This container device 108 can, in particular, be formed as a heat sink 110 which is in heat conductive contact with the electro-chemical cells 104 accommodated therein in order to remove the heat from the electro-chemical cells 104 during the operation of the electro-chemical device 100.

The container device 108 is preferably formed of a good heat conducting material such as aluminium or an aluminium alloy for example.

As can best be seen from FIGS. 3 and 4 which illustrate the module 102 without the container device 108, the electro-chemical cells 104 are arranged and oriented in the container device 108 surrounding them in such a way that the axial directions 112 of the electro-chemical cells 104, which run parallel to the central longitudinal axes 114 of the electro-chemical cells 104, are oriented such as to be substantially parallel with one another.

As can best be seen from FIG. 4, each of the electro-chemical cells 104 extends from a front cell terminal 116 (illustrated above in FIG. 4) in the respective axial direction 112 up to a rear cell terminal 118 (illustrated below in FIG. 4), wherein each cell terminal forms a positive pole or a negative pole of the electro-chemical cell 104 in each case.

Here, the central longitudinal axes 114 of the electro-chemical cells 104 are at the same time central longitudinal axes of the cell terminals 116, 118 of the respective electro-chemical cells 104.

Mutually neighbouring electro-chemical cells 104 in the module 102 are oriented in such a way that the cell terminals of two neighbouring cells that are located on the same side of the module have mutually opposite polarities.

This is made clear hereinafter with the aid of FIG. 6 which shows the polarities of the, e.g. eight front cell terminals 116 of the eight electro-chemical cells 104 of a module 102.

Herein, the front cell terminal 116 of the electro-chemical cell 104a forms a positive pole of the particular electro-chemical cell 104a, whilst the front cell terminal 116 of the electro-chemical cell 104b neighbouring the electro-chemical cell 104a in a first transverse direction 120 of the module 102 forms a negative pole of the electro-chemical cell 104b.

Accordingly, the front cell terminal 116 of the electro-chemical cell 104c following the electro-chemical cell 104b in the first transverse direction 120 forms a positive pole of the electro-chemical cell 104c and the front cell terminal 116 of the electro-chemical cell 104d following the electro-chemical cell 104c in the first transverse direction 120 forms a negative pole of the electro-chemical cell 104d.

The front cell terminal 116 of the module 102 of the electro-chemical cell 104e that follows the electro-chemical cell 104d in a second transverse direction 122, which is oriented perpendicularly with respect to the first transverse direction 120 of the module 102 and perpendicularly with respect to the axial directions 112 of the electro-chemical cells 104, forms a positive pole of the electro-chemical cell 104e. The front cell terminal 116 of the electro-chemical cell 104f following the electro-chemical cell 104e in the first transverse direction 120 forms a negative pole of the electro-chemical cell 104f, whilst the front cell terminal 116 of the electro-chemical cell 104g following the electro-chemical cell 104f in the first transverse direction 120 forms a positive pole of the electro-chemical cell 104g and finally, the front cell terminal 116 of the electro-chemical cell 104h following the electro-chemical cell 104g in the first transverse direction 120 again forms a negative pole of the electro-chemical cell 104h.

If the front cell terminal 116 of an electro-chemical cell 104 forms a positive pole of the particular electro-chemical cell 104 concerned, then the rear cell terminal 118 forms a negative pole of the same cell 104. If the front cell terminal 116 of an electro-chemical cell 104 forms a negative pole of the particular electro-chemical cell 104 concerned, then the rear cell terminal 118 of the same electro-chemical cell 104 forms a positive pole of the same electro-chemical cell 104.

In particular, the electro-chemical device 100 can be in the form of a battery, and especially a lithium ion battery of the LiFePO$_4$ type for example.

In correspondence therewith, the electro-chemical cells 104 of the electro-chemical modules 102 can be in the form of battery cells and in particular, in the form of lithium ion battery cells of the LiFePO$_4$ type for example.

As can be seen in particular from FIGS. 3 and 4, the front ends of the electro-chemical cells 104 incorporating the front cell terminals 116 extend through a front mounting frame 124 which has a respective through opening 126 for each electro-chemical cell 104, and the rear ends of the electro-chemical cells 104 incorporating the rear cell terminals 118 extend through a rear mounting frame 128 which likewise has a respective through opening 130 for each electro-chemical cell 104.

The mounting frames 124 and 128 thus serve for positioning the electro-chemical cells 104.

The mounting frames 124 and 128 can be formed from an electrically insulating material such as a plastics material for example.

Furthermore, as can be seen in particular from the plan view of FIG. 2, the electro-chemical module 102 comprises a plurality of cell connectors 132 by means of which the cell terminals of mutually neighbouring electro-chemical cells 104 having different polarities are connected to one another in electrically conductive manner in order to connect all the electro-chemical cells 104 of the electro-chemical module 102 electrically in series in this way.

Hereby, each cell connector 132 connects a first cell terminal 134 of positive polarity to a second cell terminal 136 of negative polarity of a neighbouring electro-chemical cell 104.

In particular, as can be seen from FIG. 2, the first cell terminal 134c of the electro-chemical cell 104c and the second cell terminal 136b of the electro-chemical cell 104b are connected together by a cell connector 132c, the first cell terminal 134e of the electro-chemical cell 104e and the second cell terminal 136d of the electro-chemical cell 104d are connected together by a cell connector 132e and the first cell terminal 134g of the electro-chemical cell 104g and the second cell terminal 136f of the electro-chemical cell 104f are connected together by a cell connector 132g.

Furthermore, in order to connect all the electro-chemical cells 104 of the module 102 electrically in series, the rear cell terminals 118 of mutually neighbouring electro-chemical cells 104 are also connected together by (not illustrated) cell connectors 132, namely, the (negative) rear cell terminal 118 of the electro-chemical cell 104a to the (positive) rear cell terminal 118 of the electro-chemical cell 104b, the (negative) rear cell terminal 118 of the electro-chemical cell 104c to the (positive) rear cell terminal 118 of the electro-chemical cell 104d, the (negative) rear cell terminal 118 of the electro-chemical cell 104e to the (positive) rear cell terminal 118 of the electro-chemical cell 104f and the (negative) rear cell terminal 118 of the electro-chemical cell 104g to the (positive) rear cell terminal 118 of the electro-chemical cell 104h.

The front cell terminal 116 of the electro-chemical cell 104a forming the beginning of the series circuit of cells in the electro-chemical module 102 and the front cell terminal 116 of the electro-chemical cell 104h forming the end of the series circuit of cells are each connected in electrically conductive manner to an electrically conductive terminal 138 of the electro-chemical module 102.

Each of the electrical terminals 138 comprises a contact element 140 that is in the form of a stamped-out bendable part for example and incorporates a contact section 142 which is fixed to the respectively associated cell terminal and comprises an e.g. blade-like plug section 144 which, for example, extends away from the contact section 142 in the first transverse direction 120 of the electro-chemical module 102 and preferably perpendicularly with respect to the axial direction 112 of the electro-chemical cells 104, and also comprises an e.g. angular retaining web 146 which is of narrow construction compared with the contact section 142 and the plug section 144 and connects the contact element 140 to a mounting 148 in the form of a printed circuit board 150 that is arranged on the front surface of the electro-chemical module 102.

An end of the retaining web 146 remote from the contact section 142 and the plug section 144 of the contact element 140 is attached in electrically conductive manner to a (not illustrated) conductive track on the rear side of the printed circuit board 150 facing the electro-chemical cells 104.

The retaining web 146 thus serves not only as a mechanical retaining element, but it also serves as a voltage tapping means 151 at the same time.

Each of the cell connectors 132 that respectively connect a first cell terminal 134 and a second cell terminal 136 together in electrically conductive manner comprises a base body 152 incorporating a first contact section 154 which is connected to the (positive) first cell terminal 134 of an electro-chemical cell 104 in the installed state of the cell connector 132, and a second contact section 156 which is connected to a (negative) second cell terminal 136 of another electro-chemical cell 104 in the installed state of the cell connector 132.

The base body 132 of the cell connector 132 is preferably produced in the form of a stamped-out bendable part.

Furthermore, in the embodiment of a cell connector 132 that is illustrated in FIGS. 2 and 8 to 10, the base body 152 of the cell connector 132 comprises a first retaining web 158 with which the cell connector 132 is fixed to the mounting 148 and which connects the first contact section 154 to an associated conductive track of the printed circuit board 150 in electrically conductive manner, and a second retaining web 160 by means of which the cell connector 132 is likewise fixed to the mounting 148 and which connects the second contact section 156 to an associated conductive track of the printed circuit board 150 in electrically conductive manner.

A separate conductive track on the printed circuit board 150 is individually associated with each cell connector 132 of the electro-chemical module 102, and these conductive tracks are attached to a (not illustrated) control unit of the electro-chemical device 100 so that the electrical potential of the respective cell connector 132 and that of the cell terminal 116 associated therewith can be measured in each case by the control unit over the respectively associated conductive track and the electrically conductive retaining webs 158 or 160.

The first retaining web 158 and the second retaining web 160 thus also serve as voltage tapping means 162 via which the electrical potential of the cell connector 132 is measurable and evaluable by the control unit of the electro-chemical device 100.

Furthermore, it is possible to carry out a process for equalizing the state of charge between the different electro-chemical cells 104 by means of the control unit of the electro-chemical device 100 via the voltage tapping means 162.

Since the first contact section 154 and the second contact section 156 of the cell connector 132 are at the same electrical potential, it is sufficient for one of the retaining webs 158, 160 to be connected to an associated conductive track of the printed circuit board 150.

A particularly simple and time-saving process for mounting a plurality of cell connectors 132 and possibly also the electrical terminals 138 in the form of the contact elements 140 on the cell terminals 116 of the electro-chemical module 102 is obtained if the base bodies 152 of a plurality of cell connectors 132 and preferably also the contact elements of the electrical terminals 138 of the module 102 are separated out, and in particular punched out, in common from a starting material so that they then form a connector assembly 164 (see FIG. 8) in which the cell connectors 132 are integrally connected together by means of the connecting webs 166 and can thus be handled as a single entity.

In particular, provision may be made for the connector assembly 164 which may be in the form of a punched grid 168 to comprise a web-like framework 170 which surrounds the cell connectors 132 and possibly also the contact elements 140 and upon which the cell connectors 132 and the contact elements 140 are held by individual connecting web sections 172.

When assembling the electro-chemical module 102, this connector assembly 164 is arranged such that it is associated in the desired manner with the electro-chemical cells 104 of the module 102 which pass through the front mounting frame 124 (see FIG. 7), whereupon the contact sections 154 and 156 of the cell connectors 132 and also the contact elements 140 of the electrical terminals 138 are connected, preferably in cohesive manner, to the respectively associated cell terminals 116 so as to attain the assembly state illustrated in FIG. 9 in which the cell connectors 132 and the contact elements 140 of the connector assembly 164 are still connected together in one piece by the connecting webs 166.

Subsequently, the connecting webs 166 i.e. the web-like framework 170 and the individual connecting web sections 172 are separated from the cell connectors 132 and the contact elements 140 so that the assembly state illustrated in FIG. 10 is reached in which the individual cell connectors 132 and the contact elements 140 are no longer connected to one another in electrically conductive manner.

For the purposes of completing the electro-chemical module 102, the mounting 148 in the form of the printed circuit board 150 is then arranged on the front surface of the electro-chemical module 102 and connected to the respective retaining webs 158, 160 and 146 (preferably by soldering) so that the final state of assembly of the electro-chemical module 102 which is in FIG. 2 is achieved.

In a variant of the previously described method for the mounting of the cell connectors 132 and the contact elements 140 on the cell terminals 116 of the electro-chemical module 102, the connector assembly 164 is connected as a whole to the mounting 148 in the form of the printed circuit board 150 before the cell connectors 132 and the contact elements 140 have been arranged such that that they are associated in the desired manner with the electro-chemical cells 104 of the module 102 and affixed thereto.

To this end, the respective retaining webs 158, 160 and 146 of the cell connectors 132 and the contact elements 140 are connected to the conductive tracks of the mounting 148, preferably by soldering.

Subsequently, the connecting webs 166 i.e. the web-like framework 170 and the individual connecting web sections 172 are separated from the cell connectors 132 and the contact elements 140 so that the individual cell connectors 132 and contact elements 140 are no longer connected to one another in electrically conductive manner.

For the purposes of completing the electro-chemical module 102, the mounting 148 in the form of the printed circuit board 150 together with the cell connectors 132 and contact elements 140 held thereon is arranged at the front of the electro-chemical module 102 in such a way that the cell connectors 132 and the contact elements 140 are positioned such that they are associated in the desired manner with the electro-chemical cells 104 of the module 102 which pass through the front mounting frame 124, whereupon the contact sections 154 and 156 of the cell connectors 132 and also the contact elements 140 of the electrical terminals 138 are connected, preferably in cohesive manner, to the respectively associated cell terminals 116 so that eventually the final state of assembly of the electro-chemical module 102 which is illustrated in FIG. 2 is likewise achieved.

In a further variant of the previously described method for the mounting of the cell connectors 132 and the electrical terminals 138 in the form of the contact elements 140 on the cell terminals 116 of the electro-chemical module 102, the connector assembly 164 is not connected as a whole to the mounting 148 in the form of the printed circuit board 150, but rather, it is connected to the front mounting frame 124 of the electro-chemical module 102 such as is illustrated in FIG. 5I.

The cell connectors 132 and the contact elements 140 of the connector assembly 164 are each fixed separately to the front mounting frame 124, for example, by clamping or latching them thereto by means of suitable clamping elements or latching elements.

Subsequently, the connecting webs 166 i.e. the web-like framework 170 and the individual connecting web sections 172 are separated from the cell connectors 132 and the contact elements 140.

In a further step, the front mounting frame 124 together with the cell connectors 132 held thereon and the contact elements 140 held thereon are placed on the electro-chemical cells 104 of the module 102 in such a way that the front ends of the electro-chemical cells 104 pass through the respectively associated through openings 126 in the front mounting frame 124 and the cell connectors 132 and also the contact elements 140 are positioned such that they are associated in the desired manner with the electro-chemical cells 104 of the module 102.

Thereupon, the contact sections 154 and 156 of the cell connectors 132 and also the contact elements 140 of the electrical terminals 138 are connected, preferably in cohesive manner, to the respectively associated cell terminal 116.

For the purposes of completing the electro-chemical module 102, the mounting 148 in the form of the printed circuit board 150 is then arranged at the front of the electro-chemical module 102 and connected to the respective retaining webs 158, 160 and 146 (preferably by soldering) so that eventually the final state of assembly of the electro-chemical module 102 that is illustrated in FIG. 2 is achieved.

In this variant of the process for mounting the cell connectors 132 and the contact elements 140 on the cell terminals 116, the front mounting frame 124 thus serves as a mounting to which the cell connectors 132 and the contact elements 140 are separately fixed, before the connecting webs 166 of the connector assembly 164 are separated therefrom.

Different ways of connecting a cell connector 132 to the associated first cell terminal 134 and the associated second cell terminal 136 in cohesive manner are described below with reference to FIGS. 11 to 13:

As can be seen from FIG. 11 for example, the (positive) first cell terminal 134 of an electro-chemical cell 104g comprises a base body 174 consisting of an electrically conductive, preferably metallic, first material such as aluminium or an aluminium alloy for example, whereby the first base body 174 has a first contact area 176 consisting of the first material which is associated with the cell connector 132.

The second cell terminal 136 of the electro-chemical cell 104f that is to be connected to the first cell terminal 134 by the cell connector 132 comprises a second base body 178 consisting of an electrically conductive, preferably metallic, corrosion-susceptible material such as a low-alloy steel material for example, wherein the second base body 178 is provided with an anticorrosive layer 180 consisting of a second material such as nickel or a nickel alloy for example, which forms a first anticorrosive material at the same time.

The anticorrosive layer 180 comprises a second contact area 182 consisting of the second material or the first anticorrosive material which faces the cell connector 132.

The base body 152 of the cell connector 132 is preferably formed from the first material, i.e. from the same material as the first base body 174 of the first cell terminal 134.

In this embodiment furthermore, the cell connector 132 comprises a contact region 184 which is connected to the base body 152 and consists of a third material that forms a second anticorrosive material at the same time.

The contact region 184 of the cell connector 132 is preferably in the form of a contact body 186 which is manufactured separately from the base body 152 and is fixed in preferably cohesive manner to the side of the base body 152 facing the cell terminals 134, 136 in the region of the second contact section 156 of the base body 152.

In the embodiment illustrated in FIG. 11, provision is made, in particular, for the contact region 184 to be fixed to the base body 152 by an ultrasonic welding process.

In particular, the third material or the second anticorrosive material from which the contact region 184 is formed can be substantially the same as the second material or the first anticorrosive material from which the anticorrosive layer 180 of the second cell terminal 136 is formed.

For example, provision may be made for the third material or the second anticorrosive material to consist of nickel or a nickel alloy.

As an alternative thereto, provision may also be made for the third material or the second anticorrosive material to be a chromium alloy.

During the process of assembling the electro-chemical module 102, the base body 152 of the cell connector 132 is connected to the first cell terminal 134 by welding, preferably by a laser welding process after the cell connector 132 has been positioned relative to the two cell terminals 134, 136 in the desired way.

The contact region 184 of the cell connector 132 is welded to the second cell terminal 136 by a welding seam such as is indicated in FIG. 11 by the broken line 188, wherein the welding seam 188 is preferably produced by a laser welding process.

Namely, during this welding process, the anticorrosive layer 180 of the second cell terminal 136 is melted and is thus at least partially broken-down; however, in the course of the welding process, there is a sufficient flow of the second anticorrosive material from the contact region 184 containing the second anticorrosive material into the structure and in particular onto the free surface of the welding seam 188 that, after the conclusion of the welding process, the welding seam 188 is formed from a corrosion proof material at least on the free surface thereof, but preferably however throughout its entire structure.

This corrosion proof material is composed predominantly of the corrosion-susceptible material of the second base body 178 and the second anticorrosive material originating from the contact region 184 of the cell connector 132, whereby the corrosion-susceptible material is subjected to an alloying process resulting in a corrosion proof material.

The anticorrosive effect of the first anticorrosive material and/or the second anticorrosive material may be based, in particular, on the fact that the first anticorrosive material and/or the second anticorrosive material contains at least one anticorrosive metal in a proportion of at least 50 weight percent.

In particular, provision may be made for the first anticorrosive material and/or the second anticorrosive metal to contain nickel as the anticorrosive metal.

As an alternative or in addition thereto, provision may be made for the first anticorrosive material and/or the second anticorrosive material to contain chrome as the anticorrosive metal.

The first anticorrosive material and/or the second anticorrosive material could also contain both nickel and chrome as the anticorrosive metal, whereby it then suffices for the total proportion of the two anticorrosive metals to the first anticorrosive material or the second anticorrosive material to amount to at least 50 weight percent.

The corrosion resistance of the corrosion proof material on the free surface of the resultant welding seam 188 is preferably checked by a neutral salt spray test (NSS test) in accord with the standard DIN EN ISO 9227 (dated July 2006). In regard to the execution of such a neutral salt spray test, reference should be made to the aforementioned standard, and in this connection, the aforementioned standard is incorporated into the subject matter of the present description.

For the purposes of carrying out the salt spray test, a test-sample body 190 of the type illustrated in FIGS. 47 to 49 is produced.

The test-sample body 190 comprises a cuboidal base 192 with a square end face 194 having an edge length b of 12 mm for example.

The base 192 consists of the corrosion-susceptible material of the second base body 178 of the second cell terminal 136, thus for example, of the low-alloy steel material which is provided on the surface thereof with the anticorrosive layer consisting of the first anticorrosive material such as nickel or a nickel alloy for example.

A square-shaped plate 196 is placed on the end face 194, said plate having a square end face 198 which faces the base 192 whilst the edge length a thereof is 15 mm for example and the thickness d thereof is 0.5 mm for example, and is connected thereto by welding along an annular closed welding seam 188', in particular, by means of a laser welded seam under the same conditions as those for the welding of the cell connector 132 to the second cell terminal 136.

The test-sample body 190 that has been produced in this way is subjected to the neutral salt spray test (NSS test) in accord with DIN EN ISO 9227 (dated July 2006) in a spray chamber for a test period of 96 hours.

After the neutral salt spray test has finished, there then follows a visual evaluation of the surface of the test-sample body 190, and in particular, of the welding seam 188', and also a visual evaluation of a section along a sectional plane 199 running through the welding seam 188' in the axial direction of the test-sample body 190 (see FIG. 49).

In the course of the visual evaluation, an evaluation number ("Rating") is assigned to the material of the tested welding seam 188' in accord with the following evaluation scheme:

Rating 1: no change, no discoloration, no corrosion;
Rating 2: Discoloration or change of colour, but no corrosion;
Rating 3: Traces of corrosion, only a few small punctulated surfaces;
Rating 4: light corrosion with a multiplicity of small punctulated surfaces, but with no contiguous corroded regions;
Rating 5: moderate corrosion, contiguous corroded regions;
Rating 6: heavy corrosion, sample totally corroded.

In order to be considered as corrosion proof, the material of the test-sample body, and in particular, of the welding seam 188' of the test-sample body 190 must be classified with a maximum Rating 3 after the neutral salt spray test (NSS test).

The Rating that has been determined by means of the neutral salt spray test on the welding seam 188' of the test-sample body 190 is assigned to the material of the welding seam 188 between the second cell terminal 136 and the contact region 184 of the cell connector 132.

As an alternative to the use of a contact body 186 that has been produced separately from the base body 152 of the cell connector 132 and subsequently connected to the base body 152 in cohesive manner, use could also be made of a contact region 184 which comprises a coating consisting of the second anticorrosive material that has been produced on the base body 152, and in particular, a coating that has been applied by means of an electroplating process.

The base body 152 of the cell connector 132 is preferably formed from aluminium or an aluminium alloy. Preferably the proportion of aluminium to the material of the base body 152 amounts to at least 99.5 weight percent.

In order to reduce to as large an extent as possible mechanical stresses which can occur as a result of the different thermal expansions of the cell connector 132 on the one hand and the container device 108 for the electro-chemical cells 104 on the other during the operation of the electro-chemical device 100, it is expedient for the material of the base body 152 of the cell connector 132 to have a thermal coefficient of expansion a which deviates by less than 10% from the thermal coefficient of expansion a of the material of the container device 108.

If the thermal coefficients of expansion of these materials vary greatly from the ambient temperature up to the operating temperature of the electro-chemical device 100, then the statement above refers to the respective average thermal coefficients of expansion when being heated from the ambient temperature (20° C.) up to the operating temperature of the electro-chemical device 100.

Consequently, it is particularly expedient for the base body 152 and the container device 108 to be formed from substantially the same material, thus for example, both being formed of aluminium or an aluminium alloy.

In an alternative possibility for the connection of the cell connector 132 to the first cell terminal 134 and to the second cell terminal 136 in cohesive manner which is illustrated schematically in FIG. 12, the contact region 184 in the form of a contact body 186 that is produced separately from the base body 152 of the cell connector 132 is not fixed to the base body 152 by an ultrasonic welding process, but rather, by means of a laser welding process along a welding seam that is indicated in FIG. 12 by the line 200.

In all other respects, the possibility for the connection of the cell connector 132 to the cell terminals 134 and 136 in cohesive manner which is illustrated in FIG. 12 corresponds in regard to the construction, manner of functioning and mode of production with the possibility illustrated in FIG. 11, so that to this extent reference should be made to the previous description.

An alternative possibility for the connection of the cell connector 132 to the cell terminals 134 and 136 in cohesive manner which is illustrated schematically in FIG. 13 differs from the possibilities illustrated in FIGS. 11 and 12 in that the cell connector 132 is not welded to the second cell terminal 136, but instead, it is connected to the second cell terminal 136 by soldering.

Furthermore, in this embodiment, the contact region 184 consisting of the third material or the second anticorrosive material is not formed by a contact body 186 that is produced separately from the base body 152 and subsequently connected to the base body 152 in cohesive manner, but rather, by means of a coating 202 of nickel or a nickel alloy for example which is arranged on the base body 152.

Hereby, the coating 202 extends over at least that surface of the second contact section 156 of the base body 152 which faces the second cell terminal 136 in the assembled state of the electro-chemical module 102.

Moreover, as can be seen from FIG. 13, the coating 202 could also extend over the same side of the first contact section 154 and/or over that side of the base body 152 which is remote from the cell terminals 134 and 136 in the assembled state.

The process of soldering the contact region 184 in the form of the coating 202 to the second cell terminal 136 can, for example, be effected by means of a soldering foil 204 consisting of a soft solder, and in particular of a lead free soft solder such as the soldering material having the composition $SnAg_{3.5}$ for example.

A soldering process utilising a solder having a low soldering temperature (of less than approximately 250° C.) offers the advantage that thermally sensitive components of the electro-chemical module 102 and especially the insulating parts made of a synthetic material are not damaged during the process of mounting the cell connector 132.

As an alternative to the use of a soft solder, use could also be made of a hard solder such as a silver based hard solder for example, wherein the hard solder is preferably melted for the soldering process by means of a short-pulse laser in order to prevent any damage to the thermally sensitive components of the electro-chemical module 102.

In particular, the coating 202 which forms the contact region 184 of the cell connector 132 can be a coating applied by means of an electroplating process.

As an alternative to the process of soldering the contact region 184 of the cell connector 132 to the cell terminal 136, these elements could also be stuck to one another by means of an electrically conductive adhesive.

In particular, an epoxy resin adhesive incorporating an electrically conductive filler could be used for the adhesion process.

The electrically conductive filler may, in particular, be silver.

The electrically conductive adhesive can be applied to one of the elements that are to be stuck together or to both elements, whereupon both elements are brought into contact with the adhesive layer and the adhesive layer is hardened.

In particular, the process of hardening the adhesive layer can be effected at an elevated temperature compared with the ambient temperature by supplying heat thereto.

The two elements being stuck together are preferably pressed against each other under a contact pressure until these elements are connected to one another in cohesive manner by the adhesive.

The following are particularly suitable electrically conductive adhesives:

the silver-containing epoxy resin adhesive which is sold under the name LOCTITE® 3880 by the company Henkel Technologies, Heydastrasse 10, 58093 Hagen, Germany. Regarding the chemical and physical properties and the working steps for the processing of this adhesive, reference should be made to the technical data sheet for the adhesive LOCTITE® 3880 dated June 2005, and in this respect, the aforementioned data sheet is incorporated hereby in the present description.

the silver-containing epoxy resin adhesive which is sold by the company Master Bond Inc., 154 Hobart Street, Hackensack, N.J. 07601-3922, USA, under the name Master Bond Supreme 10HT/S. Regarding the physical and chemical properties and the working steps for the processing of this adhesive, reference should be made to the technical data sheet for the adhesive Master Bond Supreme 10HT/S, and in this respect, the aforementioned data sheet is incorporated hereby in the present description.

the silver-containing epoxy resin adhesive which is sold by the company Master Bond Inc., 154 Hobart Street, Hackensack, N.J. 07601-3922, USA, under the name Master Bond FL901S. Regarding the physical and chemical properties and the working methods for the processing of this adhesive, reference should be made to the technical data sheet for the adhesive Master Bond FL901S, and in this respect, the aforementioned data sheet is incorporated hereby in the present description.

In operation of the electro-chemical device 100, a difference between the longitudinal expansion of the cell connector 132 on the one hand and a change in the spacing between the longitudinal axes 114 of the cell terminals 134, 136 that are connected together by the cell connector 132 on the other can occur due to differing temperatures and/or due to differing thermal coefficients of expansion of the cell connector 132 on the one hand and the container device 108 for the electro-chemical cells 104 on the other. The relative positions of the cell terminals 134, 136 that are connected together by a cell connector 132 are changed in the transverse directions 120 or 122 of the module 102 which are oriented perpendicularly with respect to the axial direction 112 of the electro-chemical cells 104 as a result of a change in temperature.

Furthermore, a change of the relative positions between the interconnected cell terminals 134 and 136 along the axial direction 112 of the interconnected electro-chemical cells 104 can occur due to differing longitudinal expansions of the electro-chemical cells 104 that are connected to one another by a cell connector 132.

In order to be able to compensate for such differences between a longitudinal expansion of the cell connector 132 on the one hand and a change in the spacing between the longitudinal axes 114 of the cell terminals 134 and 136 that are connected together by the cell connector 132 on the other and/or such differences between a longitudinal expansion of a first electro-chemical cell (104g for example) and a second electro-chemical cell (104f for example) which are connected to one another by the cell connector 132, provision is made in the alternative embodiments of cell connectors 132 that are illustrated in FIGS. 14 to 37 for the respective cell connector 132 to comprise a resiliently and/or plastically deformable compensation region 206 which is arranged between the first contact section 154 and the second contact section 156 of the cell connector 132 and connects the two contact sections 154 and 156 to one another.

Preferably, the base body 152 of the cell connector 132 is provided with such a compensation region 206.

In the embodiment of a cell connector 132 illustrated in FIGS. 14 and 15, the deformable compensation region 206 has wavelike structure, wherein the wavelike structure comprises a plurality of waves having an amplitude which is oriented in parallel with the axial direction 112 of the cells 104 that are to be connected by the cell connector 132 and substantially perpendicularly with respect to the contact areas 208 and 210 with which the cell connector 132 abuts on the first cell terminal 134 and the second cell terminal 136 in the assembled state. These waves have a plurality of e.g. four wave crests which run transversely, preferably substantially perpendicularly, with respect to the axial direction of the electro-chemical cells 104 and transversely, preferably substantially perpendicularly, with respect to the longitudinal direction 212 of the cell connector 132 and also substantially parallel to a transverse direction 214 of the cell connector 132 which is oriented perpendicularly with respect to the longitudinal direction 212 of the cell connector 132 and perpendicularly with respect to the axial direction 112 of the electro-chemical cells 104, and a plurality of wave troughs 218 which are arranged between the wave crests 216 and run transversely, preferably substantially perpendicularly, with respect to the axial direction 112 of the electro-chemical cells 104, and transversely, preferably substantially perpendicularly, with respect to the longitudinal direction 212 of the cell connector 132 and substantially parallel to the transverse direction 214 of the cell connector 132.

The wave crests 216 project upwardly in a contact direction 217 of the cell connector 132 which is perpendicular with respect to the contact areas 208 and 210 of the cell connector 132 and corresponds to the axial direction 112 of the cells 104 in the mounted state of the cell connector 132, whilst the wave troughs 218 project downwardly in the contact direction 217 (towards the cells 104 which are to be connected).

As in the case of the embodiment of a cell connector 132 that is illustrated in FIGS. 1 to 4 and is substantially flat in the region between the contact sections 154 and 156, the embodiment of a cell connector 132 that is illustrated in FIGS. 14 and 15 and comprises a deformable compensation region 206 between the two contact sections 154 and 156 has two retaining webs 158 and 160 by means of which the cell connector 132 is connectable to the mounting 148 and which can serve for the electrically conductive connection of the cell connector 132 to a conductive track leading to the control unit of the electro-chemical device 100 so that the retaining webs 158 and 160 are also usable, in particular, as voltage tapping means 162.

Hereby, each of the retaining webs 158 and 160 can be provided with a respective offset portion 220 for bridging a height difference between the position of the cell connector 132 and the position of the mounting 148 in the axial direction 112 of the electro-chemical cells 104.

Due to the wave-like structure of the deformable compensation region 206 of the cell connector 132, the effect is achieved that the compensation region 206 is resiliently and/or plastically deformable in a simple way and in such a manner that the second contact section 156 can be shifted relative to the first contact section 154 in both the axial direction 112 of the electro-chemical cells 104 and in the longitudinal direction 212 of the cell connector 132 in order to balance out the previously described differences in the relative positions of the cell terminals 134 and 136 that are to be interconnected by the cell connector 132. The occurrence of excessive mechanical stresses at the junction points between the cell connector 132 on the one hand and the first cell terminal 134 and also the second cell terminal 136 on the other can thereby be prevented.

In particular, the extent of the compensation region 206 in the longitudinal direction 212 of the cell connector 132 can be changed by making the wave crests 216 and the wave troughs 218 flatter or steeper and thus the spacing between the first contact section 154 and the second contact section 156 can be made greater or smaller.

By altering the slopes of the flanks of the wave crests 216 and the wave troughs 218 asymmetrically, the first contact section 154 and the second contact section 156 can be shifted relative to each other in the axial direction 112 of the electro-chemical cells that are to be connected to one another.

The mechanical stresses occurring at these junction points when the electro-chemical device 100 is in operation can be further reduced if the deformable compensation region 206 of the cell connector 132 is formed from a material having a relatively low yield point R of at most 60 N/mm², preferably of at most 40 N/mm², and especially of at most 20 N/mm².

Furthermore, for the purposes of reducing the mechanical stresses occurring at the junction points between the cell connector 132 and the cell terminals 134 and 136 that are to be connected together, provision may be made for the cell connector 132 to have already been deformed, preferably plastically, prior to it being connected to the first cell terminal 134 and/or prior to being connected to the second cell terminal 136 in such a manner that the first contact section 154 of the cell connector 132 that is to be connected to the first cell terminal 134 and the second contact section 156 of the cell connector 132 that is to be connected to the second cell terminal 136 are shifted relative to each other such that differences in the positions of the first cell terminal 134 and the second cell terminal 136 in the axial direction 112 of the electro-chemical cells 104 that are to be connected to one another are at least partially balanced out and preferably balanced out substantially in their entirety, such differences being the result of manufacturing tolerances for example.

Here, it is particularly expedient if the relative positions of the first cell terminal 134 and the second cell terminal 136 that are to be interconnected by the cell connector 132 are measured before the cell connector 132 is deformed in an appropriately corresponding manner.

Furthermore, the yield point of the material of the cell connector 132 in the compensation region 206 and/or in the first contact section 154 and/or in the second contact section 156 can be reduced by a thermal treatment either before and/or during the connection of the cell connector 132 to the first cell terminal 134 and/or to the second cell terminal 136 in cohesive manner. By virtue of such a decrease of the yield point of the material by a thermal treatment, the mechanical stresses occurring at the junction points during and/or after the process of connecting the cell connector 132 to the first cell terminal 134 or to the second cell terminal 136 in cohesive manner can be reduced.

In all other respects, the embodiment of a cell connector 132 that is illustrated in FIGS. 14 to 16 corresponds in regard to the construction, manner of functioning and mode of production with the previously described embodiments of cell connectors 132 without a deformable compensation region 206, so that to this extent reference should be made to the previous description.

An alternative embodiment of a cell connector 132 that is illustrated in FIGS. 17 and 18 differs from the embodiment illustrated in FIGS. 14 to 16 in that the wavelike structure of the deformable compensation region 206 has only three rather than four wave crests 216 running in the transverse direction 214 of the cell connector 132 and only two rather than three wave troughs 218 running along the transverse direction 214.

Furthermore, this embodiment of a cell connector 132 does not have retaining webs 158, 160 for connecting the cell connector 132 to the mounting 148. In consequence, such a cell connector 132 is only held on the electro-chemical module 102 by the cohesive-type connection to the cell terminals 134 and 136.

In principle however, this embodiment of a cell connector 132 too, as well as all of the embodiments of cell connectors 132 which are described below and illustrated without retaining webs 158, 160 could also be provided with one or more retaining webs 158 or 160 which can also serve, in particular, as voltage tapping means 162.

In all other respects, the embodiment of a cell connector 132 illustrated in FIGS. 17 and 18 corresponds in regard to the construction, manner of functioning and mode of production with the embodiment illustrated in FIGS. 14 to 16, so that to this extent reference should be made to the previous description.

An alternative embodiment of a cell connector 132 that is illustrated in FIGS. 19 and 20 differs from the embodiment illustrated in FIGS. 14 to 16 in that, instead of a wavelike structure, the deformable compensation region 206 has a half-bead structure which has two bead humps 222 that run in the transverse direction 214 of the cell connector 132 and merge into the first contact section 154 of the cell connector 132 at a first kink line 224 and into the second contact section 154 of the cell connector 132 at a second kink line 226.

In all other respects, the embodiment of a cell connector 132 that is illustrated in FIGS. 19 and 20 corresponds in regard to the construction, manner of functioning and mode of production with the embodiment illustrated in FIGS. 14 to 16, so that to this extent reference should be made to the previous description.

An alternative embodiment of a cell connector 132 that is illustrated in FIGS. 21 and 22 differs from the embodiment illustrated in FIGS. 14 to 16 in that the deformable compensation region 206 has a wavelike structure which comprises just one wave crest 216 that extends in the transverse direction 214 of the cell connector 132 and just one wave trough 218 that extends in the transverse direction 214 of the cell connector 132.

In all other respects, the embodiment of a cell connector 132 that is illustrated in FIGS. 21 and 22 corresponds in regard to the construction, manner of functioning and mode of production with the embodiment illustrated in FIGS. 14 to 16, so that to this extent reference should be made to the previous description.

An alternative embodiment of a cell connector 132 that is illustrated in FIGS. 23 and 24 differs from the embodiment illustrated in FIGS. 14 to 16 in that the deformable compensation region 206 has a wavelike structure which comprises two wave crests 216 running in the transverse direction 214 of the cell connector 132 and one wave trough 218 running between the wave crests 216 in the transverse direction 214 of the cell connector 132.

In all other respects, the embodiment of a cell connector 132 that is illustrated in FIGS. 23 and 24 corresponds in regard to the construction, manner of functioning and mode of production with the embodiment illustrated in FIGS. 14 to 16, so that to this extent reference should be made to the previous description.

An alternative embodiment of a cell connector 132 that is illustrated in FIGS. 25 and 26 differs from the embodiment illustrated in FIGS. 14 to 16 in that the deformable compensation region 206 has a zigzag structure incorporating a plurality of e.g. five kink lines 228 which run transversely, preferably substantially perpendicularly, with respect to the axial direction 112 of the electro-chemical cells 104 that are to be connected together and substantially along the transverse direction 214 of the cell connector 132.

In all other respects, the embodiment of a cell connector 132 that is illustrated in FIGS. 25 and 26 corresponds in regard to the construction, manner of functioning and mode of production with the embodiment illustrated in FIGS. 14 to 16, so that to this extent reference should be made to the previous description.

An alternative embodiment of a cell connector 132 that is illustrated in FIGS. 27 and 28 differs from the embodiment illustrated in FIGS. 17 and 18 in that the cell connector 132 does not have a contact region 184 consisting of the third material or the second anticorrosive material which is arranged on the second contact section 156.

In principle however, each of the embodiments of a cell connector 132 that is illustrated in this description and the accompanying drawings without such a contact region 184 could be provided with such a contact region 184.

In all other respects, the embodiment of a cell connector 132 that is illustrated in FIGS. 27 and 28 corresponds with the embodiment illustrated in FIGS. 17 and 18, so that to this extent reference should be made to the previous description.

An alternative embodiment of a cell connector 132 that is illustrated in FIGS. 29 and 30 differs from the embodiment illustrated in FIGS. 14 to 16 in that the cell connector 132 does not comprise retaining webs 158, 160 for connecting the cell connector 132 to a mounting 148.

In consequence, in the mounted state, this cell connector 132 is only held on the electro-chemical module 102 by the cohesive-type connection to the first cell terminal 134 and the second cell terminal 136.

In all other respects, the embodiment of a cell connector 132 that is illustrated in FIGS. 29 and 30 corresponds in regard to the construction, manner of functioning and mode of production with the embodiment illustrated in FIGS. 14 to 16, so that to this extent reference should be made to the previous description.

An alternative embodiment of a cell connector 132 that is illustrated in FIGS. 31 to 33 differs from the embodiment illustrated in FIGS. 27 and 28 in that the base body 152 of the cell connector 132 is not formed in one piece, but rather, is in the form of a laminate consisting of a plurality of e.g. three sheets of material 230 which are arranged one above the other.

The structure and in particular the wavelike structure thereof which makes the resilient and/or plastic deformation of the compensation region 206 possible, is retained in this case.

The base body 152 in each of the other embodiments of cell connectors 132 that are disclosed in this description and in the accompanying drawings may also comprise such a laminate.

In all other respects, the embodiment of a cell connector 132 that is illustrated in FIGS. 31 to 33 corresponds in regard to the construction, manner of functioning and mode of production with the embodiment illustrated in FIGS. 27 and 28, so that to this extent reference should be made to the previous description.

An alternative embodiment of a cell connector 132 that is illustrated in FIGS. 34 and 35 differs from the embodiment illustrated in FIGS. 27 and 28 in that the deformable compensation region 206 is sub-divided by a plurality of e.g. three wave-shaped slits 232 into a plurality of e.g. four wave-shaped webs 234 which are arranged next to each other in the transverse direction 214 of the cell connector 132.

The wave shape of the slits 232 and the webs 234 has an amplitude in the transverse direction 214 of the cell connector 132.

Furthermore, the cell connector 132 can be provided at the lateral edges of the deformable compensation region 206 with a plurality of e.g. three or four recesses 236 that are approximately in the form of a segment of a circle for example, in order to achieve the effect that the outermost webs 234 also have an approximately constant width over the longitudinal extent thereof and that the outer sides thereof also have an approximately wave-like shape.

Due to the slits 232 and the partitioning of the compensation region 206 into a plurality of webs 234, the ductility of the compensation region 206 is increased and the production of an offset between the contact sections 154 and 156 of the cell connector 132 is facilitated.

In all other respects, the embodiment of a cell connector 132 that is illustrated in FIGS. 34 and 35 corresponds in regard to the construction, manner of functioning and mode of production with the embodiment illustrated in FIGS. 27 and 28, so that to this extent reference should be made to the previous description.

An alternative embodiment of a cell connector 132 that is illustrated in FIGS. 36 and 37 differs from the embodiment illustrated in FIGS. 34 and 35 in that the deformable compensation region 206 is substantially flat and thus does not have a wavelike structure with an amplitude in the axial direction of the electro-chemical cells 104 that are to be connected to one another.

In this embodiment of a cell connector 132, the resilient and/or plastic ductility of the compensation region 206 is caused exclusively by the wave-shaped slits 323 which subdivide the compensation region 206 into a plurality of wave-shaped webs 234 that are arranged next to each other in the transverse direction 214 of the cell connector 132.

In all other respects, the embodiment of a cell connector 132 that is illustrated in FIGS. 36 and 37 corresponds in regard to the construction, manner of functioning and mode of production with the embodiment illustrated in FIGS. 34 and 35, so that to this extent reference should be made to the previous description.

All of the embodiments of cell connectors 132 that have been described can be provided with at least one through opening in the first contact section 154 and/or in the second contact section 156 and also, if so required, in the contact region 184 of the cell connector 132 in order to enable an electrical contact to be made with the first cell terminal 134 that is connected to the cell connector 132 in cohesive manner or with the second cell terminal 136 that is connected to the cell connector 132 in cohesive manner for the purposes of a measurement which can be used for determining the electrical contact resistance of the connection between the cell connector 132 and the respective cell terminal 134, 136.

In the case of the embodiment of an electro-chemical device 100 that was particularly described hereinabove with reference to FIG. 2, the cell connectors 132 and the electrical terminals 138 of the electro-chemical module 102 are connected by retaining webs 158, 160 and 146 to the conductive tracks of a printed circuit board 150, wherein the cell connectors 132 and the contact elements 140 of the electrical terminals 138 have been produced separately from the conductive tracks of the printed circuit board 150 and only connected to the conductive tracks of the printed circuit board 150 in electrically conductive manner when assembling the electro-chemical module 102.

By contrast, in the alternative embodiment of an electro-chemical device 100 that is illustrated in FIGS. 38 and 39, each cell connector 132 is formed in one piece with a respectively associated conductive track 238.

The conductive tracks 238 are not fixed to a printed circuit board, but rather, are formed such as to be self-supporting.

In addition, the contact elements 140 of the electrical terminals 138 of the electro-chemical module 102 are preferably formed in one piece with a respectively associated conductive track 238 in this embodiment.

The free ends of the conductive tracks 238 remote from the cell connectors 132 are connected in electrically conductive manner to a connecting web 240 which can be replaced by a plug of a correspondingly multi-wired cable connection that leads to the control unit of the electro-chemical device 100 so that the electrical potentials of the cell connector 132 can be measured by the control unit in this way.

In this embodiment, the cell connectors 132 are held on a sub-frame 241 which is formed from an electrically insulating material such as a plastics material for example, and is separately illustrated in FIG. 50.

The sub-frame 241 has an associated recess 243 for each cell connector 132, this recess enabling the respective cell connector 132 to pass through to the cell terminals 134 and 136 that are to be interconnected by the cell connector 132 and/or enabling the cell terminals 134 and 136 that are to be interconnected by the cell connector 132 to pass through to the respective cell connector 132.

Furthermore, the sub-frame 241 comprises a projection 245 having the contact elements 140 arranged on both sides thereof (see FIG. 38).

The conductive tracks 238 may be supported on the sub-frame 241.

The cell connectors 132 and/or the contact elements 140 can, for example, be fixed to the sub-frames 241 serving as a mounting for the cell connectors 132 and the contact elements 140 by clamping or latching by means of suitable clamping elements and latching elements.

The sub-frame 241 makes it possible for the assembly consisting of the cell connectors 132, the contact elements 140 and the associated conductive tracks 238 of an electro-chemical module 102 to be handled as a single entity during the assembly of the module 102 and thus facilitates the assembly of the electro-chemical module 102.

In the embodiment of the electro-chemical device 100 that is illustrated in FIGS. 38 and 39, provision is made for the cell connectors 132 and the contact elements 140 together with the conductive tracks 238 and the connecting web 240 to be initially formed as a one-piece connector assembly 164 in which the cell connectors 132 and the contact elements 140 are connected to one another in one-piece manner by the conductive tracks 238 and the connecting web 240, whereby the connecting web 240 is then removed when the cell connectors 132 and the contact elements 140 have been connected in cohesive manner to the respectively associated cell terminals 116 and/or have been connected to the sub-frame 241.

In all other respects, the embodiment of an electro-chemical device 100 that is illustrated in FIGS. 38 and 39 corresponds in regard to the construction, manner of functioning and mode of production with the embodiment illustrated in FIGS. 1 to 4, so that to this extent reference should be made to the previous description.

Each of the previously described embodiments of an electro-chemical device 100 may comprise a plurality of electro-chemical modules 102 which are preferably connected electrically in series.

In particular, such a series circuit can be produced by connecting in electrically conductive manner an electrical terminal 138 of a first electro-chemical module 102a by means of a module connector 242 to an electrical terminal 138 (of opposite polarity) of a second electro-chemical module 102b, such as is illustrated in FIGS. 40 to 42.

The details of the module connector 242 can be seen from FIGS. 43 to 46 in which the module connector 242 is illustrated separately.

The module connector 242 comprises two plug units 244 for attaching the module connector 242 to the electrical terminals 138 of the electro-chemical modules 102a and 102b that are to be interconnected, wherein the plug units 244 each comprise an e.g. approximately cuboidal plug housing 246 which is formed from a metallic material and in particular from a high-grade steel material for example.

Each plug housing 246 surrounds a seating 248 which extends in the direction of connection 250 of the module connector 242 and into which a respective plug section 144 of a contact element 140 of the electrical terminal 138 of an electro-chemical module 102 can be inserted.

Furthermore, as can be seen from FIG. 46, two mutually opposite contact tongues 252 are arranged in the seating 248, the respective plug section 144 being clamped between these tongues in resiliently biased manner when the module connector 242 is arranged on the particular electro-chemical module 102 concerned.

Furthermore, each of the plug housings 246 is provided on the exterior thereof with latching elements 254 for the purposes of latching the plug housing 246 to a (not illustrated) electrically insulating body and is also provided with projections 256 which can serve as guiding elements and/or as stop means when connecting the respective plug housing 246 to the particular insulating body concerned.

The contact tongues 252 of each plug unit 244 are connected in electrically conductive manner to an angular terminal lug 258 which protrudes out from the end of the plug housing 246 remote from the module 102 to which it is to be attached whilst the free arms 260 thereof extend away from the respective plug housing 246 in a longitudinal direction 262 of the module connector 242 running transversely, preferably substantially perpendicularly with respect to the direction of connection 250.

The free arms 260 of the terminal lugs 258 of the two plug units 244 are directed along this longitudinal direction 262 but extend in mutually opposite senses along it.

The terminal lugs 258 of the two plug units 244 are connected to one another in electrically conductive manner by a flexible conductor 264 which is preferably formed in one-piece manner from a fabric tape 266 especially a flat braid that is woven from electrically conductive wires and incorporates a plurality of e.g. four folds 268.

The electrically conductive wires of the fabric tape 266 are preferably formed of copper as the electrically conductive component.

A first end section 270a of the conductor 264 is fixed to the side of the terminal lug 258 of the first plug unit 244 which faces the electro-chemical module 102 that is to be attached in the attached state of the module connector 242, for example, by welding and in particular by an ultrasonic welding process.

The first end section 270a extends away from the terminal lug 258 of the first plug unit 244a in the longitudinal direction 262 of the module connector 242, namely, in the direction remote from the second plug unit 244b, and it can be provided with an angular bent portion 271 by means of which that part of the first end section 270a that is remote from the first plug unit 244a is offset along the direction of connection 250 with respect to the module 102 that is to be attached.

The end of the first end section 270a remote from the terminal lug 258 merges into an approximately trapezoidal first connecting section 274a at a first fold line 272a which is inclined, preferably at an angle of approximately 45°, to the longitudinal direction 262 of the module connector 242 and to the local longitudinal direction of the fabric tape 266 in the first end section 270a, the local longitudinal direction of the conductor 264 in said first trapezoidal connecting section being parallel to a transverse direction 276 of the module connector which is oriented perpendicularly with respect to the longitudinal direction 262 and perpendicularly with respect to the direction of connection 250 of the module connector 242.

The fold 268a at the first fold line 272a is preferably effected in such a way that the first connecting section 274a is arranged on the side of the first end section 270a which is remote from the modules 102 that are to be connected.

The first connecting section 274a merges into a balancing section 280 by a fold 268b at a second fold line 272b which is inclined, preferably at an angle of approximately 45°, to the transverse direction 276 of the module connector 242 and to the local longitudinal direction 278 of the conductor 264 in the first connecting section 274a, said balancing section extending laterally past the plug units 244a and 244b in parallel with the longitudinal direction of the module connector 242, wherein the balancing section 280 is offset in the transverse direction 276 of the module connector 242 both with respect to the plug units 244a, 244b and with respect to the first end section 270a of the conductor 264.

The balancing section 280 of the conductor 264 can be provided with an electrically insulating sleeve 282 which can be formed, for example, from an elastomeric plastics material and in particular a PVC material.

The broad sides 284, 284' of the tape-like balancing section 280 of the conductor 264 are oriented substantially perpendicularly with respect to the direction of connection 250 of the module connector 242.

At the end thereof remote from the first connecting section 274a, the balancing section 280 merges into a second connecting section 274b by a fold 268c at a third fold line 272c which is inclined, preferably at an angle of approximately 45°, to the longitudinal direction 262 of the module connector 242 and to the local longitudinal direction 278 of the conductor 264 in the balancing section 280, said second connecting section being formed such that it is substantially trapezoidal and, commencing from the balancing section 280, it extends in the transverse direction 276 of the module connector 242 towards that side of the balancing section 280 at which the plug units 244a and 244b are arranged.

Here, the folding action is effected at the second fold line 272b and at the third fold line 272c in such a manner that the balancing section 280 is arranged at the sides of the first connecting section 274a and the second connecting section 274b which face the modules 102a, 102b that are to be connected.

As can be seen in particular from FIG. 45, the balancing section 280 therefore does not project beyond the terminal lugs 258 of the plug units 244 in the direction of connection 250 at the sides of the plug units 244 remote from the modules 102a, 102b that are to be connected so that the module connector 242 is of particularly small extent in the direction of connection 250.

The second connecting section 274b merges into a second end section 270b by a fold 268d at a fourth fold line 272d which is inclined, preferably at an angle of approximately 45°, to the transverse direction 276 of the module connector 242 and to the local longitudinal direction 278 of the conductor 264 in the second connecting section 274b, said second end section extending from the second connecting section 274a up to the terminal lug 258 of the second plug unit 244b and being fixed to the side of this terminal lug 258 which faces the modules 102a, 102b that are to be connected, for example, by welding and in particular by an ultrasonic welding process.

The second end section 270b can also be provided with an angular bent portion 271 by means of which that part of the second end section 270b that is remote from the second plug unit 244b is offset along the direction of connection 250 relative to the module 102 that is to be attached.

Here, the fold 268d along the fourth fold line 272d is effected in such a manner that the second end section 270b of the conductor 264 is arranged on the side of the second connecting section 274b which faces the modules 102a, 102b that are to be connected.

As can be seen in particular from FIG. 46, the balancing section 280 of the conductor 264 has a length L in the longitudinal direction 262 of the module connector 242 which is larger than the spacing D of the mutually remote ends of the terminal lugs 258 of the plug units 244a, 244b from each other.

Due to this large path that is available for the compensation of tolerances and the increased flexibility in the geometrical shape of the conductor 264 resulting from the folds 268, the module connector 242 described makes it particularly easy to change the relative positions of the plug units 244a and 244b with respect to one another so that deviations produced by manufacturing tolerances or by changes occurring during the operation of the electro-chemical device 100 in the relative positions of the plug sections 144 of the electrical terminals 138 of the electro-chemical modules 102a, 102b requiring interconnection that are to be inserted into the plug units 244a, 244b can be particularly easily and effectively compensated.

The invention claimed is:

1. A method for an electrically conductive connection of a plurality of cell terminals of electro-chemical cells of an electro-chemical device, comprising the following method steps:
   separating out from a starting material two or more cell connectors for respectively connecting two cell terminals of different electro-chemical cells to one another in an electrically conductive manner, wherein at least two cell connectors are connected together by at least one connecting web;
   separately fixing the at least two cell connectors to a mounting and/or to the respective cell terminals that are to be connected to one another;
   removing the at least one connecting web between the at least two cell connectors after the at least two cell connectors have been fixed to the mounting or to the cell terminals.

2. A method in accordance with claim 1, wherein at least one of the at least two cell connectors is connected in an electrically conductive manner to a control unit of the electro-chemical device by a conductive track that is integrally connected to the at least one cell connector.

3. A method in accordance with claim 1, wherein at least one cell connector is connected in an electrically conductive manner to a control unit of the electro-chemical device.

4. A method in accordance with claim 3, wherein at least one cell connector is connected in an electrically conductive manner to a control unit of the electro-chemical device by means of a retaining web.

5. A method in accordance with claim 1, wherein at least one cell connector is shaped in such a way that it comprises a resiliently and/or plastically deformable compensation region which enables a first contact section of the cell connector for connecting to a first cell terminal and a second contact section of the cell connector for connecting to a second cell terminal to move relative to each other.

6. A method for an electrically conductive connection of a plurality of cell terminals of electro-chemical cells of an electro-chemical device, comprising the following:
   separating out from a starting material at least one cell connector for an electrically conductive connection of two cell terminals of different electro-chemical cells to one another and a conductive track for the electrically conductive connection of the cell connector to a control unit of the electro-chemical device, wherein the cell connector is integrally connected to the conductive track;
   fixing the at least one cell connector to a sub-frame formed from an electrically insulating material, the sub-frame comprising an associated recess for each of the at least one cell connector, said recess enabling the respective cell connector to pass through to the cell terminals that are to be interconnected by the respective cell connector and/or enabling the cell terminals that are to be interconnected by the respective cell connector to pass through to the respective cell connector;
   connecting the at least one cell connector to two cell terminals of different electro-chemical cells of the electro-chemical device.

* * * * *

UNITED STATES PATENT AND TRADEMARK OFFICE
CERTIFICATE OF CORRECTION

| | | |
|---|---|---|
| PATENT NO. | : 8,562,696 B2 | Page 1 of 1 |
| APPLICATION NO. | : 12/925115 | |
| DATED | : October 22, 2013 | |
| INVENTOR(S) | : Axelle Hauck et al. | |

It is certified that error appears in the above-identified patent and that said Letters Patent is hereby corrected as shown below:

On the Title Page, Item (75) should read

-- (75) Inventors: Axelle Hauck, Neubiberg (DE);
        Philipp Petz, München (DE);
        Hubertus Goesmann; Auernheim (DE);
        Jan Groshert, Dettingen (DE);
        Armin Diez, Lenningen (DE);
        Wolfgang Fritz, Metzingen (DE);
        Michael Kohnle, Hülben (DE) --.

Signed and Sealed this
Thirteenth Day of January, 2015

Michelle K. Lee
*Deputy Director of the United States Patent and Trademark Office*